United States Patent [19]
Mihara et al.

[11] Patent Number: 5,482,822
[45] Date of Patent: Jan. 9, 1996

[54] INFRARED-ABSORPTIVE COMPOUND AND OPTICAL RECORDING MEDIUM MAKING USE OF THE SAME

[75] Inventors: Chieko Mihara, Isehara; Hiroyuki Sugata, Yamato; Tsuyoshi Santo, Yokohama; Miki Tamura, Isehara, all of Japan

[73] Assignee: Canon Kabushiki Kaisha, Tokyo, Japan

[21] Appl. No.: 59,853

[22] Filed: May 11, 1993

[30] Foreign Application Priority Data

May 12, 1992 [JP] Japan ................................. 4-145046

[51] Int. Cl.⁶ .................................................. G11B 11/00
[52] U.S. Cl. ................... 430/270.14; 430/495; 430/945; 369/284; 369/288; 564/309
[58] Field of Search ....................... 430/945, 495, 430/59, 270; 369/284, 288; 564/309

[56] References Cited

U.S. PATENT DOCUMENTS

| | | | |
|---|---|---|---|
| 3,251,881 | 5/1966 | Susi et al. | 260/576 |
| 3,484,467 | 12/1969 | Susi et al. | 260/440 |
| 3,575,871 | 4/1971 | Susi et al. | 252/300 |
| 4,656,121 | 4/1987 | Sato et al. | 430/495 |
| 4,871,601 | 10/1989 | Miura et al. | 428/64 |
| 4,886,846 | 12/1989 | Shimada et al. | 524/246 |
| 4,923,390 | 5/1990 | Oguchi et al. | 430/270 |
| 5,009,987 | 4/1991 | Mihara et al. | 430/495 |
| 5,024,917 | 6/1991 | Mihara et al. | 430/271 |
| 5,079,127 | 1/1992 | Katagiri et al. | 430/269 |
| 5,108,873 | 4/1992 | Fukui et al. | 430/270 |
| 5,160,487 | 11/1992 | Morishita et al. | 430/59 |
| 5,190,849 | 3/1993 | Santoh et al. | 430/495 |
| 5,275,925 | 1/1994 | Mihara et al. | 430/495 |

FOREIGN PATENT DOCUMENTS

| | | | |
|---|---|---|---|
| 0475676 | 3/1982 | European Pat. Off. | 430/59 |
| 61-69991 | 4/1986 | Japan . | |
| 62-201446 | 9/1987 | Japan | 430/59 |
| 63-9576 | 1/1988 | Japan . | |
| 63-1594 | 1/1988 | Japan . | |
| 63-31792 | 2/1988 | Japan . | |
| 63-67187 | 3/1988 | Japan . | |
| 63-82789 | 4/1988 | Japan . | |
| 63-78794 | 4/1988 | Japan . | |
| 3-16785 | 1/1991 | Japan . | |
| 4-181261 | 6/1992 | Japan | 430/59 |
| 4-186361 | 7/1992 | Japan | 430/59 |

OTHER PUBLICATIONS

Optical Engineering, vol. 15, No. 2, pp. 99–108, Mar./Apr. 1976.

*Primary Examiner*—Charles L. Bowers, Jr.
*Assistant Examiner*—Martin J. Angebranndt
*Attorney, Agent, or Firm*—Fitzpatrick, Cella, Harper & Scinto

[57] ABSTRACT

An infrared-absorptive compound is disclosed which has the structure represented by the following formula (I) or (II)

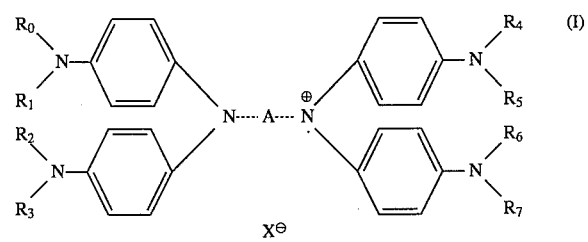

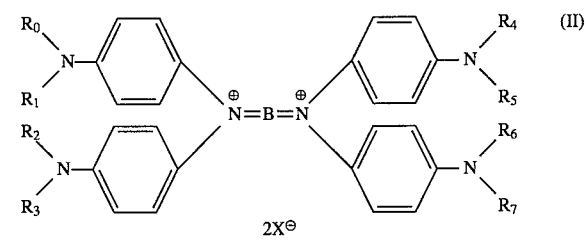

Also, an optical recording medium having a recording layer containing the infrared-absorptive compound is disclosed.

7 Claims, 1 Drawing Sheet

INFRARED-ABSORPTIVE COMPOUND AND OPTICAL RECORDING MEDIUM MAKING USE OF THE SAME

BACKGROUND OF THE INVENTION

1. Field of the Invention

The present invention relates to a novel infrared-absorptive compound and an optical recording medium making use of the infrared-absorptive compound.

2. Related Background Art

Generally, information can be recorded on optical recording mediums such as optical disks and optical cards by forming optically detectable minute pits (with size of, for example, about 1 µm) so arranged as to provide a spiral, concentric or linear track or tracks on a recording layer formed on a substrate of the recording medium, thereby making it possible to store information at a high density.

As describe, for example, in "Review and Analysis of Optical Recording Media", Optical Engineering, Vol. 15, No. 2, March–April 1976, p. 99 ff., a known optical recording method comprises applying a light beam such as a laser beam to the recording layer of an optical recording medium so as to generate deformation or pits on the recording layer. In other known methods, the application of such a light beam causes the generation of bubbles, phase changes, discoloration, discolorization or the like.

Various materials have been proposed for the recording layer of such optical recording mediums. Examples of the materials include inorganic materials such as a metal film comprised of an aluminum deposit film or the like, a bismuth film, a tellurium oxide film and a chalcogenite type noncrystalline glass film. Such thin films are commonly sensitive to light having a wavelength of approximately 350 to 800 nm and exhibit a high reflectance to laser beams. One disadvantage of these films is that they provide a rather poor laser beam ultilization factor. Moreover, such inorganic material thin films are usually formed as recording layers by sputtering or the like. Such a film forming method, however, requires a production line equipped with a vacuum system, so that these inorganic material thin films are involved in a higher production cost.

In view of the above problems, optical recording mediums using coloring matter whose optical properties can be changed by the energy of light having a relatively long wavelength (for example, 780 nm or more) are being extensively studied. Optical recording mediums using such organic coloring matter are effective in that they allow the formation-of pits by a semiconductor laser having an oscillation wavelength of around 780 nm or 830 nm. Organic coloring matter also allows film formation by wet coating and can be handled with ease, making it possible to readily mass-produce recording mediums at less equipment cost.

The optical recording mediums making use of organic coloring matter in the recording layer, however, commonly have a poor light-resistance stability. For example, when such optical recording mediums are left under natural light or repeatedly irradiated with reproducing light, there has been the problem that the recording-reproducing performance of the optical recording mediums is lowered. To cope with such a problem, a method in which a nickel chelate complex serving as a singlet oxygen quencher is added to a recording layer is known in the art (for example, Japanese Patent Applications Laid-open No. 63-1594, No. 63-9576, No. 63-31792, No. 63-67187, No. 63-78794 and No. 63-82789).

The nickel chelate complex compound, however, has so poor a solvent solubility that it has been difficult for it to be added in an amount large enough to well improve the light-resistance of the recording layer when the recording layer is formed by wet coating.

In the meantime, the present applicants have disclosed in U.S. Pat. Nos. 4,656,121 and 4,923,390 a technique in which an infrared-absorptive compound such as a triallylamine type aminium salt compound or diimonium salt compound is added to the recording layer in order to improve light-resistance stability of the organic coloring matter recording layer. The aminium salt compound and diimonium salt compound have a better solvent solubility than the nickel chelate complex and are effective for well improving light-resistance stability of the recording layer.

Incidentally, temperatures inside apparatus tend to rise as recording-reproducing apparatus for optical recording mediums have been made small-sized in recent years. In addition, optical recording mediums such as optical cards, of the type they are carried by personal users, are not necessarily used only in offices well air-conditioned. For example, even a condition in which they are left for a long time in an environment of high temperature as in rooms of automobiles must be taken into consideration. Thus, there is a demand for optical recording mediums having much better storage stability in the environment of high temperature. With such a demand, the aminium salt compound or diimonium salt compound itself which is added to the recording layer in order to improve light-resistance stability as stated above is sought to have much more improved heat-resistance while retaining the solvent solubility.

SUMMARY OF THE INVENTION

The present invention was made taking account of the above problems. An object of the present invention is to provide an infrared-absorptive compound having a superior solvent solubility and at the same time having a superior heat resistance.

Another object of the present invention is to provide an optical recording medium comprising an organic coloring matter having a superior light-resistance stability and also having a superior storage stability in an environment of high temperature.

The infrared-absorptive compound of the present invention is characterized by having the structure represented by the following formula (I) or (II).

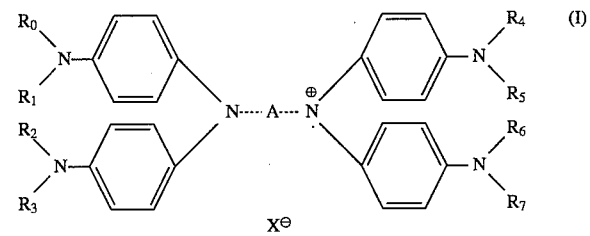

-continued

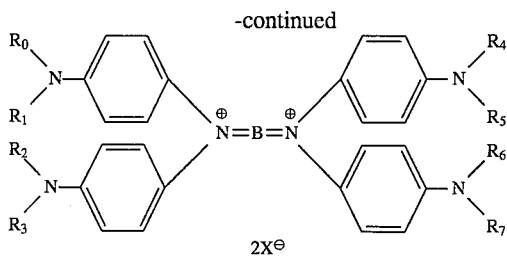

In formulas (I) and (II), $R_0$ to $R_7$ each represent (a) a hydrogen atom or a monovalent organic residual group, at least one of $R_0$ to $R_7$ being a monovalent organic residual group having a fluorine atom, or (b) a group of atoms necessary for at least one of combinations $R_0$ and $R_1$, $R_2$ and $R_3$, $R_4$ and $R_5$ and $R_6$ and $R_7$ to form together with a nitrogen atom a substituted or unsubstituted 5-membered ring having a fluorine atom, a substituted or unsubstituted 6-membered ring having a fluorine atom or a substituted or unsubstituted 7-membered ring having a fluorine atom, other combinations each being a hydrogen atom or a monovalent organic residual group; and $X^\ominus$ represents an anionic residual group.

In formula (I), "A" represents

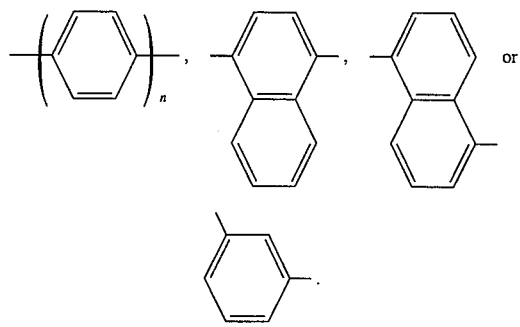

In formula (II), "B" represents

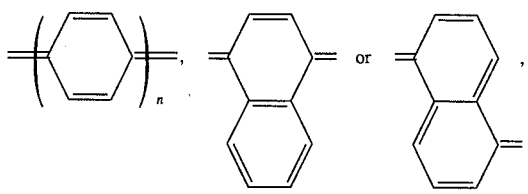

wherein n represents an integer of 1 or 2.

The infrared-absorptive compound of the present invention is also characterized by having the structure represented by the following formula (III) or (IV).

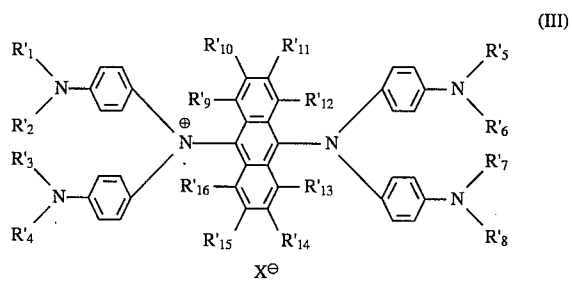

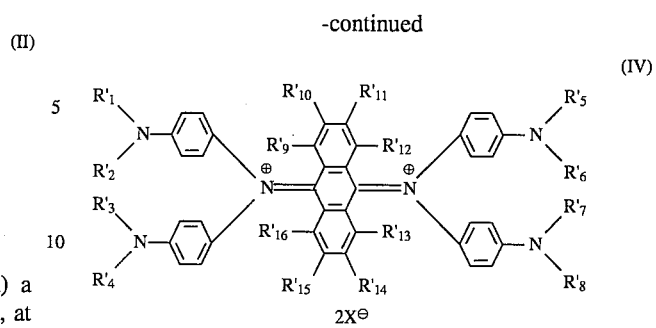

In formulas (III) and (IV), $R'_1$ to $R'_{16}$ each represent a hydrogen atom or a monovalent organic residual group, or a group of atoms necessary for any combination of $R'_q$ and $R'_{q+1}$ to form a substituted or unsubstituted 5-membered ring, a substituted or unsubstituted 6-membered ring or a substituted or unsubstituted 7-membered ring, wherein q is 1, 3, 5, 7, 9, 11 or 13; and $X^\ominus$ represents an anionic residual group.

The infrared-absorptive compound of the present invention is also characterized by having the structure represented by the following formula (V) or (VI).

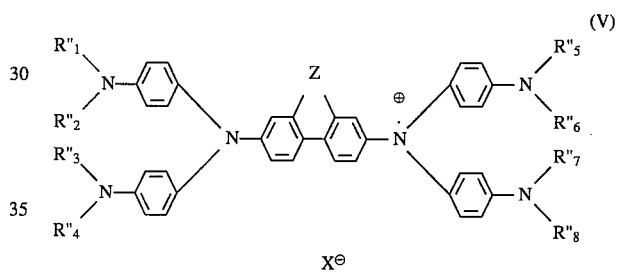

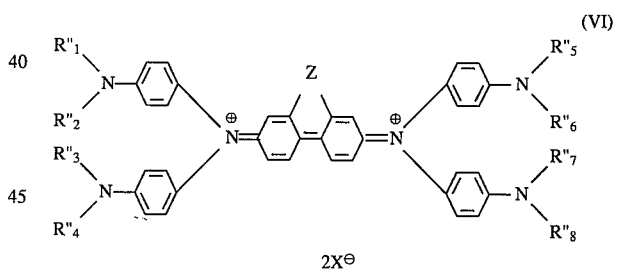

In formulas (V) and (VI), Z represents

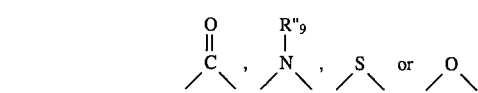

and $R''_1$ to $R''_9$ each represent a hydrogen atom or a monovalent organic residual group, or a group of atoms necessary for any combination of $R''_r$ and $R''_{r+1}$ to form a substituted or unsubstituted 5-membered ring, a substituted or unsubstituted 6-membered ring or a substituted or unsubstituted 7-membered ring, wherein r is 1, 3, 5 or 7; and $X^\ominus$ represents an anionic residual group.

The optical recording medium of the present invention comprises a recording layer containing an infrared-absorptive compound represented by the following formula (I) or (II).

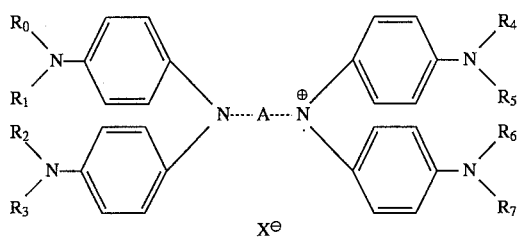

(I)

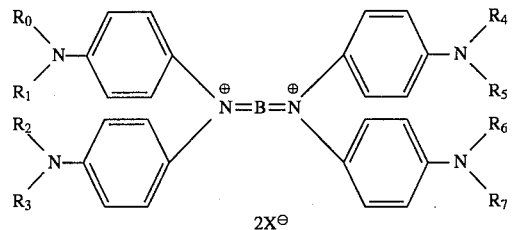

(II)

In formulas (I) and (II), $R_0$ to $R_7$ each represent (a) a hydrogen atom or a monovalent organic residual group, at least one of $R_0$ to $R_7$ being a monovalent organic residual group having a fluorine atom, or (b) a group of atoms necessary for at least one of combinations $R_0$ and $R_1$, $R_2$ and $R_3$, $R_4$ and $R_5$ and $R_6$ and $R_7$ to form together with a nitrogen atom a substituted or unsubstituted 5-membered ring having a fluorine atom, a substituted or unsubstituted 6-membered ring having a fluorine atom or a substituted or unsubstituted 7-membered ring having a fluorine atom, other combinations each being a hydrogen atom or a monovalent organic residual group; and $X^{\ominus}$ represents an anionic residual group.

In formula (I), "A" represents

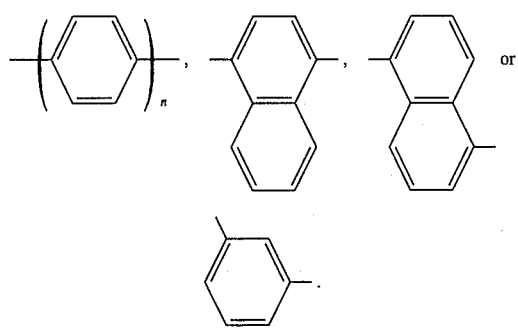

In formula (II), "B" represents

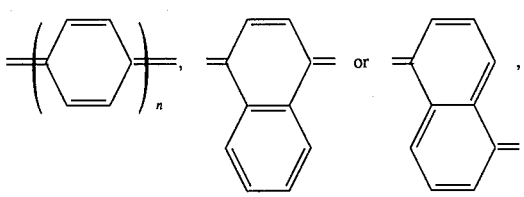

wherein n represents an integer of 1 or 2.

The optical recording medium of the present invention also comprises a recording layer containing an infrared-absorptive compound represented by the following formula (III) or (IV).

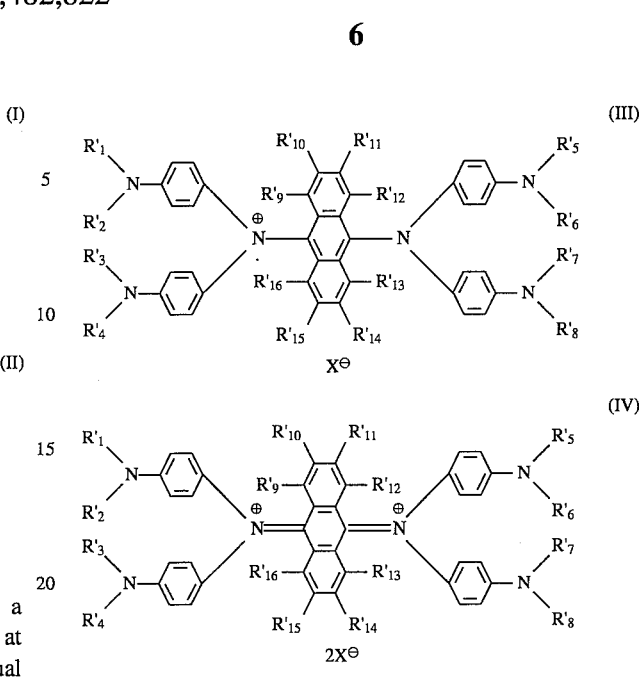

In formulas (III) and (IV), $R'_1$ to $R'_{16}$ each represent a hydrogen atom or a monovalent organic residual group, or a group of atoms necessary for any combination of $R'_q$ and $R'_{q+1}$ to form a substituted or unsubstituted 5-membered ring, a substituted or unsubstituted 6-membered ring or a substituted or unsubstituted 7-membered ring, wherein q is 1, 3, 5, 7, 9, 11 or 13; and $X^{\ominus}$ represents an anionic residual group.

The optical recording medium of the present invention also comprises a recording layer containing an infrared-absorptive compound represented by the following formula (V) or (VI).

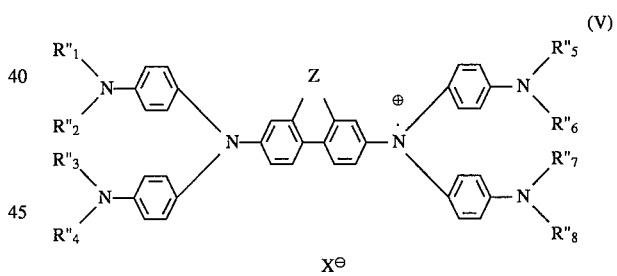

(V)

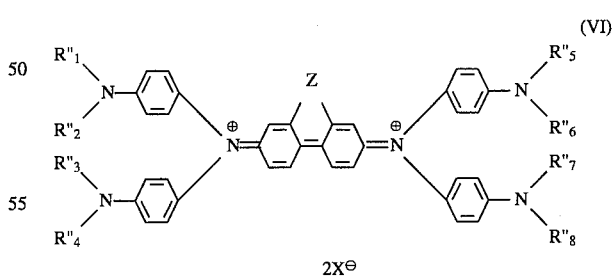

(VI)

In formulas (V) and (VI), Z represents

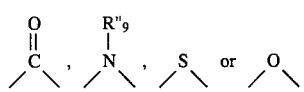

and $R''_1$ to $R''_9$ each represent a hydrogen atom or a monovalent organic residual group, or a group of atoms necessary for any combination of $R''_r$ and $R''_{r+1}$ to form a substituted or unsubstituted 5-membered ring, a substituted or unsubstituted 6-membered ring or a substituted or unsubstituted 7-membered ring, wherein r is 1, 3, 5 or 7; and $X^\ominus$ represents an anionic residual group.

DESCRIPTION OF THE PREFERRED EMBODIMENTS

Figure 1:
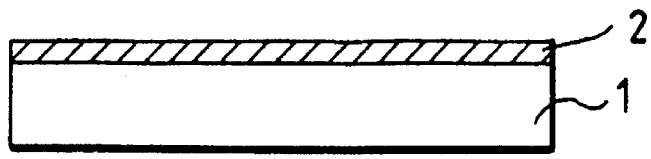
FIG. 1 is a cross-sectional illustration of an embodiment of the optical recording medium according to the present invention.

The present invention will be described below in detail.

The infrared-absorptive compound according to a first embodiment of the present invention is a compound represented by the following formula (I) or (II).

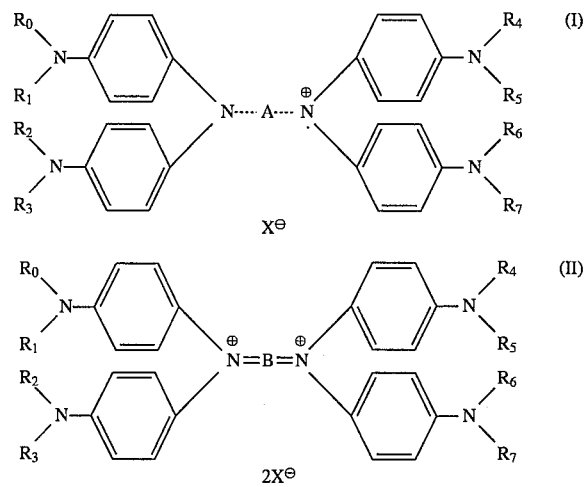

In formulas (I) and (II), $R_0$ to $R_7$ each represent a hydrogen atom or a monovalent organic residual group, and in the present invention, at least one of the substituents $R_0$ to $R_7$ is preferably a monovalent organic residual group having a fluorine atom (hereinafter abridged "$R_F$"). The compound wherein at least one of $R_0$ to $R_7$ is $R_F$ can bring about a more improvement in heat resistance than the conventional aminium salt compounds or diimonium salt compounds.

In the present invention, the $R_F$ preferably used in $R_0$ to $R_7$ are exemplified by a substituted or unsubstituted alkyl group having a fluorine atom, a substituted or unsubstituted alkenyl group having a fluorine atom, a substituted or unsubstituted aralkyl group having a fluorine atom and a substituted or unsubstituted aryl group having a fluorine atom.

In the present invention, for example, what is meant by the "unsubstituted aryl group having a fluorine atom" in the description for the $R_F$ is that hydrogen atom(s) is/are not substituted with other element(s) or organic residual group(s) except that one or two or more hydrogen atom(s) in the phenyl group is/are substituted with a fluorine atom or atoms, and what is meant by the "substituted aryl group having a fluorine atom" is that one or two or more hydrogen atom(s) in the phenyl group is/are substituted with a fluorine atom or atoms and also one or two or more hydrogen atom(s) in the phenyl group is/are substituted with other element(s) or monovalent organic residual group(s) or that one or two or more hydrogen atom(s) in the phenyl group is/are substituted with a monovalent organic residual group or groups having a fluorine atom.

The $R_F$ in the present invention will be described below in greater detail. For example, the unsubstituted alkyl group having a fluorine atom may include those exemplified by a fluoromethyl group, a difluoromethyl group, a trifluoromethyl group, a 1-fluoroethyl group, a 2-fluoroethyl group, a 1,1-difluoroethyl group, a 1,2-difluoroethyl group, a 2,2-difluoroethyl group, a 1,1,1-trifluoroethyl group, a 1,1,2-trifluoroethyl group, a 1,2,2-trifluoroethyl group, a 1,1,2,2-tetrafluoroethyl group, a 1,1,1,2-tetrafluoroethyl group, a pentafluoroethyl group, a 1-fluoropropyl group, a 2-fluoropropyl group, a 3-fluoropropyl group, a 1,1-difluoropropyl group, a 1,2-difluoropropyl group, a 1,3-difluoropropyl group, a 2,2-difluoropropyl group, a 2,3-difluoropropyl group, a 3,3-difluoropropyl group, a 1,1,2-trifluoropropyl group, a 1,1,3-trifluoropropyl group, a 1,2,2-trifluoropropyl group, a 1,2,3-trifluoropropyl group, a 1,3,3-trifluoropropyl group, a 2,2,3-trifluoropropyl group, a 3,3,3-trifluoropropyl group, a 1,1,2,2-tetrafluoropropyl group, a 1,1,3,3-tetrafluoropropyl group, a 1,1,2,3-tetrafluoropropyl group, a 1,2,2,3-tetrafluoropropyl group, a 1,2,3,3-tetrafluoropropyl group, a 2,2,3,3-tetrafluoropropyl group, a 1,3,3,3-tetrafluoropropyl group, a 2,3,3,3-tetrafluoropropyl group, a 1,1,2,2,3-pentafluoropropyl group, a 1,1,2,3,3-pentafluoropropyl group, a 1,1,3,3,3-pentafluoropropyl group, a 1,2,2,3,3-pentafluoropropyl group, a 1,2,3,3,3-pentafluoropropyl group, a 2,2,3,3,3-pentafluoropropyl group, a 1,1,2,2,3,3-hexafluoropropyl group, a 1,1,2,3,3,3-hexafluoropropyl group, a 1,2,2,3,3,3-hexafluoropropyl group, a heptafluoropropyl group, a 1,1,1,3,3,3-hexafluoro-2-propyl group, a heptafluoro-2-propyl group, a 2,2-difluorobutyl group, a 2,2,3,3-tetrafluorobutyl group, a 4,4,4-trifluorobutyl group, a 3,3,4,4,4-pentafluorobutyl group, a 2,2,4,4,4-pentafluorobutyl group, a 2,2,3,4,4,4-hexafluorobutyl group, a 1,2,3,4-tetrafluorobutyl group, a nonafluorobutyl group, a 2,2,3,3,4,4,4-heptafluorobutyl group, a 1,1,3,3,4,4,4-heptafluoro-2-butyl group, a t-nonafluorobutyl group, a 5,5,5-trifluoropentyl group, a 4,4,5,5,5-pentafluoropentyl group, a 3,3,5,5,5-pentafluoropentyl group, a 3,3,4,4-tetrafluoropentyl group, a 1,2,3,4,5-pentafluoropentyl group, a 2,2,3,3,4,4,5,5-octafluoro-1-pentyl group, a 1,1,2,2,3,3,4,4-octafluoropentyl group, a 6,6,6-trifluorohexyl group, a 6,6,7,7,7-pentafluoropentyl group, a 8,8,8-trifluorooctyl group and a 5,5,6,6,7,7,8,8-octafluorooctyl group.

Other alkyl group having a fluorine atom, for example, the substituted alkyl group having a fluorine atom may include fluorine-containing hydroxylalkyl groups such as a 2-hydroxy-2-fluoroethyl group, a 2-hydroxy-1,1-difluoroethyl group and a 3-hydroxy-2,2-difluoropropyl group, fluorine-containing acetoxylalkyl groups such as a 2-acetoxy-2-fluoroethyl group, a 2-acetoxy-2,2-difluoroethyl group and a 3-acetoxy-2,2,3,3-tetrafluoropropyl group, fluorine-containing carboxylalkyl groups such as a 2-carboxy-1,2-difluoroethyl group, a 3-carboxy-3-fluoropropyl group and a 4-carboxy-2,2-difluorobutyl group, and fluorine-containing alkoxylalkyl groups such as a trifluoromethoxymethyl group, a trifluoromethoxyethyl group, a trifluoromethoxy-2-difluoroethyl group, a difluoromethoxyethyl group, a 2-trifluoroethoxy-2'-difluoroethyl group, a trifluoromethoxy-n-propyl group, a pentafluoroethoxyethyl group, a pentafluoroethoxypropyl group, a methoxy-3,3-difluoropropyl group and a trifluoromethoxyoctyl group.

The unsubstituted alkenyl group having a fluorine atom may include those exemplified by a trifluoroethylene group, a 2,2-difluoroethylene group, a pentafluoropropenyl group and a heptafluorobutenyl group. The substituted alkenyl group having a fluorine atom may include those exemplified by a 2-hydroxy-3,3-difluoropropenyl group.

The unsubstituted aralkyl group having a fluorine atom may include those exemplified by a p-fluorobenzyl group, a m-fluorobenzyl group, a pentafluorobenzyl group, a p-trifluoromethylbenzyl group, a 1-(pentafluorophenyl)ethyl group and 3-(pentafluorophenyl)propyl group.

The substituted aralkyl group having a fluorine atom may include those exemplified by a 4-hydroxy-3-fluorobenzyl group.

The unsubstituted aryl group having a fluorine atom may include a p-fluorophenyl group and a pentafluorophenyl group. The substituted aryl group having a fluorine atom may include a p-trifluoromethylphenyl group and a 3,5-bis(trifluoromethyl)phenyl group.

In view of the improvement in heat resistance of the optical recording medium, it is preferable in the present invention that at least one of $R_0$ to $R_7$ in the organic coloring matter represented by formula (I) is the $R_F$ as previously described. In particular, a polymethine dye wherein at least one of $R_0$ and $R_1$ and at least one of $R_4$ and $R_5$ are the $R_F$ or all of $R_0$ to $R_7$ are the $R_F$ can bring about the improvement in heat resistance of the optical recording medium. This is a preferred embodiment.

In the present invention, among $R_0$ to $R_7$, the remaining substituent(s) other than those having been taken by the $R_F$ may be a hydrogen atom or atoms or a monovalent organic residual group or groups other than the $R_F$. In this instance, the monovalent organic residual group other than the $R_F$ may include alkyl groups as exemplified by a methyl group, an ethyl group, a n-propyl group, an iso-propyl group, a n-butyl group, an iso-butyl group, a t-butyl group, a n-amyl group, a t-amyl group, a n-hexyl group, a n-octyl group and a t-octyl group. Other alkyl groups as exemplified by substituted alkyl groups may include, for example, hydroxyalkyl groups such as a 2-hydroxyethyl group, a 3-hydroxypropyl group and a 4-hydroxybutyl group, acetoxyalkyl groups such as a 2-acetoxyethyl group and a 2-acetoxypropyl group, carboxyalkyl groups such as a carboxymethyl group, a 2-carboxyethyl group and a 3-carboxypropyl group, and alkoxyalkyl groups such as a methoxymethyl group, a methoxyethyl group, a methoxypropyl group, a methoxybutyl group, an ethoxymethyl group, an ethoxyethyl group, an ethoxypropyl group, an ethoxybutyl group and a propoxymethyl group; aralkyl groups as exemplified by a benzyl group, a p-chlorobenzyl group, a p-methylbenzyl group, a 2-phenylmethyl group, a 2-phenylpropyl group, a 3-phenylpropyl group, an α-naphthylmethyl group and a β-naphthylethyl group; and also substituted or unsubstituted aryl groups as exemplified by a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group and a ditolylaminophenyl group.

In the present invention, in the case when at least two or more of the substituents $R_0$ to $R_7$ are $R_F$'s, the $R_F$'s may be the same or may be different from one another.

Of the various $R_F$'s described above in the present invention, the substituted or unsubstituted alkyl groups or alkoxyalkyl groups having a fluorine atom are preferable organic residual groups in view of achievement of both the effects, i.e., improvements in heat resistance and solubility in organic solvents, of the compound. In this instance, the alkyl group may preferably have 1 to 8, and particularly 1 to 5, carbon atoms.

In formulas (I) and (II) described above, among $R_0$ to $R_7$, at least one of combinations $R_0$ and $R_1$, $R_2$ and $R_3$, $R_4$ and $R_5$ and $R_6$ and $R_7$ may form together with a nitrogen atom a substituted or unsubstituted 5-membered ring having a fluorine atom, a substituted or unsubstituted 6-membered ring having a fluorine atom or a substituted or unsubstituted 7-membered ring having a fluorine atom. Such a compound can also bring about a more improvement in heat resistance than the conventional aminium salt compounds or diimonium salt compounds.

Here, the 5-membered ring may include, for example, a pyrrolidine ring, the 6-membered ring may include a piperidine ring, a morpholine ring and a tetrahydropyridine group, and the 7-membered ring may include a cyclohexylamine ring as represented by the following formula (VII).

(VII)

Here, among $R_0$ to $R_7$, the remaining substituent(s) other than those forming no heterocyclic ring may be a hydrogen atom or a monovalent organic residual group including the $R_F$, and two or more of combinations $R_0$ and $R_1$, $R_2$ and $R_3$, $R_4$ and $R_5$ end $R_6$ and $R_7$ may form the above 5-membered, 6-membered or 7-membered ring having a fluorine atom. In this instance, each ring may be the same or different.

In the case when $R_0$ to $R_7$ form the above heterocyclic rings, it is preferable for them to have the structure of any of the following formulas (VIII)-(1) to (VIII)-(4), in view of the improvement of heat resistance of the compound and solubility in organic solvents.

(VIII)-(1)

(VIII)-(2)

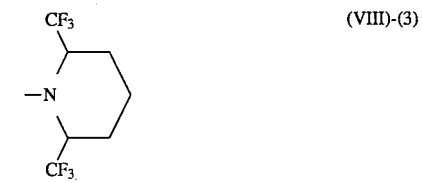

(VIII)-(3)

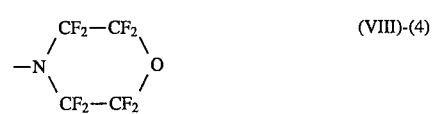

(VIII)-(4)

The heat resistance and solubility in organic solvents, of the compound of formula (I) or (II) can be much more improved when all the combinations $R_0$ and $R_1$, $R_2$ and $R_3$, $R_4$ and $R_5$ and $R_6$ and $R_7$ are made to have the structure of any of the above formulas (VIII)-(1) to (VIII)-(4).

$X^\ominus$ represents an anion such as a chloride ion, a bromide ion, an iodide ion, a perchlorate ion, a nitrate ion, a benzenesulfonate ion, a p-toluenesulfonate ion, a methyl sulfate ion, an ethyl sulfate ion, a propyl sulfate ion, a tetrafluoroborate ion, a tetraphenylborate ion, a hexafluorophosphate ion, a benzenesulfinate ion, an acetate ion, a trifluoroacetate ion, a propionacetate ion, a benzoate ion, an oxalate ion, a succinate ion, a malonate ion, an oleate ion, a stearate ion, a citrate ion, a monohydrogen diphosphate ion, a dihydrogen monophosphate ion, a pentachlorostannate ion, a chlorosulfonate ion, a fluorosulfonate ion, a trifluoromethane sulfonate ion, a hexafluoroarsenate ion, a hexafluoroantimonate ion, a molybdate ion, a tungstate ion, a titanate ion or a zirconate ion.

Examples of the infrared-absorptive compounds of formulas (I) and (II) according to the present invention are shown below. In the present invention, examples are by no means limited to these.

The following exemplary compounds (I)-(A)-(1) to (II)-(D)-(14) ape set out in the manner simplified as follows:

For example, in the infrared-absorptive compounds of formulas (I) and (II), compounds having the following structures (A), (B) and (C) are respectively indicated as shown below.

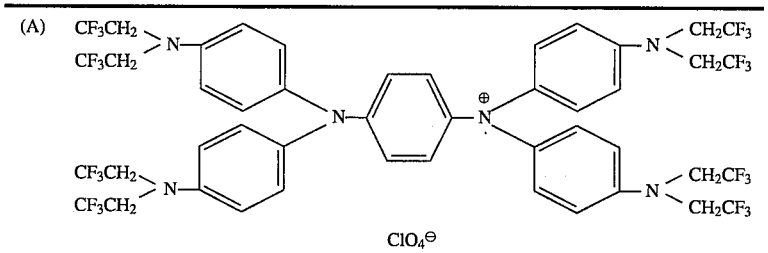

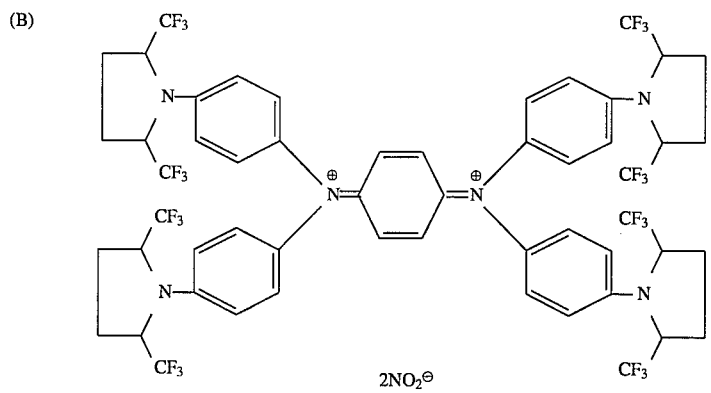

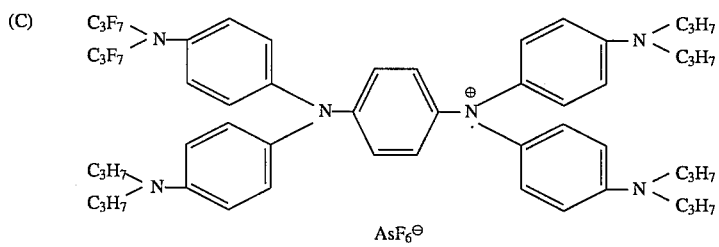

| Compound No. | A(B) | X | $(R_0, R_1)(R_2, R_3)(R_4, R_5)(R_6, R_7)$ |
|---|---|---|---|
| (A) | benzene ring | $ClO_4$ | $(CH_2CF_3, CH_2CF_3)_4$ |
| (B) | quinoid | $NO_2$ | $\begin{array}{cc} CF_3 & CF_3 \\ | & | \\ (CHCH_2CH_2CH)_4 \end{array}$ |
| (C) | benzene ring | $AsF_6$ | $(C_3F_7, C_3F_7)(C_3H_7, C_3H_7)_3$ |

| Compound No. | A | X | $(R_0R_1)$ $(R_2R_3)$ $(R_4R_5)$ $(R_6R_7)$ |
|---|---|---|---|
| [I]-(A)-(1) |  | $ClO_4$ | $(CH_2CF_3\ CH_2CF_3)_4$ |
| (2) |  | $SbF_6$ | $(CH_2CHF_2\ CH_2CHF_2)_4$ |
| (3) |  | $AsF_6$ | $(C_3F_7\ C_3F_7)_4$ |
| (4) |  | $ClO_4$ | $(CH_2C_2F_5\ CH_2C_2F_5)_4$ |
| (5) |  | $BF_4$ | $(C_2F_5\ C_2F_5)_4$ |
| (6) |  | $SbF_6$ | $\begin{array}{c} CF_3 \quad\quad CF_3 \\ \vert \quad\quad\quad \vert \\ (CH-CF_3\ CH-CF_3)_4 \end{array}$ |
| (7) | 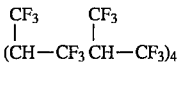 | I | $(CH_2CH_2F\ CH_2CH_2F)_4$ |
| (8) |  | Br | $(C_4F_9\ C_4F_9)_4$ |
| (9) |  | $ClO_4$ | $(CH_2CH_2F\ CH_2CH_2F)_4$ |
| (10) |  |  $CH_3-\bigcirc-SO_3$ | $(CH_2CF_2CHFCF_3\ CH_2CF_2CHFCF_3)_4$ |
| (11) | 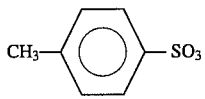 | $SbF_6$ | $(CH_2(CF_2)_4H\ CH_2(CF_2)_4H)_4$ |
| (12) |  | $ClO_4$ | $(CH_2(CF_2)_2CF_3\ CH_2(CF_2)_2CF_3)_4$ |
| (13) |  | Cl | $(CF_2CF_2CH_3\ CF_2CF_2CH_3)_4$ |
| (14) |  | $NO_2$ |  $(CH_2-\bigcirc-CF_3CH_2-\bigcirc-CF_3)_4$ |

-continued
| Compound No. | A | X | $(R_0R_1)$ $(R_2R_3)$ $(R_4R_5)$ $(R_6R_7)$ |
|---|---|---|---|
| (15) |  | $AsF_6$ |  |
| [I]-(A)-(16) |  | $ClO_4$ | $(CH_2CF_2CHFCF_3\ CH_2CF_3CHFCF_3)_4$ |
| (17) |  | Br |  |
| (18) |  | $SbF_6$ | $(CH_2CF_3\ CH_2CF_3)_4$ |
| (19) |  | $AsF_6$ | $(CH_2C_2F_5\ CH_2C_2F_5)_4$ |
| (20) |  | $ClO_4$ |  |
| (21) |  | I | $(((CF_2)_7CF_3\ (CF_2)_7CF_3)_4$ |
| (22) |  | $NO_2$ | $((CF_2)_3CF_3\ (CF_2)_3CF_3)_4$ |
| (23) |  | $CH_3SO_3$ | $(C_2F_5\ C_2F_5)_4$ |
| (24) |  | $AsF_6$ | $(C_3F_7\ C_3F_7)\ (C_3H_7\ C_3H_7)_3$ |
| (25) |  | Cl | $(CH_2CH_2CF_3\ CH_2CH_2CF_3)_2\ (C_2H_4OCH_3\ C_2H_4OCH_3)_2$ |
| (26) |  | $ClO_4$ | $(CH_2CH_2F\ CH_2CH_2F)_3\ (C_3H_7\ C_3H_7)$ |
| (27) |  | Br | $(CH_2CHF_2\ CH_2CHF_2)_4$ |

| Compound No. | A | X | $(R_0R_1)$ $(R_2R_3)$ $(R_4R_5)$ $(R_6R_7)$ |
|---|---|---|---|
| (28) | 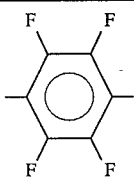 | $ClO_4$ | 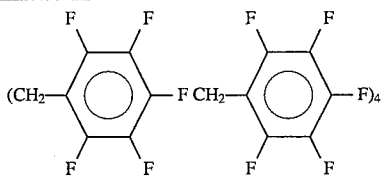 |
| (29) | 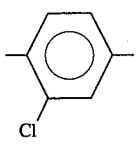 | $SbF_6$ | $(CF_3\ CF_3)_2\ (C_2H_5\ C_2H_5)_2$ |
| (30) | 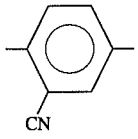 | I | $(CH_2(CF_2)_4H\ CH_2(CF_2)_4H)_3\ (n\text{-}C_4H_9\ n\text{-}C_4H_9)$ |
| [I]-(A)-(31) | 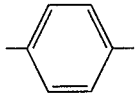 | $ClO_4$ | $(C_2H_4OCF_3\ C_2H_4OCF_3)_4$ |
| (32) | 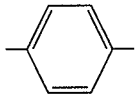 | I | $(CF{=}CF_2\ CF{=}CF_2)_4$ |
| (33) | 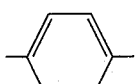 | $AsF_6$ | $(CH_2CH_2CF{=}CF_2\ CH_2CH_2CF{=}CF_2)_4$ |
| (34) | 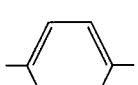 | Br | 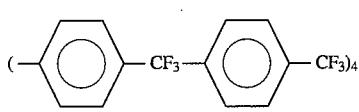 |
| (35) | 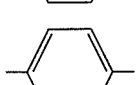 | $SbF_6$ | $(CF_2CF_2OCF_2CF_3\ CF_2CF_2OCF_2CF_3)_4$ |
| (36) |  | $NO_2$ | $(CF_2CF_2CF_2CF_2)_4$ |
| (37) |  | $ClO_4$ | $\begin{matrix}CF_3\quad\ \ CF_3\\ |\qquad\ \ \ |\\(CHCH_2CH_2CH)_4\end{matrix}$ |
| (38) | 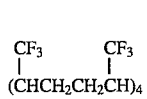 | Cl | $(C_2H_4OC_2F_5\ C_2H_4OC_2F_5)_4$ |
| (39) | 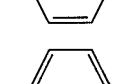 | $ClO_4$ | $\begin{matrix}OH\quad\ \ OH\\ |\qquad\ \ \ |\\(CH_2CHF\ CH_2CHF)_4\end{matrix}$ |
| (40) |  | $AsF_6$ | $(CH_2CF_2CF_2OCH_3\ CH_2CF_2CF_2OCH_3)_4$ |

-continued

| Compound No. | A | X | $(R_0R_1)$ $(R_2R_3)$ $(R_4R_5)$ $(R_6R_7)$ |
|---|---|---|---|
| (41) | –C₆H₄– | CH₃–C₆H₄–SO₃ | $(CH_2CF_2CF_2H\ CH_2CH_2CF_2H)_4$ |
| (42) | –C₆H₄– | $SbF_6$ | $(CH_2CH(CF_3)-CF_3\ CH_2CH(CF_3)-CF_3)_4$ |
| (43) | –C₆H₄– | I | $(CF_2CF_2CH=CH_2\ CF_2CF_2CH=CH_2)_2\ (n\text{-}C_3H_7\ n\text{-}C_3H_7)_2$ |
| [I]-(B)-(1) | –C₆H₄–C₆H₄– | Cl | $(C_3F_7\ C_3F_7)_4$ |
| (2) | –C₆H₄–C₆H₄– | $SbF_6$ | $(CH_2CHF_2\ CH_2CHF_2)_4$ |
| (3) | –C₆H₄–C₆H₄– | $AsF_6$ | $(CH_2CF_3CHFCF_3\ CH_2CF_2CHFCF_3)_4$ |
| (4) | –C₆H₄–C₆H₄– | $ClO_4$ | $(CH_2(CF_2)_4H\ CH_2(CF_2)_4H)_4$ |
| (5) | –C₆H₄–C₆H₄– | Br | $(C_4F_9\ C_4F_9)_4$ |
| (6) | –C₆H₄–C₆H₄– | $SbF_6$ | $(C_2F_5\ C_2F_5)_4$ |
| (7) | –C₆H₄–C₆H₄– | $CH_3SO_3$ | $(CF_2CF_2CH_3\ CF_2CF_2CH_3)_4$ |
| (8) | –C₆H₄–C₆H₄– | $ClO_4$ | $(CH(CF_3)-CF_3\ CH(CF_3)-CF_3)_4$ |
| (9) | –C₆H₄–C₆H₄– | I | $(CH_2\text{-}C_6F_4\text{-}FCH_2\text{-}C_6F_4\text{-}F)_4$ |
| (10) | –C₆H₄–C₆H₄– | $BF_4$ | $(CH_2\text{-}C_6H_3(CF_3)_2\ CH_2\text{-}C_6H_3(CF_3)_2)_4$ |

-continued
| Compound No. | A | X | $(R_0R_1)$ $(R_2R_3)$ $(R_4R_5)$ $(R_6R_7)$ |
|---|---|---|---|
| (11) | 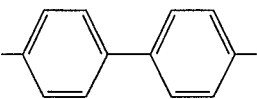 | $SbF_6$ | $(CH_2CF_3\ CH_2CF_3)_2$ |
| (12) | 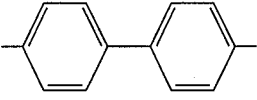 | $ClO_4$ | $(CH_2CF_2CHFCF_3\ CH_2CF_2CHFCF_3)$ |
| (13) | 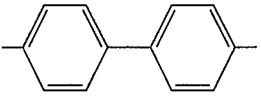 | $AsF_6$ | $(CH_2CF_2CF_3\ CH_2CF_2CF_3)_2\ (n\text{-}C_4H_9\ n\text{-}C_4H_9)_2$ |
| (14) | 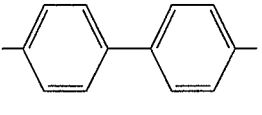 | $CH_3CO$ | $(C_2F_5C_2F_5)\ (\overset{CH_3}{\underset{|}{CHCH_2CH_2CH_2}}\ \overset{CH_3}{\underset{|}{CHCH_2CH_2CH_2}})_3$ |
| (15) | 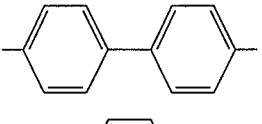 | $ClO_4$ | $(CH_2CF_2CHCFCF_3\ CH_2C_2F_5)_4$ |
| [I]-(C)-(1) | 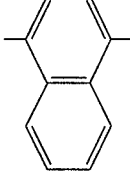 | $SbF_6$ | $(CH_2CH_2F\ CH_2CH_2F)_4$ |
| (2) | 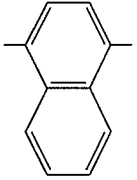 | Br | $(CF_2CF_3\ CF_2CF_3)_4$ |
| (3) | 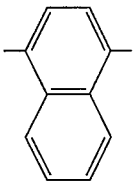 | $ClO_4$ | 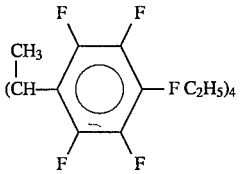 |
| (4) | 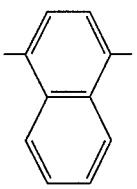 | $AsF_6$ | $(CH_2(CF_2)_2CF_3\ CH_2(CF_2)_2CF_3)_4$ |
| (5) | 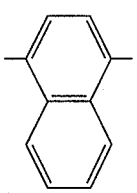 | $SbF_6$ | $(CH_2CH_2CF_2CF_3\ CH_2CH_2CF_2CH_3)_4$ |

-continued

| Compound No. | A | X | $(R_0R_1)$ $(R_2R_3)$ $(R_4R_5)$ $(R_6R_7)$ |
|---|---|---|---|
| (6) | naphthalene | I | $(CH_2CH_2CF_3\ CH_2CH_2CF_3)_4$ |
| (7) | naphthalene | $ClO_4$ | $(CH_2CF_2CHFCF_3\ CH_2CF_2CHFCF_3)_4$ |
| (8) | naphthalene | $AsF_6$ | $(CF_3\ CF_3)_4$ |
| (9) | naphthalene | $CF_3SO_3$ | $(CH_2\text{-}C_6F_4\text{-}CF_2\text{-}C_6F_4\text{-}F)_4$ |
| (10) | naphthalene | $NO_2$ | $(CH_2C_2F_5\ CH_2C_2F_5)_2\ (C_3H_7\ C_3H_7)_2$ |
| (11) | 2-methylnaphthalene | $ClO_4$ | $(CH_2CHF_2\ CH_2CHF_2)_3\ (CH_2OCH_3\ CH_2OCH_3)$ |
| (12) | naphthalene | $SbF_6$ | $(CF_2CF_2OCF_2CF_2)_4$ |
| (13) | naphthalene | $AsF_6$ | $(CH_2CH_2OCF_3\ CH_2CH_2OCF_3)_4$ |

-continued

| Compound No. | A | X | $(R_0R_1)$ $(R_2R_3)$ $(R_4R_5)$ $(R_6R_7)$ |
|---|---|---|---|
| (14) | 1,4-naphthalene | $ClO_4$ | $(CH_2CH_2CF=CF_2\ CH_2CH_2CF=CF_2)_4$ |
| (15) | 2,3,6,7-tetracyanonaphthalene | I | $(n\text{-}C_4F_9\ n\text{-}C_4F_9)_4$ |
| [I]-(D)-(1) | 1,5-naphthalene | Cl | $(n\text{-}C_4F_9\ n\text{-}C_4F_9)_4$ |
| (2) | 1,5-naphthalene | $AsF_6$ | $(CH_2CF_2CF_3\ CH_2CF_2CF_3)_4$ |
| (3) | 1,5-naphthalene | Br | $(CH_2CH_2F\ CH_2CH_2F)_4$ |
| (4) | 1,5-naphthalene | $ClO_4$ | $(CH_2CF_2CHFCF_3\ CH_2CF_2CHFCF_3)_4$ |
| (5) | 1,5-naphthalene | $SbF_6$ | $(CH_2CF_3\ CH_2CF_3)_4$ |

-continued
| Compound No. | A | X | $(R_0R_1)$ $(R_2R_3)$ $(R_4R_5)$ $(R_6R_7)$ |
|---|---|---|---|
| (6) | 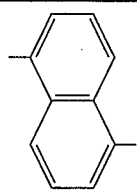 | I | 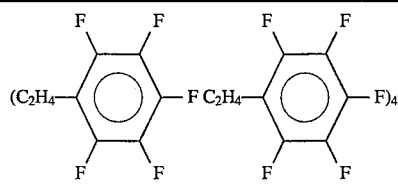 |
| (7) | 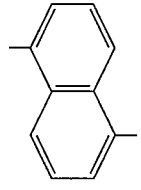 | $ClO_4$ | 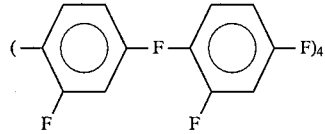 |
| (8) | 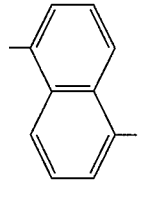 | $AsF_6$ | $(C_3F_7 \ C_3F_7)_4$ |
| (9) | 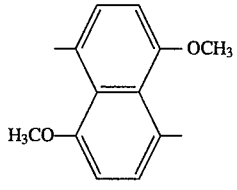 | $SbF_6$ | $(CH_2(CF_2)_4H \ CH_2(CF_2)_4H)_4$ |
| (10) | 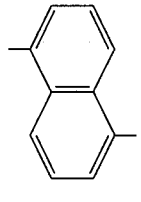 | $ClO_4$ | $\underset{(CH_2CHCH_2CF_3 \ CH_2CHCH_2CF_3)_4}{\overset{CF_3 \quad\quad CF_3}{|\quad\quad\quad |}}$ |
| (11) | 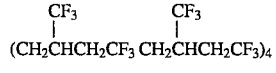 | $NO_2$ | $(CH_2(CF_2)_2CF_3 \ CH_2(CF_2)_2CF_3)_4$ |
| (12) | 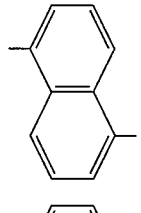 | $CF_3SO_3$ | $(C_3H_6OCF_3 \ C_3H_6OCF_3)_2 \ (CH_2CH_2CH_2CH_2CH_2)_2$ |
| (13) | 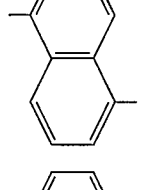 | $ClO_4$ | 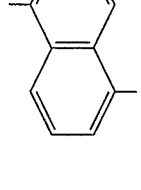 |

-continued

| Compound No. | A | X | $(R_0R_1)$ $(R_2R_3)$ $(R_4R_5)$ $(R_6R_7)$ |
|---|---|---|---|
| (14) | 1,5-naphthalenediyl | I | $(CF_3\ CF_3)\ (C_6H_{13}\ C_6H_{13})_3$ |
| (15) | 1,5-naphthalenediyl | $SbF_6$ | $\underset{(CH-CF_3\ C_2F_5)_4}{\overset{CF_3}{\mid}}$ |
| [I]-(E)-(1) | 1,3-phenylene | Cl | $(CH_2CH_2F\ CH_2CH_2F)_4$ |
| (2) | 1,3-phenylene | $NO_2$ | $(C_3F_7\ C_3F_7)_4$ |
| (3) | 1,3-phenylene | $AsF_6$ | $(CH_2CF_2CHFCF_3\ CH_2CF_2CHFCF_3)_4$ |
| (4) | 1,3-phenylene | $SbF_6$ | $(CH_2C_2F_5\ CH_2C_2F_5)_4$ |
| (5) | 1,3-phenylene | $ClO_4$ | $(CH_2-C_6F_4-FCH_2-C_6F_4-F)_4$ |
| (6) | 1,3-phenylene | Br | $(CH_2CF_3\ CH_2CF_3)_4$ |
| (7) | 1,3-phenylene | $ClO_4$ | $(n\text{-}C_4F_9\ n\text{-}C_4F_9)_4$ |
| (8) | 1,3-phenylene | $SbF_6$ | $(C_2F_5\ C_2F_5)_2\ (C_2H_5\ C_2H_5)_2$ |
| (9) | 1,3-phenylene | $CH_3\text{-}C_6H_4\text{-}SO_3$ | $\underset{(CHCH_2CH_2CH_2CH)_4}{\overset{CF_3\quad\quad CF_3}{\mid\quad\quad\mid}}$ |

-continued

| Compound No. | A | X | $(R_0R_1)$ $(R_2R_3)$ $(R_4R_5)$ $(R_6R_7)$ |
|---|---|---|---|
| (10) | *m-phenylene* | I | $(CF_2CF_2OCF_2CF_2)_4$ |
| (11) | *m-phenylene* | $ClO_4$ | $(CF_2CH=CH_2\ CF_2CH=CH_2)_4$ |
| (12) | *m-phenylene* | $AsF_6$ | $(\text{2,6-difluoro-4-CF}_3\text{-phenyl})_4$ |
| (13) | *m-phenylene* | $SbF_6$ | $(CH_2CH_2F\ CH_2CH_2F)_4$ |
| (14) | *5-methyl-m-phenylene* | Br | $((CF_2)_7CF_3\ (CF_2)_7CF_3)_4$ |
| (15) | *m-phenylene* | $ClO_4$ | $(CH_2CF_3\ CH_2CF_3)_4$ |
| [II]-(A)-(1) | *p-quinoid* | $ClO_4$ | $(CH_2CH_2F\ CH_2CH_2F)_4$ |
| (2) | *p-quinoid* | $CH_3\text{-}C_6H_4\text{-}SO_3$ | $(CH_2CF_2CHFCF_3\ CH_2CF_2CHFCF_3)_4$ |
| (3) | *p-quinoid* | $SbF_6$ | $(CH_2(CF_2)_4H\ CH_2(CF_2)_4H)_4$ |
| (4) | *p-quinoid* | $ClO_4$ | $(CH_2(CF_2)_2CF_3\ CH_2(CF_2)_2CF_3)_4$ |
| (5) | *p-quinoid* | Cl | $(CF_2CF_2CH_3\ CF_2CF_2CH_3)_4$ |
| (6) | *p-quinoid* | $NO_2$ | $(CH_2\text{-}C_6H_4\text{-}CF_3CH_2\text{-}C_6H_4\text{-}CF_3)_4$ |

-continued
| Compound No. | A | X | $(R_0R_1)$ $(R_2R_3)$ $(R_4R_5)$ $(R_6R_7)$ |
|---|---|---|---|
| (7) | 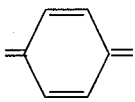 | $AsF_6$ | 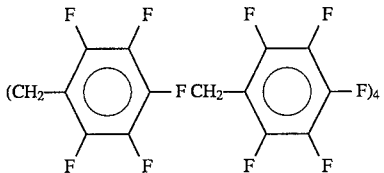 |
| (8) | 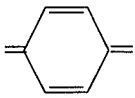 | $SbF_6$ | $(CH_2CF_3\ CH_2CF_3)_4$ |
| (9) | 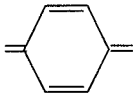 | $AsF_6$ | $(CH_2C_2F_5\ CH_2C_2F_5)_4$ |
| (10) | 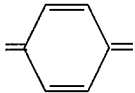 | $ClO_4$ | 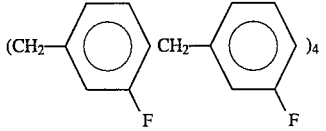 |
| (11) | 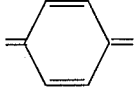 | I | $((CF_2)_7CF_3\ (CF_2)_7CF_3)_4$ |
| (12) | 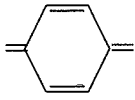 | $NO_2$ | $((CF_2)_3CF_3\ (CF_2)_3CF_3)_4$ |
| (13) | 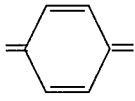 | $CH_3SO_3$ | $(C_2F_5\ C_2F_5)_4$ |
| (14) | 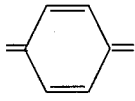 | $AsF_6$ | $(C_3F_7\ C_3H_7)\ (C_3H_7\ C_3H_7)_3$ |
| (15) | 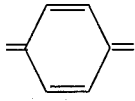 | Cl | $(CH_2CH_2CF_3\ CH_2CH_2CF_3)_2\ (C_2H_4OCH_3\ C_2H_4OCH_3)_2$ |
| [II]-(A)-(16) | 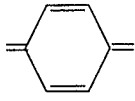 | $ClO_4$ | $(C_2H_4OCF_3\ C_2H_4OCF_3)_4$ |
| (17) | 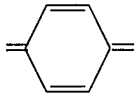 | I | $(CF=CF_2\ CF=CF_2)_4$ |
| (18) | 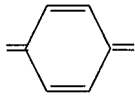 | $AsF_6$ | $(CH_2CH_2CF=CF_2\ CH_2CH_2CF=CF_2)_4$ |
| (19) | 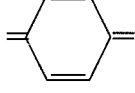 | Br | 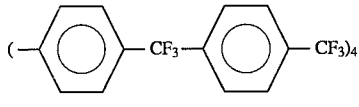 |

-continued

| Compound No. | A | X | $(R_0R_1)$ $(R_2R_3)$ $(R_4R_5)$ $(R_6R_7)$ |
|---|---|---|---|
| (20) | (cyclohexadiene) | $SbF_6$ | $(CF_2CF_2OCF_2CF_3\ CF_2CF_2OCF_2CF_3)_4$ |
| (21) | (cyclohexadiene) | $NO_2$ | $(CF_2CF_2CF_2CF_2)_4$ |
| (22) | (cyclohexadiene) | $ClO_4$ | $\underset{(CHCH_2CH_2CH)_4}{\overset{CF_3\quad\ CF_3}{\mid\qquad\ \mid}}$ |
| (23) | (cyclohexadiene) | Cl | $(C_2H_4OC_2F_5\ C_2H_4OC_2F_5)_4$ |
| (24) | (cyclohexadiene) | $ClO_4$ | $\underset{(CH_2CHF\ CH_2CHF)_4}{\overset{OH\quad\ OH}{\mid\qquad\ \mid}}$ |
| (25) | (cyclohexadiene) | $AsF_6$ | $(CH_2CF_2CF_2OCH_3\ CH_2CF_2CF_2OCH_3)_4$ |
| (26) | (cyclohexadiene) | $CH_3-\!\!\bigcirc\!\!-SO_3$ | $(CH_2CF_2CF_2H\ CH_2CH_2CF_2H)_4$ |
| (27) | (cyclohexadiene) | $SbF_6$ | $\underset{(CH_2CH-CF_3\ CH_2CH-CF_3)_4}{\overset{CF_3\qquad\qquad\ CF_3}{\mid\qquad\qquad\ \mid}}$ |
| (28) | (cyclohexadiene with $CH_3$, $CH_3$) | $ClO_4$ | $(CH_2CF_3\ CH_2CF_3)_4$ |
| (29) | (cyclohexadiene with Cl) | $SbF_6$ | $(CH_2CHF_2\ CH_2CHF_2)_4$ |
| (30) | (cyclohexadiene with CN) | $AsF_6$ | $(C_3F_7\ C_3F_7)_4$ |
| [II]-(B)-(1) | (biphenyl diquinoid) | $ClO_4$ | $(CH_2\!\!-\!\!\bigcirc\!\!-\!\!CF_3CH_2\!\!-\!\!\bigcirc\!\!-\!\!CF_3)_4$ |
| (2) | (biphenyl diquinoid) | I | $(CF_3\ CF_3)\ (C_6H_{13}\ C_6H_{13})_3$ |

-continued

| Compound No. | A | X | $(R_0R_1)\ (R_2R_3)\ (R_4R_5)\ (R_6R_7)$ |
|---|---|---|---|
| (3) | biphenyl-quinoid | $SbF_6$ | $(CH{-}CF_3\ C_2F_5)_4$ with $CF_3$ branch |
| (4) | biphenyl-quinoid | $AsF_6$ | $(CH_2CF_2CF_3\ CH_2CF_2CF_3)_4$ |
| (5) | biphenyl-quinoid | Br | $(CH_2CH_2F\ CH_2CH_2F)_4$ |
| (6) | biphenyl-quinoid | $ClO_4$ | $(CH_2CF_2CHFCF_3\ CH_2CF_2CHFCF_3)_4$ |
| (7) | biphenyl-quinoid | $SbF_6$ | $(CH_2CF_3\ CH_2CF_3)_4$ |
| (8) | biphenyl-quinoid | I | $(C_2H_4{-}C_6F_5\ C_2H_4{-}C_6F_5)_4$ |
| (9) | biphenyl-quinoid | $ClO_4$ | $(\text{-}C_6H_3F{-}C_6H_3F_2)_4$ |
| (10) | biphenyl-quinoid | $AsF_6$ | $(C_3F_7\ C_3F_7)_4$ |
| (11) | biphenyl-quinoid | $SbF_6$ | $(CH_2(CF_2)_4H\ CH_2(CF_2)_4H)_4$ |
| (12) | biphenyl-quinoid | $ClO_4$ | $(CH_2CHCH_2CF_3\ CH_2CHCH_2CF_3)_4$ with $CF_3$ branches |
| (13) | biphenyl-quinoid with Cl substituents | $NO_2$ | $(CH_2(CF_2)_2CF_3\ CH_2(CF_2)_2CF_3)_4$ |
| [II]-(C)-(1) | naphthoquinoid | $SbF_6$ | $(CH_2CF_2\ CH_2CF_3)_4$ |

-continued

| Compound No. | A | X | $(R_0R_1)$ $(R_2R_3)$ $(R_4R_5)$ $(R_6R_7)$ |
|---|---|---|---|
| (2) | naphthalene | $ClO_4$ | $(CH_2CF_2CHFCF_3\ CH_2CF_2CHFCF_3)_4$ |
| (3) | naphthalene | $AsF_6$ | $(CH_2CF_2CF_3\ CH_2CF_2CF_3)_2\ (n\text{-}C_4H_9\ n\text{-}C_4H_9)_2$ |
| (4) | naphthalene | Cl | $(C_3F_7\ C_3F_7)_4$ |
| (5) | naphthalene | $SbF_6$ | $(CH_2CHF_2\ CH_2CHF_2)_4$ |
| (6) | naphthalene | $AsF_6$ | $(CH_2CF_3CHFCF_3\ CH_2CF_2CHFCF_3)_4$ |
| (7) | naphthalene | $ClO_4$ | $(CH_2(CF_2)_4H\ CH_2(CF_2)_4H)_4$ |
| (8) | naphthalene | Br | $(C_4F_9\ C_4F_9)_4$ |
| (9) | naphthalene | $SbF_6$ | $(C_2F_5\ C_2F_5)_4$ |

-continued

| Compound No. | A | X | $(R_0R_1)$ $(R_2R_3)$ $(R_4R_5)$ $(R_6R_7)$ |
|---|---|---|---|
| (10) | naphthalene | $CH_3SO_3$ | $(CF_2CF_2CH_3\ CF_2CF_2CH_3)_4$ |
| (11) | 2,3-dichloro-decahydronaphthalene | $ClO_4$ | $(CH{-}CF_3\ CH{-}CF_3)_4$ with $CF_3$ substituents |
| (12) | naphthalene | I | $(CH_2{-}C_6F_4{-}FCH_2{-}C_6F_4{-}F)_4$ |
| (13) | naphthalene | $BF_4$ | $(CH_2{-}C_6H_3(CF_3)_2\ CH_2{-}C_6H_3(CF_3)_2)_4$ |
| [II]-(D)-(1) | naphthalene | $SbF_6$ | $(CH_2CH_2F\ CH_2CH_2F)_4$ |
| (2) | naphthalene | Br | $(CF_2CF_3\ CF_2CF_3)_4$ |
| (3) | naphthalene | $AsF_6$ | $(CF_3\ CF_3)_4$ |
| (4) | naphthalene | $CF_3SO_3$ | $(CH_2{-}C_6F_4{-}FCH_2{-}C_6F_4{-}F)_4$ |

-continued

| Compound No. | A | X | $(R_0R_1)$ $(R_2R_3)$ $(R_4R_5)$ $(R_6R_7)$ |
|---|---|---|---|
| (5) | naphthalene | $NO_2$ | $(CH_2C_2F_5\ CH_2C_2F_5)_2\ (C_3H_7\ C_3H_7)_2$ |
| (6) | naphthalene | $ClO_4$ | $(CH_2CHF_2\ CH_2CHF_2)_3\ (CH_2OCH_3\ CH_2OCH_3)$ |
| (7) | naphthalene | $SbF_6$ | $(CF_2CF_2OCF_2CF_2)_4$ |
| (8) | naphthalene | $AsF_6$ | $(CH_2CH_2OCF_3\ CH_2CH_2OCF_3)_4$ |
| (9) | naphthalene | $ClO_4$ | $(CH_2CH_2CF{=}CF_2\ CH_2CH_2CF{=}CF_2)_4$ |
| (10) | naphthalene | I | $(n\text{-}C_4F_9\ n\text{-}C_4F_9)_4$ |
| (11) | naphthalene | $AsF_6$ | $(CH_2(CF_2)_2CF_3\ CH_2(CF_2)_2CF_3)_4$ |
| (12) | naphthalene | $SbF_6$ | $(CH_2CH_2CF_2CF_3\ CH_2CH_2CF_2CF_3)_4$ |

-continued

| Compound No. | A | X | $(R_0R_1) (R_2R_3) (R_4R_5) (R_6R_7)$ |
|---|---|---|---|
| (13) | ![structure with 4 CN groups on naphthalene] | I | $(CH_2CH_2CF_3\ CH_2CH_2CF_3)_4$ |
| (14) | ![structure with 2 Cl groups on naphthalene] | $ClO_4$ | $(CH_2CF_2CHFCF_3\ CH_2CF_2CHFCF_3)_4$ |

The infrared-absorptive compounds of the present invention, represented by formulas (I) and (II) can be synthesized by the methods disclosed in U.S. Pat. Nos. 3,251,881, 3,575, 871 and 3,484,467 and Japanese Patent Application Laid-Open No. 61-69991. For example, they can be synthesized according to the following scheme.

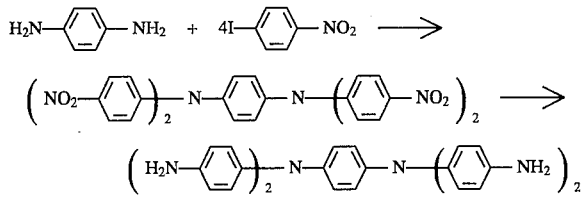

The amino compound obtained by the above Ullmann reaction and reduction reaction is subjected to selective substitution to substitute the hydrogen atom(s) with the RF or other organic residual Group(s) by alkylation, alkenylation or aralkylation, followed by oxidation reaction to give the end product.

Stated more specifically, for example, in the course of the above alkylation, the amino compound obtained by the above reaction is reacted with an 8-fold amount of 2,2,2-trifluoroethyl iodide, whereby an alkylated intermediate product is obtained. This product is further oxidized by silver salt oxidation or electrolytic oxidation to obtain the end product.

In an instance in which $R_0$ to $R_7$ are asymmetrically formed, the selective substitution must be multi-stepwise carried out. In view of cost, $R_0$ to $R_7$ may preferably be the same.

In the course of the alkylation, for example, an alkylating agent capable of forming in combination of $R_0$ and $R_1$ a heterocyclic ring together with a nitrogen atom and also having a fluorine atom, stated more specifically, 1,4-dibromobutane or the like having a fluorine atom is used, whereby a heterocyclic ring having a fluorine atom can be formed in the combination of $R_0$ and $R_1$.

The above infrared-absorptive compounds of the present invention have a maximum absorption wavelength of 900 nm or more and an absorptivity coefficient of from several tens of thousands to hundred and several tens of thousands, showing a great absorption peak.

Such compounds can be used in thermal insulating films, sunglasses, etc.

Next, the infrared-absorptive compound according to a second embodiment of the present invention is a compound represented by the following formula (III) or (IV).

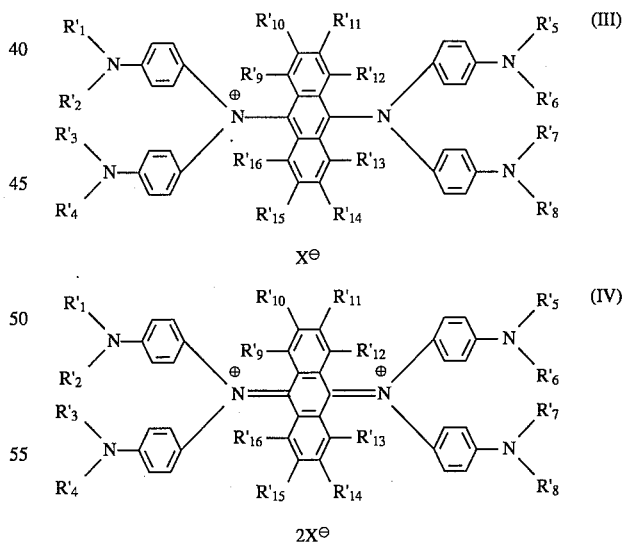

In formulas (III) and (IV), $R'_1$ to $R'_{16}$ each represent a hydrogen atom or a monovalent organic residual group.

The monovalent organic residual group may include those exemplified by a substituted or unsubstituted alkyl group, a substituted or unsubstituted alkenyl group, a substituted or unsubstituted aryl group, a substituted or unsubstituted aralkyl group and also an alkynyl group. For example, the unsubstituted alkyl group may include those exemplified by a methyl group, an ethyl group, a n-propyl group, an iso-propyl group, a n-butyl group, an iso-butyl group, a t-butyl group, a n-amyl group, a t-amyl group, a n-hexyl group, a n-octyl group and a t-octyl group. The substituted alkyl group may include, for example, halogenated alkyl groups such as a 2-chloroethyl group and a 2-chloropropyl group, hydroxyalkyl groups such as a 2-hydroxyethyl group, a 3-hydroxypropyl group and a 4-hydroxybutyl group, acetoxy alkyl groups such as a 2-acetoxyethyl group and 2-acetoxypropyl group, carboxyalkyl groups such as a carboxymethyl group, a 2-carboxyethyl group end a 3-carboxypropyl group, and alkoxyalkyl groups such as a methoxymethyl group, a methoxyethyl group, a methoxypropyl group, a methoxybutyl group, an ethoxymethyl group, an ethoxyethyl group, an ethoxypropyl group, an ethoxybutyl group and a propoxymethyl group. The alkenyl group may include those exemplified by a vinyl group, a propenyl group, a butenyl group, a pentenyl group, a hexenyl group, a heptenyl group and an octenyl group, and also any of these alkenyl groups whose hydrogen atom has been substituted with a halogen atom, a hydroxyl group, an acetoxyl group, a carboxyl group or an alkoxyl group. The aralkyl group may include those exemplified by a benzyl group, a 2-methylbenzyl group, a p-phenylmethyl group, a 2-phenylpropyl group, a 3-phenylpropyl group, an α-naphthylmethyl group and a β-naphthylethyl group, and also any of these aralkyl groups whose hydrogen atom has been substituted with a halogen atom as exemplified by a p-chlorobenzyl group, and any of these aralkyl groups whose hydrogen atom has been substituted with a hydroxyl group, an acetoxyl group, a carboxyl group or an alkoxyl group. The substituted or unsubstituted aryl group may include those exemplified by a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group, a dimethoxymethylaminophenyl group and a ditolylaminophenyl group. The alkynyl group may include those exemplified by a propagyl group, a butynyl group, a pentynyl group and a hexynyl group.

$R'_1$ to $R'_{16}$ may be the same or may be different one another.

$R'_1$ to $R'_8$ may be in at least one combination of combinations $R'_1$ and $R'_2$, $R'_3$ and $R'_4$, $R'_5$ and $R'_6$ and $R'_7$ and $R'_8$, a group of atoms necessary to form a substituted or unsubstituted 5-membered ring, a substituted or unsubstituted 6-membered ring or a substituted or unsubstituted 7-membered ring together with a nitrogen atom. The 5-membered ring may include, for example, a pyrrolidine ring, the 6-membered ring may include a piperidine ring, a morpholine ring and a tetrahydropyridine group, and the 7-membered ring may include the cylcohexylamine ring represented by formula (VII) previously described. Of the substituents $R'_1$ to $R'_8$, two or more of the above combinations may be made to have the heterocyclic structure described above, and in such an instance, the structure may be the same or different from each other.

As for $R'_9$ to $R'_{16}$, they may be in at least one combination of combinations $R'_9$ and $R'_{10}$, $R'_{10}$ and $R'_{11}$, $R'_{11}$ and $R'_{12}$, $R'_{13}$ and $R'_{14}$, $R'_{14}$ and $R'_{15}$ and $R'_{15}$ and $R'_{16}$, a group of atoms necessary to form a condensed ring. Here, the condensed ring may include aromatic rings as exemplified by a benzene ring, a naphthalene ring, a chlorobenzene ring, a bromobenzene ring, a methylbenzene ring, an ethylbenzene ring, a methoxybenzene ring and an ethoxybenzene ring, heterocyclic rings as exemplified by a furan ring, a benzofuran ring, a pyrrole ring, a thiophene ring, a pyridine ring, a quinoline ring and a thiazole ring, and aliphatic rings as exemplified by a dimethylene ring, a trimethylene ring and a tetramethylene ring.

The infrared-absorptive compounds represented by formulas (III) and (IV) described above can bring about a much more improvement in heat resistance than the conventional aminium salt compounds or diimonium salt compounds. The reason why the infrared-absorptive compounds represented by formulas (III) and (IV) show superior heat resistance is unclear. It is presumed that the central skeleton of the compound, formed of a rigid polycyclic aromatic ring such as the anthracene ring contributes the greater improvement in heat resistance.

Incidentally, in the infrared-absorptive compounds represented by formulas (III) and (IV), at least one of $R'_1$ to $R'_8$ may be an alkoxyalkyl group or any of the $R'_9$ to $R'_{16}$ substituted on the central skeleton anthracene ring may be a hydrogen atom, a substituted or unsubstituted alkyl group having 1 to 5 carbon atoms as exemplified by a methyl group, an ethyl group, a propyl group, a t-butyl group, a methoxyethyl group or an ethoxyethyl group, a substituted or unsubstituted alkoxyl group having 1 to 5 carbon atoms as exemplified by a methoxy group, an ethoxy group, a propoxy group or a butoxy group, a halogen atom as exemplified by fluorine, chlorine, bromine or iodine, a hydroxy group, or a cyano group. In such an instance, the heat resistance of the infrared-absorptive compounds can be improved and also the solvent solubility thereof can be improved.

The heat resistance and solvent solubility of the infrared-absorptive compounds can also be improved when among $R'_9$ to $R'_{16}$, any of combinations $R'_9$ and $R'_{10}$, $R'_{10}$ and $R'_{11}$, $R'_{11}$ and $R'_{12}$, $R'_{12}$ and $R'_{13}$, $R'_{13}$ and $R'_{14}$, $R'_{14}$ and $R'_{15}$ and $R'_{15}$ and $R'_{16}$ forms a condensed ring and a combination or combinations $R'_{10}$ and $R'_{11}$ and/or $R'_{14}$ and $R'_{15}$ form(s) a benzene ring.

$X^\ominus$ represents the same anionic residual group as previously described.

Examples of the infrared-absorptive compounds of formulas (III) and (IV) according to the present invention are shown below. In the present invention, examples are by no means limited to these.

The following exemplary compounds (III)-(1) to (IV)-(35) are set out in the manner simplified as follows:

For example, in the infrared-absorptive compounds of formulas (III) and (IV), compounds having the following structures (D) and (E) are respectively indicated as shown below.

(D) 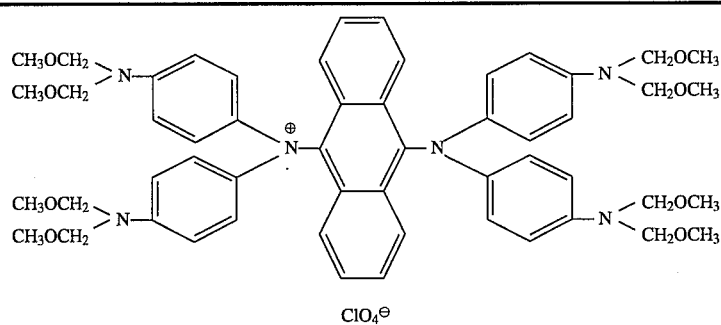
ClO4⊖
(E) 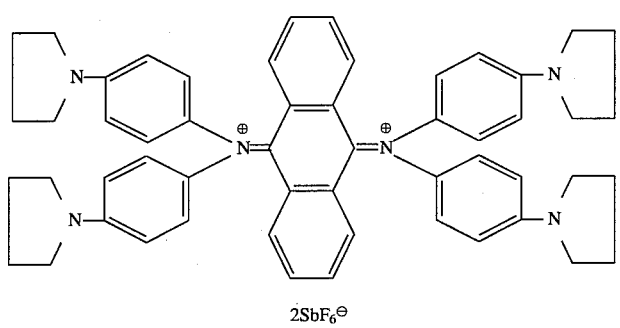
2SbF6⊖
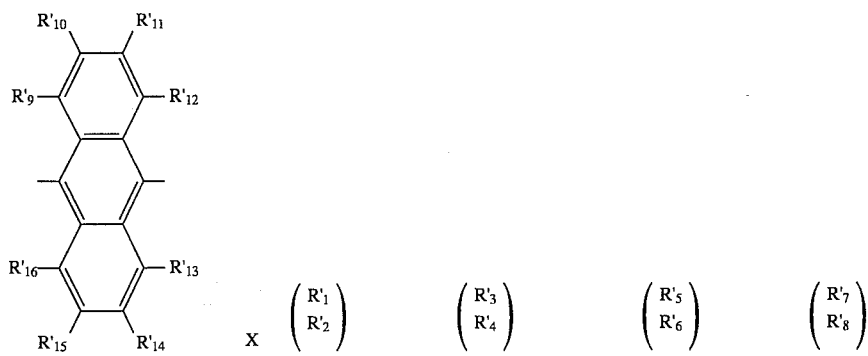
| Compound No. | | X | $\begin{pmatrix} R'_1 \\ R'_2 \end{pmatrix}$ | $\begin{pmatrix} R'_3 \\ R'_4 \end{pmatrix}$ | $\begin{pmatrix} R'_5 \\ R'_6 \end{pmatrix}$ | $\begin{pmatrix} R'_7 \\ R'_8 \end{pmatrix}$ |
|---|---|---|---|---|---|---|
| (D) | anthracene | ClO4 | CH2OCH3<br>CH2OCH3 | CH2OCH3<br>CH2OCH3 | CH2OCH3<br>CH2OCH3 | CH2OCH3<br>CH2OCH3 |
| (E) | anthracene | SbF6 | CH2CH2CH2CH2 | CH2CH2CH2CH2 | CH2CH2CH2CH2 | CH2CH2CH2CH2 |

| Compound No. | Structure | X | $\begin{pmatrix} R'_1 \\ R'_2 \end{pmatrix}$ | $\begin{pmatrix} R'_3 \\ R'_4 \end{pmatrix}$ | $\begin{pmatrix} R'_5 \\ R'_6 \end{pmatrix}$ | $\begin{pmatrix} R'_7 \\ R'_8 \end{pmatrix}$ |
|---|---|---|---|---|---|---|
| [III]-(1) | naphthacene with R'9–R'16 | ClO4 | CH2OCH3, CH2OCH3 | CH2OCH3, CH2OCH3 | CH2OCH3, CH2OCH3 | CH2OCH3, CH2OCH3 |
| [III]-(2) | 9,10-dimethylanthracene | BF4 | C2H5, C2H5 | C2H5, C2H5 | C2H5, C2H5 | C2H5, C2H5 |

-continued

| ID | Structure | Anion | R1 | R2 | R3 | R4 |
|---|---|---|---|---|---|---|
| [III]-(3) | 9,10-dimethylanthracene | SbF$_6$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [III]-(4) | 9,10-dimethylanthracene | Br | CH$_3$—CH$_2$CHC$_2$H$_5$, CH$_3$—CH$_2$CHC$_2$H$_5$ | CH$_3$—CH$_2$CHC$_2$H$_5$, CH$_3$—CH$_2$CHC$_2$H$_5$ | CH$_3$—CH$_2$CHC$_2$H$_5$, CH$_3$—CH$_2$CHC$_2$H$_5$ | CH$_3$—CH$_2$CHC$_2$H$_5$, CH$_3$—CH$_2$CHC$_2$H$_5$ |
| [III]-(5) | 9,10-dimethylanthracene | ClO$_4$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [III]-(6) | 9,10-dimethylanthracene | SbF$_6$ | iso-C$_3$H$_7$, iso-C$_3$H$_7$ | iso-C$_3$H$_7$, iso-C$_3$H$_7$ | iso-C$_3$H$_7$, iso-C$_3$H$_7$ | iso-C$_3$H$_7$, iso-C$_3$H$_7$ |

-continued

| | | | | | |
|---|---|---|---|---|---|
| [III]-(7) | 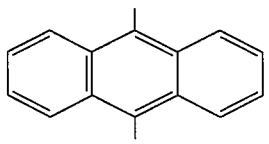 | CH$_3$SO$_4$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ |
| [III]-(8) | 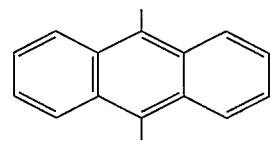 | ClO$_4$ | CH$_2$CH=CH$_2$, CH$_2$CH=CH$_2$ | CH$_2$CH=CH$_2$, CH$_2$CH=CH$_2$ | CH$_2$CH=CH$_2$, CH$_2$CH=CH$_2$ | CH$_2$CH=CH$_2$, CH$_2$CH=CH$_2$ |
| [III]-(9) | 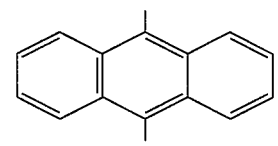 | AsF$_6$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ |

-continued

| | | | | | |
|---|---|---|---|---|---|
| [III]-(10) | [anthracene structure] | ClO$_4$ | n-C$_4$H$_9$, n-C$_4$H$_9$ | n-C$_4$H$_9$, n-C$_4$H$_9$ | n-C$_4$H$_9$, n-C$_4$H$_9$ | n-C$_4$H$_9$, n-C$_4$H$_9$ |
| [III]-(11) | [anthracene structure] | Cl | n-C$_{10}$H$_{21}$, n-C$_{10}$H$_{21}$ | n-C$_{10}$H$_{21}$, n-C$_{10}$H$_{21}$ | n-C$_{10}$H$_{21}$, n-C$_{10}$H$_{21}$ | n-C$_{10}$H$_{21}$, n-C$_{10}$H$_{21}$ |
| [III]-(12) | [anthracene structure] | ClO$_4$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ |
| [III]-(13) | [anthracene structure] | ClO$_4$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ |

-continued

| | | | | | |
|---|---|---|---|---|---|
| [III]-(14) | ![anthracene] | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_4$OCH$_3$, C$_2$H$_4$OCH$_3$ | C$_2$H$_4$OCH$_3$, C$_2$H$_4$OCH$_3$ |
| [III]-(15) | ![anthracene] | 4-CH$_3$-C$_6$H$_4$-SO$_3$ | n-C$_3$H$_7$, n-C$_3$H$_7$ | n-C$_4$H$_9$, n-C$_4$H$_9$ | n-C$_3$H$_7$, n-C$_3$H$_7$ | n-C$_4$H$_9$, n-C$_4$H$_9$ |
| [III]-(16) | ![anthracene] | SbF$_6$ | CH$_2$CH$_2$CH$_2$CH$_2$ | CH$_2$CH$_2$CH$_2$CH$_2$ | CH$_2$CH$_2$CH$_2$CH$_2$ | CH$_2$CH$_2$CH$_2$CH$_2$ |

| | | | | | |
|---|---|---|---|---|---|
| [III]-(17) | ClO$_4$ | CH$_3$—CHCH$_2$CH$_2$ | CH$_3$—CHCH$_2$CH$_2$ | CH$_3$—CHCH$_2$CH$_2$ | CH$_3$—CHCH$_2$CH$_2$ |
| [III]-(18) | ClO$_4$ | CH$_2$CH$_2$OCH$_2$CH$_2$ | CH$_2$CH$_2$OCH$_2$CH$_2$ | CH$_2$CH$_2$OCH$_2$CH$_2$ | CH$_2$CH$_2$OCH$_2$CH$_2$ |
| [III]-(19) | NO$_3$ | CH$_2$CH$_2$CH$_2$CH$_2$ | CH$_2$CH$_2$CH$_2$CH$_2$ | CH$_2$CH$_2$CH$_2$CH$_2$ | CH$_2$CH$_2$CH$_2$CH$_2$ |

-continued

| | | | | | |
|---|---|---|---|---|---|
| [III]-(20) | anthracene | SbF$_6$ | CH=C(CH$_3$)—CH$_2$C(CH$_3$)$_2$CH$_2$ | CH=C(CH$_3$)—CH$_2$C(CH$_3$)$_2$CH$_2$ | CH=C(CH$_3$)—CH$_2$C(CH$_3$)$_2$CH$_2$ | CH=C(CH$_3$)—CH$_2$C(CH$_3$)$_2$CH$_2$ |
| [III]-(21) | anthracene | ClO$_4$ | n-C$_3$H$_7$, n-C$_3$H$_7$ | n-C$_3$H$_7$, n-C$_3$H$_7$ | n-C$_5$H$_{11}$, n-C$_5$H$_{11}$ | n-C$_5$H$_{11}$, n-C$_5$H$_{11}$ |
| [III]-(22) | anthracene | I | C$_3$H$_7$OH, C$_3$H$_7$OH | C$_3$H$_7$OH, C$_3$H$_7$OH | C$_3$H$_7$OH, C$_3$H$_7$OH | C$_3$H$_7$OH, C$_3$H$_7$OH |
| [III]-(23) | anthracene | ClO$_4$ | C$_2$H$_5$, C$_3$H$_7$ | C$_2$H$_5$, C$_3$H$_7$ | C$_2$H$_5$, C$_3$H$_7$ | C$_2$H$_5$, C$_3$H$_7$ |

-continued
| | | | | | |
|---|---|---|---|---|---|
| [III]-(24)  | Br | C₂H₅<br>CHCH₂CH₃,<br>C₂H₅<br>CH₂CHC₃H₇ | n-C₅H₁₁,<br>n-C₅H₁₁ | n-C₅H₁₁,<br>n-C₅H₁₁ | n-C₅H₁₁,<br>n-C₅H₁₁ |
| [III]-(25)  | SbF₆ | CH₃<br>CHCH₂CH₂CH₂ | CH₃<br>CHCH₂CH₂CH₂ | CH₃<br>CHCH₂CH₂CH₂ | CH₃<br>CHCH₂CH₂CH₂ |
| [III]-(26) 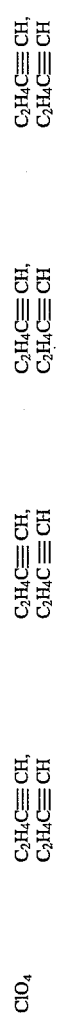 | ClO₄ | C₂H₄C≡CH,<br>C₂H₄C≡CH | C₂H₄C≡CH,<br>C₂H₄C≡CH | C₂H₄C≡CH,<br>C₂H₄C≡CH | C₂H₄C≡CH,<br>C₂H₄C≡CH |

| | | | | | |
|---|---|---|---|---|---|
| [III]-(27) | anthracene | I | C₃H₆C≡CH, C₃H₆C≡CH | C₃H₆C≡CH, C₃H₆C≡CH | C₃H₆C≡CH, C₃H₆C≡CH | C₃H₆C≡CH, C₃H₆C≡CH |
| [III]-(28) | anthracene | SbF₆ | n-C₃H₇, n-C₃H₇ | n-C₃H₇, n-C₃H₇ | n-C₃H₇, n-C₃H₇ | n-C₃H₇, n-C₃H₇ |
| [III]-(29) | anthracene | ClO₄ | C₆H₄Cl, C₆H₄Cl | C₆H₄Cl, C₆H₄Cl | C₆H₄Cl, C₆H₄Cl | C₆H₄Cl, C₆H₄Cl |
| [III]-(30) | anthracene | AsF₆ | n-C₃H₇, n-C₃H₇ | n-C₃H₇, n-C₃H₇ | n-C₃H₇, n-C₃H₇ | n-C₃H₇, n-C₃H₇ |

-continued

| | | | | | |
|---|---|---|---|---|---|
| [III]-(31) | anthracene | ClO$_4$ | CH$_3$—CHCH$_2$CH$_3$, CH$_3$—CHCH$_2$CH$_3$ | CH$_3$—CHCH$_2$CH$_3$, CH$_3$—CHCH$_2$CH$_3$ | CH$_3$—CHCH$_2$CH$_3$, CH$_3$—CHCH$_2$CH$_3$ |
| [III]-(32) | anthracene | BF$_4$ | CH$_3$, CH$_3$ | CH$_3$, CH$_3$ | CH$_3$, CH$_3$ |
| [III]-(33) | anthracene | Br | C$_2$H$_4$Cl, C$_2$H$_4$Cl | C$_2$H$_4$Cl, C$_2$H$_4$Cl | C$_2$H$_4$Cl, C$_2$H$_4$Cl |

-continued
| | | | | | | |
|---|---|---|---|---|---|---|
| [III]-(34) | 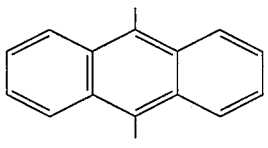 | ClO$_4$ | CH=C(CH$_3$)—CH$_2$C(CH$_3$)$_2$CH$_2$ | CH=C(CH$_3$)—CH$_2$C(CH$_3$)$_2$CH$_2$ | CH=C(CH$_3$)—CH$_2$C(CH$_3$)$_2$CH$_2$ | CH=C(CH$_3$)—CH$_2$C(CH$_3$)$_2$CH$_2$ |
| [III]-(35) | 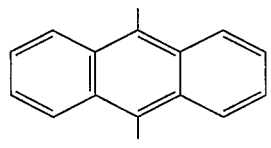 | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_5$, C$_2$H$_5$ | C$_2$H$_5$, C$_2$H$_5$ |
| [III]-(36) | 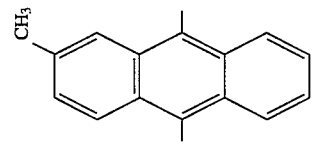 | ClO$_4$ | CH$_2$OCH$_3$, CH$_2$OCH$_3$ | CH$_2$OCH$_3$, CH$_2$OCH$_3$ | CH$_2$OCH$_3$, CH$_2$OCH$_3$ | CH$_2$OCH$_3$, CH$_2$OCH$_3$ |

-continued

| | | | | | |
|---|---|---|---|---|---|
| [IV]-(1) | 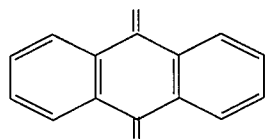 | ClO$_4$ | CH$_2$OCH$_3$, CH$_2$OCH$_3$ | CH$_2$OCH$_3$, CH$_2$OCH$_3$ | CH$_2$OCH$_3$, CH$_2$OCH$_3$ | CH$_2$OCH$_3$, CH$_2$OCH$_3$ |
| [IV]-(2) | 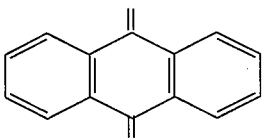 | BF$_4$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [IV]-(3) | 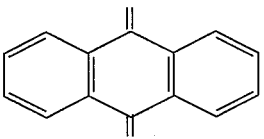 | SbF$_6$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [IV]-(4) | 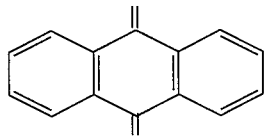 | Cl | CH$_3$–CH$_2$CHC$_2$H$_5$, CH$_3$–CH$_2$CHC$_2$H$_5$ | CH$_3$–CH$_2$CHC$_2$H$_5$, CH$_3$–CH$_2$CHC$_2$H$_5$ | CH$_3$–CH$_2$CHC$_2$H$_5$, CH$_3$–CH$_2$CHC$_2$H$_5$ | CH$_3$–CH$_2$CHC$_2$H$_5$, CH$_3$–CH$_2$CHC$_2$H$_5$ |

-continued
| | | | | | |
|---|---|---|---|---|---|
| [IV]-(5) | ClO$_4$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| | 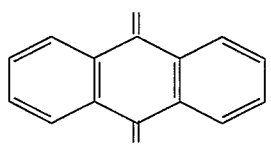 | | | | |
| [IV]-(6) | SbF$_6$ | iso-C$_3$H$_7$, iso-C$_3$H$_7$ | iso-C$_3$H$_7$, iso-C$_3$H$_7$ | iso-C$_3$H$_7$, iso-C$_3$H$_7$ | iso-C$_3$H$_7$, iso-C$_3$H$_7$ |
| | 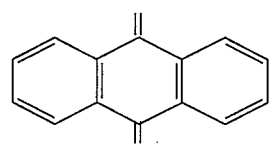 | | | | |
| [IV]-(7) | CH$_3$SO$_4$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ |
| | 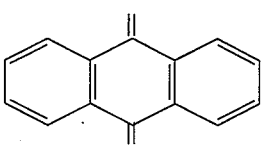 | | | | |

| | | | | |
|---|---|---|---|---|
| [IV]-(8) | ![anthracene] | ClO$_4$ | CH$_2$CH=CH$_2$, CH$_2$CH=CH$_2$ | CH$_2$CH=CH$_2$, CH$_2$CH=CH$_2$ | CH$_2$CH=CH$_2$, CH$_2$CH=CH$_2$ | CH$_2$CH=CH$_2$, CH$_2$CH=CH$_2$ |
| [IV]-(9) | ![anthracene] | AsF$_6$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ |
| [IV]-(10) | ![anthracene] | ClO$_4$ | n-C$_4$H$_9$, n-C$_4$H$_9$ | n-C$_4$H$_9$, n-C$_4$H$_9$ | n-C$_4$H$_9$, n-C$_4$H$_9$ | n-C$_4$H$_9$, n-C$_4$H$_9$ |
| [IV]-(11) | ![anthracene] | Cl | n-C$_{10}$H$_{21}$, n-C$_{10}$H$_{21}$ | n-C$_{10}$H$_{21}$, n-C$_{10}$H$_{21}$ | n-C$_{10}$H$_{21}$, n-C$_{10}$H$_{21}$ | n-C$_{10}$H$_{21}$, n-C$_{10}$H$_{21}$ |

-continued

| | | | | | | |
|---|---|---|---|---|---|---|
| [IV]-(12) | (anthracene) | ClO$_4$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ |
| [IV]-(13) | (anthracene) | ClO$_4$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ |
| [IV]-(14) | (anthracene) | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_4$OCH$_3$, C$_2$H$_4$OCH$_3$ | C$_2$H$_4$OCH$_3$, C$_2$H$_4$OCH$_3$ |

| ID | Structure | Anion | R1 | R2 | R3 | R4 |
|---|---|---|---|---|---|---|
| [IV]-(15) | anthracene | 4-CH₃-C₆H₄-SO₃ | n-C₃H₇, n-C₃H₇ | n-C₄H₉, n-C₄H₉ | n-C₃H₇, n-C₃H₇ | n-C₄H₉, n-C₄H₉ |
| [IV]-(16) | anthracene | $SbF_6$ | $CH_2CH_2CH_2CH_2$ | $CH_2CH_2CH_2CH_2$ | $CH_2CH_2CH_2CH_2$ | $CH_2CH_2CH_2CH_2$ |
| [IV]-(17) | anthracene | $ClO_4$ | $\underset{\text{CHCH}_2\text{CH}_2}{\text{CH}_3}$ | $\underset{\text{CHCH}_2\text{CH}_2}{\text{CH}_3}$ | $\underset{\text{CHCH}_2\text{CH}_2}{\text{CH}_3}$ | $\underset{\text{CHCH}_2\text{CH}_2}{\text{CH}_3}$ |
| [IV]-(18) | anthracene | $ClO_4$ | $CH_2CH_2OCH_2CH_2$ | $CH_2CH_2OCH_2CH_2$ | $CH_2CH_2OCH_2CH_2$ | $CH_2CH_2OCH_2CH_2$ |

-continued
| | | | | | | |
|---|---|---|---|---|---|---|
| [IV]-(19) | 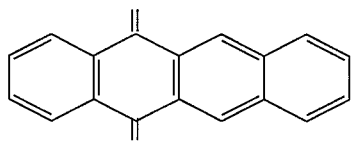 | $NO_3$ | $CH_2CH_2CH_2CH_2$ | $CH_2CH_2CH_2CH_2$ | $CH_2CH_2CH_2CH_2$ | $CH_2CH_2CH_2CH_2$ |
| [IV]-(20) | 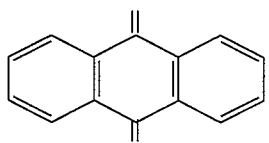 | $SbF_6$ | $CH=C(CH_3)-$ $CH_2C(CH_3)_2CH_2$ | $CH=C(CH_3)-$ $CH_2C(CH_3)_2CH_2$ | $CH=C(CH_3)-$ $CH_2C(CH_3)_2CH_2$ | $CH=C(CH_3)-$ $CH_2C(CH_3)_2CH_2$ |
| [IV]-(21) | 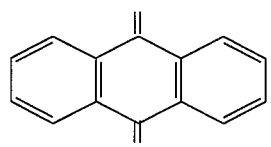 | $ClO_4$ | $n-C_3H_7,$ $n-C_3H_7$ | $n-C_3H_7,$ $n-C_3H_7$ | $n-C_5H_{11},$ $n-C_5H_{11}$ | $n-C_5H_{11},$ $n-C_5H_{11}$ |

-continued

| | | | | | | |
|---|---|---|---|---|---|---|
| [IV]-(22) | (anthracene-like structure) | I | C₃H₇OH, C₃H₇OH | C₃H₇OH, C₃H₇OH | C₃H₇OH, C₃H₇OH | C₃H₇OH, C₃H₇OH |
| [IV]-(23) | (anthracene-like structure) | ClO₄ | C₂H₅, C₃H₇ | C₂H₅, C₃H₇ | C₂H₅, C₃H₇ | C₂H₅, C₃H₇ |
| [IV]-(24) | (pentacene-like structure) | Br | C₂H₅—CH₂CHC₃H₇, C₂H₅—CH₂CHC₃H₇ | n-C₅H₁₁, n-C₅H₁₁ | n-C₅H₁₁, n-C₅H₁₁ | n-C₅H₁₁, n-C₅H₁₁ |

| | | | | | |
|---|---|---|---|---|---|
| [IV]-(25) | ![anthracene] | SbF$_6$ | CH$_3$—CHCH$_2$CH$_2$ | CH$_3$—CHCH$_2$CH$_2$ | CH$_3$—CHCH$_2$CH$_2$ | CH$_3$—CHCH$_2$CH$_2$ |
| [IV]-(26) | ![anthracene] | ClO$_4$ | C$_2$H$_4$C≡CH, C$_2$H$_4$C≡CH | C$_2$H$_4$C≡CH, C$_2$H$_4$C≡CH | C$_2$H$_4$C≡CH, C$_2$H$_4$C≡CH | C$_2$H$_4$C≡CH, C$_2$H$_4$C≡CH |
| [IV]-(27) | ![anthracene] | I | C$_3$H$_6$C≡CH, C$_3$H$_6$C≡CH | C$_3$H$_6$C≡CH, C$_3$H$_6$C≡CH | C$_3$H$_6$C≡CH, C$_3$H$_6$C≡CH | C$_3$H$_6$C≡CH, C$_3$H$_6$C≡CH |
| [IV]-(28) | ![anthracene] | SbF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |

-continued
| | | | | | |
|---|---|---|---|---|---|
| [IV]-(29) | 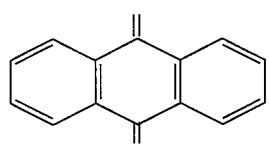 | ClO$_4$ | C$_6$H$_4$Cl, C$_6$H$_4$Cl | C$_6$H$_4$Cl, C$_6$H$_4$Cl | C$_6$H$_4$Cl, C$_6$H$_4$Cl | C$_6$H$_4$Cl, C$_6$H$_4$Cl |
| [IV]-(30) | 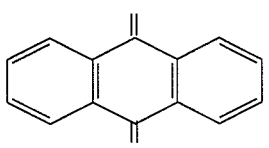 | AsF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [IV]-(31) | 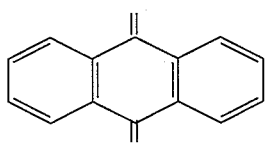 | ClO$_4$ | CH$_3$ CH$_3$<br>\|　　\|<br>CHCH$_2$CH$_2$CH | CH$_3$ CH$_3$<br>\|　　\|<br>CHCH$_2$CH$_2$CH | CH$_3$ CH$_3$<br>\|　　\|<br>CHCH$_2$CH$_2$CH | CH$_3$ CH$_3$<br>\|　　\|<br>CHCH$_2$CH$_2$CH |

-continued

| | | | | | |
|---|---|---|---|---|---|
| [IV]-(32) | anthracene | BF$_4$ | CH$_3$, CH$_3$ | CH$_3$, CH$_3$ | CH$_3$, CH$_3$ | CH$_3$, CH$_3$ |
| [IV]-(33) | anthracene | Br | C$_2$H$_4$Cl, C$_2$H$_4$Cl | C$_2$H$_4$Cl, C$_2$H$_4$Cl | C$_2$H$_4$Cl, C$_2$H$_4$Cl | C$_2$H$_4$Cl, C$_2$H$_4$Cl |
| [IV]-(34) | anthracene | ClO$_4$ | CH=C(CH$_3$)— CH$_2$C(CH$_3$)$_2$CH$_2$ | CH=C(CH$_3$)— CH$_2$C(CH$_3$)$_2$CH$_2$ | CH=C(CH$_3$)— CH$_2$C(CH$_3$)$_2$CH$_2$ | CH=C(CH$_3$)— CH$_2$C(CH$_3$)$_2$CH$_2$ |
| [IV]-(35) | anthracene | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_5$, C$_2$H$_5$ | C$_2$H$_5$, C$_2$H$_5$ |

| -continued | | | | |
|---|---|---|---|---|
| [IV]-(36) | 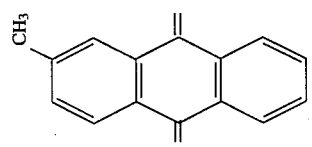 | ClO₄ | CH₂OCH₃, CH₂OCH₃ | CH₂OCH₃, CH₂OCH₃ | CH₂OCH₃, CH₂OCH₃ | CH₂OCH₃, CH₂OCH₃ |

The infrared-absorptive compounds of the present invention, represented by formulas (III) and (IV) can be synthesized similarly to the infrared-absorptive compounds of formulas (I) and (III) previously described, i.e., by the methods disclosed in U.S. Pat. Nos. 3,251,881, 3,575,871 and 3,484,467 and Japanese Patent Application Laid-Open No. 61-69991. For example, they can be synthesized according to the following scheme.

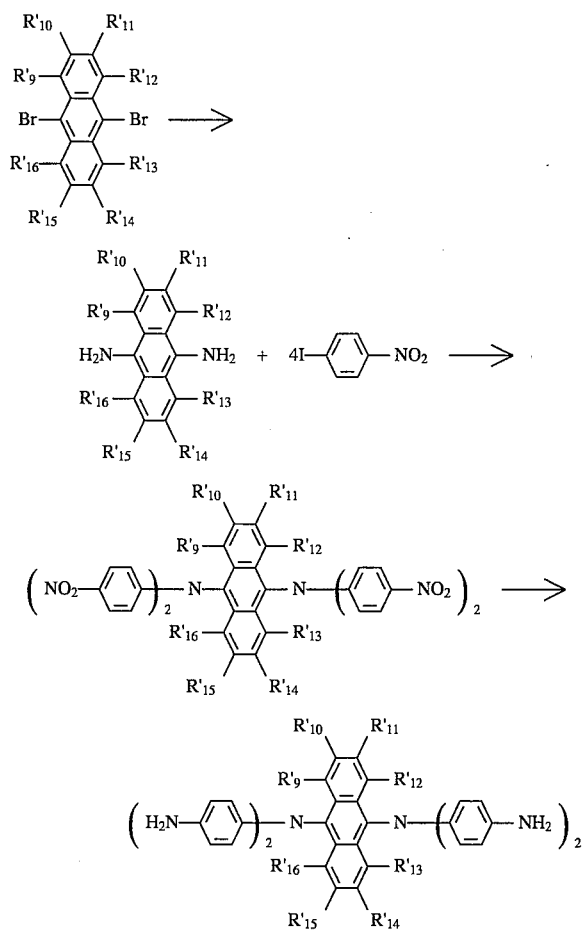

The amino compound obtained by the above Ullmann reaction and reduction reaction is subjected to selective substitution, i.e., for example, alkylation, alkenylation, aralkylation or alkynylation to substitute the hydrogen atom(s) of amino groups of the amino compound, followed by oxidation reaction to give the end product.

In this course, for example, as an alkylating agent, methyl bromide, ethyl bromide, n-propyl bromide, n-butyl bromide or the like is used, and 1,4-dibromobutane, 1,5-dibromopentane or the like is further used, whereby a heterocyclic ring can be formed together with a nitrogen atom in the combination of $R'_1$ and $R'_2$, $R'_3$ and $R'_4$, $R'_5$ and $R'_6$ or $R'_7$ and $R'_8$.

In an instance in which $R'_1$ to $R'_8$ are asymmetrically formed, the selective substitution must be multi-stepwise carried out. In view of cost, $R'_1$ to $R'_8$ or the combinations of $R'_1$ and $R'_2$, $R'_3$ and $R'_4$, $R'_5$ and $R'_6$ and $R'_7$ and $R'_8$ may preferably be the same.

The above infrared-absorptive compounds of the present invention have a maximum absorption wavelength of 900 nm or more and an absorptivity coefficient of from several tens of thousands to hundred and several tens of thousands, showing a great absorption peak.

Such compounds can be used, for example, in thermal insulating films, sunglasses, etc.

Next, the infrared-absorptive compound according to a third embodiment of the present invention is a compound represented by the following formula (V) or (V).

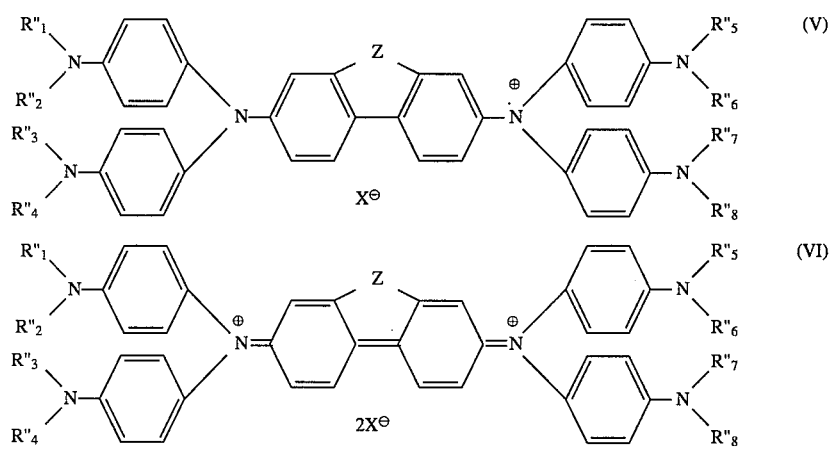

In formulas (V) and (VI), Z represents

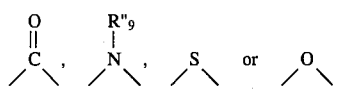

and R"$_1$ to R"$_8$ each represent a hydrogen atom or a monovalent organic residual group.

The monovalent organic residual group may include those exemplified by a substituted or unsubstituted alkyl group, a substituted or unsubstituted alkenyl group, a substituted or unsubstituted aryl group, a substituted or unsubstituted aralkyl group and also an alkynyl group. For example, the unsubstituted alkyl group may include those exemplified by a methyl group, an ethyl group, a n-propyl group, an iso-propyl group, a n-butyl group, an iso-butyl group, a t-buryl group, a n-amyl group, a t-amyl group, a n-hexyl group, a n-octyl group and a t-octyl group. The substituted alkyl group may include, for example, halogenated alkyl groups such as a 2-chloroethyl group and a 3-chloropropyl group, hydroxyalkyl groups such as a 2-hydroxyethyl group, a 3-hydroxypropyl group and a 4-hydroxybutyl group, acetoxy alkyl groups such as a 2-acetoxyethyl group and 2-acetoxypropyl group, carboxyalkyl groups such as a carboxymethyl group, a 2-carboxyethyl group and a 3-carboxypropyl group, and alkoxyalkyl groups such as a methoxymethyl group, a methoxyethyl group, a methoxypropyl group, a methoxybutyl group, an ethoxymethyl group, an ethoxyethyl group, an ethoxypropyl group, an ethoxybutyl group and a propoxymethyl group. The alkenyl group may include those exemplified by a vinyl group, a propenyl group, a butenyl group, a pentenyl group, a hexenyl group, a heptenyl group end an octenyl group, end also any of these alkenyl groups whose hydrogen atom has been substituted with a halogen atom, a hydroxyl group, an acetoxyl group, a carboxyl group or an alkoxyl group. The aralkyl group may include those exemplified by a benzyl group, a p-methylbenzyl group, a 2-phenylmethyl group, a 2-phenylpropyl group, a 3-phenylpropyl group, an α-naphthylmethyl group end a β-naphthylethyl group, end also any of these aralkyl groups whose hydrogen atom has been substituted with a halogen atom as exemplified by a p-chlorobenzyl group, and any of these aralkyl groups whose hydrogen atom has been substituted with a hydroxyl group, an acetoxyl group, a carboxyl group or an alkoxyl group. The substituted or unsubstituted aryl group may include those exemplified by a phenyl group, a naphthyl group, a tolyl group, a xylyl group, a methoxyphenyl group, a dimethoxyphenyl group, a trimethoxyphenyl group, an ethoxyphenyl group, a dimethylaminophenyl group, a diethylaminophenyl group, a dipropylaminophenyl group, a dibenzylaminophenyl group, a diphenylaminophenyl group, a dimethoxymethylaminophenyl group and a ditolylaminophenyl group. The alkynyl group may include those exemplified by a propagyl group, a butynyl group, a pentynyl group and a hexynyl group.

R"$_1$ to R"$_8$ may be the same or may be different one another.

R"$_1$ to R"$_8$ may be in at least one combination of combinations R"$_1$ and R"$_2$, R"$_3$ and R"$_4$, R"$_5$ and R"$_6$ and R"$_7$ and R"$_8$, a group of atoms necessary to form a substituted or unsubstituted 5-membered ring, a substituted or unsubstituted 6-membered ring or a substituted or unsubstituted 7-membered ring together with a nitrogen atom. The 5-membered ring may include, for example, a pyrrolidine ring, the 6-membered ring may include a piperidine ring, a morpholine ring and 8 tetrahydropyridine group, and the 7-membered ring may include the cylcohexylamine ring represented by formula (VII) previously described. Of the substituents R"$_1$ to R"$_8$ two or more of the above combinations may be made to have the heterocyclic structure described above, and in such an instance, the structure may be the same or different from each other.

In the above infrared-absorptive compounds of formulas (V) and (VI), at least one of R"$_1$ to R"$_8$ or preferably all of them may be a monovalent organic residual group having 1 to 8 carbon atoms, in particular, a substituted or unsubstituted alkenyl group or a substituted or unsubstituted alkoxyalkyl group. In such an instance, the heat resistance of the infrared-absorptive compounds can be improved and also the solvent solubility thereof can be improved.

R"$_9$ also represents a hydrogen atom, or a monovalent organic residual group which may include, for example, alkyl groups as exemplified by a methyl group, an ethyl group, a n-propyl group, an iso-propyl group, a n-butyl group, a sec-butyl group, an iso-butyl group, a t-butyl group, a n-amyl group, a t-amyl group, a n-hexyl group, a n-octyl group and a t-octyl group; substituted alkyl groups as exemplified by a 2-hydroxyethyl group, a 3-hydroxypropyl group, a 4-hydroxybutyl group, a 2-acetoxyethyl group, a carboxymethyl group, a 2-carboxyethyl group, a 3-carboxypropyl group, a 2-sulfoethyl group, a 3-sulfopropyl group, a 4-sulfobutyl group, a sulfatopropyl group, a sulfatobutyl group, an N-(methylsulfonyl)carbamylmethyl group, a 3-(acetylsulfamyl)propyl group and a 4-(acetylsulfamyl)butyl group; cyclic alkyl groups as exemplified by a cylcohexyl group; alkenyl groups such as an allyl group (CH$_2$=CH—CH$_2$—); aralkyl groups as exemplified by a benzyl group, a phenethyl group, an α-naphthylmethyl group and a β-naphthylmethyl group; substituted aralkyl groups as exemplified by a carboxybenzyl group, a sulfobenzyl group and a hydroxybenzyl group; and aryl groups as exemplified by a phenyl group or substituted aryl groups as exemplified by a carboxyphenyl group, a sulfophenyl group and a hydroxyphenyl group.

X$^\ominus$ represents the same anionic residual group as previously described.

Examples of the infrared-absorptive compounds of formulas (V) and (VI) according to the present invention are shown below. In the present invention, examples are by no means limited to these.

The following exemplary compounds (V)-A-(1) to (VI)-D-(27) are set out in the manner simplified as follows:

For example, in the infrared-absorptive compounds of formulas (V) and (VI), a compound having the following structure (F) is indicated as shown below.

| Compound No. | −Z− | X | (R"₁, R"₂) | (R"₃, R"₄) | (R"₅, R"₆) | (R"₇, R"₈) |
|---|---|---|---|---|---|---|
| (F) | $\overset{O}{\underset{\diagdown}{\underset{|}{C}}}_{\diagup}$ | $ClO_4$ | $CH_2OCH_3$ $CH_2OCH_3$ | $CH_2OCH_3$ $CH_2OCH_3$ | $CH_2OCH_3$ $CH_2OCH_3$ | $CH_2OCH_3$ $CH_2OCH_3$ |

| Compound No. | −Z− | X | (R"₁, R"₂) | (R"₃, R"₄) | (R"₅, R"₆) | (R"₇, R"₈) |
|---|---|---|---|---|---|---|
| [V]-A-(1) | $\overset{O}{\underset{\diagdown}{\underset{|}{C}}}_{\diagup}$ | $ClO_4$ | $CH_2OCH_3$, $CH_2OCH_3$ | $CH_2OCH_3$, $CH_2OCH_3$ | $CH_2OCH_3$, $CH_2OCH_3$ | $CH_2OCH_3$, $CH_2OCH_3$ |
| [V]-A-(2) | $\overset{O}{\underset{\diagdown}{\underset{|}{C}}}_{\diagup}$ | $BF_4$ | $C_2H_5$, $C_2H_5$ | $C_2H_5$, $C_2H_5$ | $C_2H_5$, $C_2H_5$ | $C_2H_5$, $C_2H_5$ |
| [V]-A-(3) | $\overset{O}{\underset{\diagdown}{\underset{|}{C}}}_{\diagup}$ | $SbF_6$ | $C_2H_5$, $C_2H_5$ | $C_2H_5$, $C_2H_5$ | $C_2H_5$, $C_2H_5$ | $C_2H_5$, $C_2H_5$ |
| [V]-A-(4) | $\overset{O}{\underset{\diagdown}{\underset{|}{C}}}_{\diagup}$ | Br | $CH_2\overset{\underset{|}{CH_3}}{CH}C_2H_5$, $CH_2\overset{\underset{|}{CH_3}}{CH}C_2H_5$ | $CH_2\overset{\underset{|}{CH_3}}{CH}C_2H_5$, $CH_2\overset{\underset{|}{CH_3}}{CH}C_2H_5$ | $CH_2\overset{\underset{|}{CH_3}}{CH}C_2H_5$, $CH_2\overset{\underset{|}{CH_3}}{CH}C_2H_5$ | $CH_2\overset{\underset{|}{CH_3}}{CH}C_2H_5$, $CH_2\overset{\underset{|}{CH_3}}{CH}C_2H_5$ |
| [V]-A-(5) | $\overset{O}{\underset{\diagdown}{\underset{|}{C}}}_{\diagup}$ | $ClO_4$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ |
| [V]-A-(6) | $\overset{O}{\underset{\diagdown}{\underset{|}{C}}}_{\diagup}$ | $SbF_6$ | $iso\text{-}C_3H_7$, $iso\text{-}C_3H_7$ | $iso\text{-}C_3H_7$, $iso\text{-}C_3H_7$ | $iso\text{-}C_3H_7$, $iso\text{-}C_3H_7$ | $iso\text{-}C_3H_7$, $iso\text{-}C_3H_7$ |
| [V]-A-(7) | $\overset{O}{\underset{\diagdown}{\underset{|}{C}}}_{\diagup}$ | $CH_3SO_4$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ |
| [V]-A-(8) | $\overset{O}{\underset{\diagdown}{\underset{|}{C}}}_{\diagup}$ | $ClO_4$ | $CH_2CH=CH_2$, $CH_2CH=CH_2$ | $CH_2CH=CH_2$, $CH_2CH=CH_2$ | $CH_2CH=CH_2$, $CH_2CH=CH_2$ | $CH_2CH=CH_2$, $CH_2CH=CH_2$ |
| [V]-A-(9) | $\overset{O}{\underset{\diagdown}{\underset{|}{C}}}_{\diagup}$ | $AsF_6$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |

-continued

| Compound No. | —Z— | X | R"1, R"2 | R"3, R"4 | R"5, R"6 | R"7, R"8 |
|---|---|---|---|---|---|---|
| [V]-A-(10) | —C(=O)— | ClO$_4$ | n-C$_4$H$_9$, n-C$_4$H$_9$ | n-C$_4$H$_9$, n-C$_4$H$_9$ | n-C$_4$H$_9$, n-C$_4$H$_9$ | n-C$_4$H$_9$, n-C$_4$H$_9$ |
| [V]-A-(11) | —C(=O)— | Cl | n-C$_{10}$H$_{21}$, n-C$_{10}$H$_{21}$ | n-C$_{10}$H$_{21}$, n-C$_{10}$H$_{21}$ | n-C$_{10}$H$_{21}$, n-C$_{10}$H$_{21}$ | n-C$_{10}$H$_{21}$, n-C$_{10}$H$_{21}$ |
| [V]-A-(12) | —C(=O)— | ClO$_4$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ |
| [V]-A-(13) | —C(=O)— | ClO$_4$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ | C$_2$H$_4$OC$_2$H$_5$, C$_2$H$_4$OC$_2$H$_5$ |
| [V]-A-(14) | —C(=O)— | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_4$OCH$_3$, C$_2$H$_4$OCH$_3$ | C$_2$H$_4$OCH$_3$, C$_2$H$_4$OCH$_3$ |
| [V]-A-(15) | —C(=O)— | CH$_3$—C$_6$H$_4$—SO$_3$ | n-C$_3$H$_7$, n-C$_3$H$_7$ | n-C$_4$H$_9$, n-C$_4$H$_9$ | n-C$_3$H$_7$, n-C$_3$H$_7$ | n-C$_4$H$_9$, n-C$_4$H$_9$ |
| [V]-A-(16) | —C(=O)— | ClO$_4$ | n-C$_3$H$_7$, n-C$_3$H$_7$ | n-C$_3$H$_7$, n-C$_3$H$_7$ | n-C$_5$H$_{11}$, n-C$_5$H$_{11}$ | n-C$_5$H$_{11}$, n-C$_5$H$_{11}$ |
| [V]-A-(17) | —C(=O)— | I | C$_3$H$_7$OH, C$_3$H$_7$OH | C$_3$H$_7$OH, C$_3$H$_7$OH | C$_3$H$_7$OH, C$_3$H$_7$OH | C$_3$H$_7$OH, C$_3$H$_7$OH |
| [V]-A-(18) | —C(=O)— | ClO$_4$ | C$_2$H$_5$, C$_3$H$_7$ | C$_2$H$_5$, C$_3$H$_7$ | C$_2$H$_5$, C$_3$H$_7$ | C$_2$H$_5$, C$_3$H$_7$ |
| [V]-A-(19) | —C(=O)— | Br | CH$_2$CH(C$_2$H$_5$)C$_3$H$_7$, CH$_2$CH(C$_2$H$_5$)C$_3$H$_7$ | n-C$_5$H$_{11}$, n-C$_5$H$_{11}$ | n-C$_5$H$_{11}$, n-C$_5$H$_{11}$ | n-C$_5$H$_{11}$, n-C$_5$H$_{11}$ |
| [V]-A-(20) | —C(=O)— | ClO$_4$ | C$_2$H$_4$C≡CH, C$_2$H$_4$C≡CH | C$_2$H$_4$C≡CH, C$_2$H$_4$C≡CH | C$_2$H$_4$C≡CH, C$_2$H$_4$C≡CH | C$_2$H$_4$C≡CH, C$_2$H$_4$C≡CH |
| [V]-A-(21) | —C(=O)— | I | C$_3$H$_6$C≡CH, C$_3$H$_6$C≡CH | C$_3$H$_6$C≡CH, C$_3$H$_6$C≡CH | C$_3$H$_6$C≡CH, C$_3$H$_6$C≡CH | C$_3$H$_6$C≡CH, C$_3$H$_6$C≡CH |
| [V]-A-(22) | —C(=O)— | SbF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [V]-A-(23) | —C(=O)— | ClO$_4$ | C$_6$H$_4$Cl, C$_6$H$_4$Cl | C$_6$H$_4$Cl, C$_6$H$_4$Cl | C$_6$H$_4$Cl, C$_6$H$_4$Cl | C$_6$H$_4$Cl, C$_6$H$_4$Cl |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [V]-A-(24) | $\overset{O}{\underset{C}{\parallel}}$ | AsF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [V]-A-(25) | $\overset{O}{\underset{C}{\parallel}}$ | BF$_4$ | CH$_3$, CH$_3$ | CH$_3$, CH$_3$ | CH$_3$, CH$_3$ | CH$_3$, CH$_3$ |
| [V]-A-(26) | $\overset{O}{\underset{C}{\parallel}}$ | Br | C$_2$H$_4$Cl, C$_2$H$_4$Cl | C$_2$H$_4$Cl, C$_2$H$_4$Cl | C$_2$H$_4$Cl, C$_2$H$_4$Cl | C$_2$H$_4$Cl, C$_2$H$_4$Cl |
| [V]-A-(27) | $\overset{O}{\underset{C}{\parallel}}$ | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_5$, C$_2$H$_5$ | C$_2$H$_5$, C$_2$H$_5$ |
| [V]-B-(1) | C$_2$H$_5$—N | ClO$_4$ | CH$_2$OCH$_3$, CH$_2$OCH$_3$ | CH$_2$OCH$_3$, CH$_2$OCH$_3$ | CH$_2$OCH$_3$, CH$_2$OCH$_3$ | CH$_2$OCH$_3$, CH$_2$OCH$_3$ |
| [V]-B-(2) | CH$_3$—N | BF$_4$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [V]-B-(3) | C$_2$H$_5$—N | SbF$_6$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [V]-B-(4) | t-C$_4$H$_9$—N | Br | CH$_2$CH(CH$_3$)C$_2$H$_5$, CH$_2$CH(CH$_3$)C$_2$H$_5$ | CH$_2$CH(CH$_3$)C$_2$H$_5$, CH$_2$CH(CH$_3$)C$_2$H$_5$ | CH$_2$CH(CH$_3$)C$_2$H$_5$, CH$_2$CH(CH$_3$)C$_2$H$_5$ | CH$_2$CH(CH$_3$)C$_2$H$_5$, CH$_2$CH(CH$_3$)C$_2$H$_5$ |
| [V]-B-(5) | i-C$_3$H$_7$—N | ClO$_4$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [V]-B-(6) | C$_2$H$_4$OCH$_3$—N | SbF$_6$ | iso-C$_3$H$_7$, iso-C$_3$H$_7$ | iso-C$_3$H$_7$, iso-C$_3$H$_7$ | iso-C$_3$H$_7$, iso-C$_3$H$_7$ | iso-C$_3$H$_7$, iso-C$_3$H$_7$ |
| [V]-B-(7) | CH$_3$—N | CH$_3$SO$_4$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ |
| [V]-B-(8) | CH$_2$CH=CH$_2$—N | ClO$_4$ | CH$_2$CH=CH$_2$, CH$_2$CH=CH$_2$ | CH$_2$CH=CH$_2$, CH$_2$CH=CH$_2$ | CH$_2$CH=CH$_2$, CH$_2$CH=CH$_2$ | CH$_2$CH=CH$_2$, CH$_2$CH=CH$_2$ |
| [V]-B-(9) | C$_6$H$_5$—N | AsF$_6$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ | C$_2$H$_4$CH=CH$_2$, C$_2$H$_4$CH=CH$_2$ |

-continued

| Compound No. | —Z— | X | (R"₁, R"₂) | (R"₃, R"₄) | (R"₅, R"₆) | (R"₇, R"₈) |
|---|---|---|---|---|---|---|
| [V]-B-(10) | $C_2H_5$–N(CH₃)₂ | $ClO_4$ | n-$C_4H_9$, n-$C_4H_9$ | n-$C_4H_9$, n-$C_4H_9$ | n-$C_4H_9$, n-$C_4H_9$ | n-$C_4H_9$, n-$C_4H_9$ |
| [V]-B-(11) | PhCH₂–N(CH₃)₂ | Cl | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ |
| [V]-B-(12) | $C_2H_5$–N(CH₃)₂ | $ClO_4$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [V]-B-(13) | $CH_3$–N(CH₃)₂ | $ClO_4$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ |
| [V]-B-(14) | $C_2H_4OCH_3$–N(CH₃)₂ | $SbF_6$ | $C_2H_4OCH_3$, $C_2H_4OCH_3$ | $C_2H_4OCH_3$, $C_2H_4OCH_3$ | $C_2H_4OCH_3$, $C_2H_4OCH_3$ | $C_2H_4OCH_3$, $C_2H_4OCH_3$ |
| [V]-B-(15) | $C_2H_5$–N(CH₃)₂ | $CH_3$-C₆H₄-$SO_3$ | n-$C_3H_7$, n-$C_3H_7$ | n-$C_4H_9$, n-$C_4H_9$ | n-$C_3H_7$, n-$C_3H_7$ | n-$C_4H_9$, n-$C_4H_9$ |
| [V]-B-(16) | $C_2H_5$–N(CH₃)₂ | $ClO_4$ | n-$C_3H_7$, n-$C_3H_7$ | n-$C_3H_7$, n-$C_3H_7$ | n-$C_5H_{11}$, n-$C_5H_{11}$ | n-$C_5H_{11}$, n-$C_5H_{11}$ |
| [V]-B-(17) | n-$C_4H_9$–N(CH₃)₂ | I | $C_3H_7OH$, $C_3H_7OH$ | $C_3H_7OH$, $C_3H_7OH$ | $C_3H_7OH$, $C_3H_7OH$ | $C_3H_7OH$, $C_3H_7OH$ |
| [V]-B-(18) | n-$C_3H_7$–N(CH₃)₂ | $ClO_4$ | $C_2H_5$, $C_3H_7$ | $C_2H_5$, $C_3H_7$ | $C_2H_5$, $C_3H_7$ | $C_2H_5$, $C_3H_7$ |
| [V]-B-(19) | n-$C_6H_{13}$–N(CH₃)₂ | Br | $C_2H_5$–CH₂CHC₃H₇, $C_2H$–CH₂CHC₃H₇ | n-$C_5H_{11}$, n-$C_5H_{11}$ | n-$C_5H_{11}$, n-$C_5H_{11}$ | n-$C_5H_{11}$, n-$C_5H_{11}$ |
| [V]-B-(20) | $C_2H_5$–N(CH₃)₂ | $ClO_4$ | $C_2H_4C{\equiv}CH$, $C_2H_4C{\equiv}CH$ | $C_2H_4C{\equiv}CH$, $C_2H_4C{\equiv}CH$ | $C_2H_4C{\equiv}CH$, $C_2H_4C{\equiv}CH$ | $C_2H_4C{\equiv}CH$, $C_2H_4C{\equiv}CH$ |
| [V]-B-(21) | $CH_2CH=CH_2$–N(CH₃)₂ | I | $C_3H_6C{\equiv}CH$, $C_3H_6C{\equiv}CH$ | $C_3H_6C{\equiv}CH$, $C_3H_6C{\equiv}CH$ | $C_3H_6C{\equiv}CH$, $C_3H_6C{\equiv}CH$ | $C_3H_6C{\equiv}CH$, $C_3H_6C{\equiv}CH$ |
| [V]-B-(22) | $C_2H_5$–N(CH₃)₂ | $SbF_6$ | n-$C_3H_7$, n-$C_3H_7$ | n-$C_3H_7$, n-$C_3H_7$ | n-$C_3H_7$, n-$C_3H_7$ | n-$C_3H_7$, n-$C_3H_7$ |

-continued

| Compound No. | —Z— | X | (R"₁, R"₂) | (R"₃, R"₄) | (R"₅, R"₆) | (R"₇, R"₈) |
|---|---|---|---|---|---|---|
| [V]-B-(23) | -C₆H₄-N(CH₃)₂ (p-dimethylaminophenyl with CH₃) | ClO₄ | C₆H₄Cl, C₆H₄Cl | C₆H₄Cl, C₆H₄Cl | C₆H₄Cl, C₆H₄Cl | C₆H₄Cl, C₆H₄Cl |
| [V]-B-(24) | N(CH₃)(CH₃) with CH₃ | AsF₆ | n-C₃H₇, n-C₃H₇ | n-C₃H₇, n-C₃H₇ | n-C₃H₇, n-C₃H₇ | n-C₃H₇, n-C₃H₇ |
| [V]-B-(25) | N(CH₃)(CH₃) with CH₃ | BF₄ | CH₃, CH₃ | CH₃, CH₃ | CH₃, CH₃ | CH₃, CH₃ |
| [V]-B-(26) | N(CH₃)(CH₃) with C₂H₅ | Br | C₂H₄Cl, C₂H₄Cl | C₂H₄Cl, C₂H₄Cl | C₂H₄Cl, C₂H₄Cl | C₂H₄Cl, C₂H₄Cl |
| [V]-B-(27) | N(CH₃)(CH₃) with C₂H₅ | SbF₆ | C₂H₄OCH₃, C₂H₄OCH₃ | C₂H₄OCH₃, C₂H₄OCH₃ | C₂H₅, C₂H₅ | C₂H₅, C₂H₅ |

| Compound No. | —Z— | X | (R"₁, R"₂) | (R"₃, R"₄) | (R"₅, R"₆) | (R"₇, R"₈) |
|---|---|---|---|---|---|---|
| [V]-C-(1) | S | ClO₄ | CH₂OCH₃, CH₂OCH₃ | CH₂OCH₃, CH₂OCH₃ | CH₂OCH₃, CH₂OCH₃ | CH₂OCH₃, CH₂OCH₃ |
| [V]-C-(2) | S | BF₄ | C₂H₅, C₂H₅ | C₂H₅, C₂H₅ | C₂H₅, C₂H₅ | C₂H₅, C₂H₅ |
| [V]-C-(3) | S | SbF₆ | C₂H₅, C₂H₅ | C₂H₅, C₂H₅ | C₂H₅, C₂H₅ | C₂H₅, C₂H₅ |
| [V]-C-(4) | S | Br | CH₃-CH(CH₂)(CH₂C₂H₅), CH₂CHC₂H₅ (CH₃ branch) | same | same | same |
| [V]-C-(5) | S | ClO₄ | n-C₃H₇, n-C₃H₇ | n-C₃H₇, n-C₃H₇ | n-C₃H₇, n-C₃H₇ | n-C₃H₇, n-C₃H₇ |
| [V]-C-(6) | S | SbF₆ | iso-C₃H₇, iso-C₃H₇ | iso-C₃H₇, iso-C₃H₇ | iso-C₃H₇, iso-C₃H₇ | iso-C₃H₇, iso-C₃H₇ |
| [V]-C-(7) | S | CH₃SO₄ | C₃H₆OC₃H₇, C₃H₆OC₃H₇ | C₃H₆OC₃H₇, C₃H₆OC₃H₇ | C₃H₆OC₃H₇, C₃H₆OC₃H₇ | C₃H₆OC₃H₇, C₃H₆OC₃H₇ |
| [V]-C-(8) | S | ClO₄ | CH₂CH=CH₂, CH₂CH=CH₂ | CH₂CH=CH₂, CH₂CH=CH₂ | CH₂CH=CH₂, CH₂CH=CH₂ | CH₂CH=CH₂, CH₂CH=CH₂ |
| [V]-C-(9) | S | AsF₆ | C₂H₄CH=CH₂, C₂H₄CH=CH₂ | C₂H₄CH=CH₂, C₂H₄CH=CH₂ | C₂H₄CH=CH₂, C₂H₄CH=CH₂ | C₂H₄CH=CH₂, C₂H₄CH=CH₂ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [V]-C-(10) | S/\ | $ClO_4$ | $n\text{-}C_4H_9$, $n\text{-}C_4H_9$ | $n\text{-}C_4H_9$, $n\text{-}C_4H_9$ | $n\text{-}C_4H_9$, $n\text{-}C_4H_9$ | $n\text{-}C_4H_9$, $n\text{-}C_4H_9$ |
| [V]-C-(11) | S/\ | Cl | $n\text{-}C_{10}H_{21}$, $n\text{-}C_{10}H_{21}$ | $n\text{-}C_{10}H_{21}$, $n\text{-}C_{10}H_{21}$ | $n\text{-}C_{10}H_{21}$, $n\text{-}C_{10}H_{21}$ | $n\text{-}C_{10}H_{21}$, $n\text{-}C_{10}H_{21}$ |
| [V]-C-(12) | S/\ | $ClO_4$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [V]-C-(13) | S/\ | $ClO_4$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ |
| [V]-C-(14) | S/\ | $SbF_6$ | $C_2H_4OCH_3$, $C_2H_4OCH_3$ | $C_2H_4OCH_3$, $C_2H_4OCH_3$ | $C_2H_4OCH_3$, $C_2H_4OCH_3$ | $C_2H_4OCH_3$, $C_2H_4OCH_3$ |
| [V]-C-(15) | S/\ | $CH_3\text{-}C_6H_4\text{-}SO_3$ | $n\text{-}C_3H_7$, $n\text{-}C_3H_7$ | $n\text{-}C_4H_9$, $n\text{-}C_4H_9$ | $n\text{-}C_3H_7$, $n\text{-}C_3H_7$ | $n\text{-}C_4H_9$, $n\text{-}C_4H_9$ |
| [V]-C-(16) | S/\ | $ClO_4$ | $n\text{-}C_3H_7$, $n\text{-}C_3H_7$ | $n\text{-}C_3H_7$, $n\text{-}C_3H_7$ | $n\text{-}C_5H_{11}$, $n\text{-}C_5H_{11}$ | $n\text{-}C_5H_{11}$, $n\text{-}C_5H_{11}$ |
| [V]-C-(17) | S/\ | I | $C_3H_7OH$, $C_3H_7OH$ | $C_3H_7OH$, $C_3H_7OH$ | $C_3H_7OH$, $C_3H_7OH$ | $C_3H_7OH$, $C_3H_7OH$ |
| [V]-C-(18) | S/\ | $ClO_4$ | $C_2H_5$, $C_3H_7$ | $C_2H_5$, $C_3H_7$ | $C_2H_5$, $C_3H_7$ | $C_2H_5$, $C_3H_7$ |
| [V]-C-(19) | S/\ | Br | $C_2H_5$ \| $CH_2CHC_3H_7$, $C_2H$ \| $CH_2CHC_3H_7$ | $n\text{-}C_5H_{11}$, $n\text{-}C_5H_{11}$ | $n\text{-}C_5H_{11}$, $n\text{-}C_5H_{11}$ | $n\text{-}C_5H_{11}$, $n\text{-}C_5H_{11}$ |
| [V]-C-(20) | S/\ | $ClO_4$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ |
| [V]-C-(21) | S/\ | I | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ |
| [V]-C-(22) | S/\ | $SbF_6$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ |
| [V]-C-(23) | S/\ | $ClO_4$ | $C_6H_4Cl$, $C_6H_4Cl$ | $C_6H_4Cl$, $C_6H_4Cl$ | $C_6H_4Cl$, $C_6H_4Cl$ | $C_6H_4Cl$, $C_6H_4Cl$ |
| [V]-C-(24) | S/\ | $AsF_6$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ |
| [V]-C-(25) | S/\ | $BF_4$ | $CH_3$, $CH_3$ | $CH_3$, $CH_3$ | $CH_3$, $CH_3$ | $CH_3$, $CH_3$ |
| [V]-C-(26) | S/\ | Br | $C_2H_4Cl$, $C_2H_4Cl$ | $C_2H_4Cl$, $C_2H_4Cl$ | $C_2H_4Cl$, $C_2H_4Cl$ | $C_2H_4Cl$, $C_2H_4Cl$ |
| [V]-C-(27) | S/\ | $SbF_6$ | $C_2H_4OCH_3$, $C_2H_4OCH_3$ | $C_2H_4OCH_3$, $C_2H_4OCH_3$ | $C_2H_5$, $C_2H_5$ | $C_2H_5$, $C_2H_5$ |

| Compound No. | −Z− | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [V]-D-(1) | epoxy | $ClO_4$ | $CH_2OCH_3$, $CH_2OCH_3$ | $CH_2OCH_3$, $CH_2OCH_3$ | $CH_2OCH_3$, $CH_2OCH_3$ | $CH_2OCH_3$, $CH_2OCH_3$ |
| [V]-D-(2) | epoxy | $BF_4$ | $C_2H_5$, $C_2H_5$ | $C_2H_5$, $C_2H_5$ | $C_2H_5$, $C_2H_5$ | $C_2H_5$, $C_2H_5$ |
| [V]-D-(3) | epoxy | $SbF_6$ | $C_2H_5$, $C_2H_5$ | $C_2H_5$, $C_2H_5$ | $C_2H_5$, $C_2H_5$ | $C_2H_5$, $C_2H_5$ |
| [V]-D-(4) | epoxy | Br | $CH_2CH(CH_3)C_2H_5$, $CH_2CH(CH_3)C_2H_5$ | $CH_2CH(CH_3)C_2H_5$, $CH_2CH(CH_3)C_2H_5$ | $CH_2CH(CH_3)C_2H_5$, $CH_2CH(CH_3)C_2H_5$ | $CH_2CH(CH_3)C_2H_5$, $CH_2CH(CH_3)C_2H_5$ |
| [V]-D-(5) | epoxy | $ClO_4$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ | $n\text{-}C_3H_7$, $n\text{-}C_3H_7$ |
| [V]-D-(6) | epoxy | $SbF_6$ | $iso\text{-}C_3H_7$, $iso\text{-}C_3H_7$ | $iso\text{-}C_3H_7$, $iso\text{-}C_3H_7$ | $iso\text{-}C_3H_7$, $iso\text{-}C_3H_7$ | $iso\text{-}C_3H_7$, $iso\text{-}C_3H_7$ |
| [V]-D-(7) | epoxy | $CH_3SO_4$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ |
| [V]-D-(8) | epoxy | $ClO_4$ | $CH_2CH=CH_2$, $CH_2CH=CH_2$ | $CH_2CH=CH_2$, $CH_2CH=CH_2$ | $CH_2CH=CH_2$, $CH_2CH=CH_2$ | $CH_2CH=CH_2$, $CH_2CH=CH_2$ |
| [V]-D-(9) | epoxy | $AsF_6$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [V]-D-(10) | epoxy | $ClO_4$ | $n\text{-}C_4H_9$, $n\text{-}C_4H_9$ | $n\text{-}C_4H_9$, $n\text{-}C_4H_9$ | $n\text{-}C_4H_9$, $n\text{-}C_4H_9$ | $n\text{-}C_4H_9$, $n\text{-}C_4H_9$ |
| [V]-D-(11) | epoxy | Cl | $n\text{-}C_{10}H_{21}$, $n\text{-}C_{10}H_{21}$ | $n\text{-}C_{10}H_{21}$, $n\text{-}C_{10}H_{21}$ | $n\text{-}C_{10}H_{21}$, $n\text{-}C_{10}H_{21}$ | $n\text{-}C_{10}H_{21}$, $n\text{-}C_{10}H_{21}$ |
| [V]-D-(12) | epoxy | $ClO_4$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [V]-D-(13) | epoxy | $ClO_4$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ |
| [V]-D-(14) | epoxy | $SbF_6$ | $C_2H_4OCH_3$, $C_2H_4OCH_3$ | $C_2H_4OCH_3$, $C_2H_4OCH_3$ | $C_2H_4OCH_3$, $C_2H_4OCH_3$ | $C_2H_4OCH_3$, $C_2H_4OCH_3$ |
| [V]-D-(15) | epoxy | $CH_3\text{-}C_6H_4\text{-}SO_3$ | $n\text{-}C_3H_7$, $n\text{-}C_3H_7$ | $n\text{-}C_4H_9$, $n\text{-}C_4H_9$ | $n\text{-}C_3H_7$, $n\text{-}C_3H_7$ | $n\text{-}C_4H_9$, $n\text{-}C_4H_9$ |
| [V]-D-(16) | epoxy | $ClO_4$ | $n\text{-}C_3H_7$, $n\text{-}C_3H_7$ | $n\text{-}C_3H_7$, $n\text{-}C_3H_7$ | $n\text{-}C_5H_{11}$, $n\text{-}C_5H_{11}$ | $n\text{-}C_5H_{11}$, $n\text{-}C_5H_{11}$ |
| [V]-D-(17) | epoxy | I | $C_3H_7OH$, $C_3H_7OH$ | $C_3H_7OH$, $C_3H_7OH$ | $C_3H_7OH$, $C_3H_7OH$ | $C_3H_7OH$, $C_3H_7OH$ |
| [V]-D-(18) | epoxy | $ClO_4$ | $C_2H_5$, $C_3H_7$ | $C_2H_5$, $C_3H_7$ | $C_2H_5$, $C_3H_7$ | $C_2H_5$, $C_3H_7$ |
| [V]-D-(19) | epoxy | Br | $C_2H_5$, $CH_2CH(C_2H_5)C_3H_7$, $C_2H_5$, $CH_2CH(C_2H_5)C_3H_7$ | $n\text{-}C_5H_{11}$, $n\text{-}C_5H_{11}$ | $n\text{-}C_5H_{11}$, $n\text{-}C_5H_{11}$ | $n\text{-}C_5H_{11}$, $n\text{-}C_5H_{11}$ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [V]-D-(20) | O (epoxide) | ClO$_4$ | C$_2$H$_4$C≡CH, C$_2$H$_4$C≡CH | C$_2$H$_4$C≡CH, C$_2$H$_4$C≡CH | C$_2$H$_4$C≡CH, C$_2$H$_4$C≡CH | C$_2$H$_4$C≡CH, C$_2$H$_4$C≡CH |
| [V]-D-(21) | O (epoxide) | I | C$_3$H$_6$C≡CH, C$_3$H$_6$C≡CH | C$_3$H$_6$C≡CH, C$_3$H$_6$C≡CH | C$_3$H$_6$C≡CH, C$_3$H$_6$C≡CH | C$_3$H$_6$C≡CH, C$_3$H$_6$C≡CH |
| [V]-D-(22) | O (epoxide) | SbF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [V]-D-(23) | O (epoxide) | ClO$_4$ | C$_6$H$_4$Cl, C$_6$H$_4$Cl | C$_6$H$_4$Cl, C$_6$H$_4$Cl | C$_6$H$_4$Cl, C$_6$H$_4$Cl | C$_6$H$_4$Cl, C$_6$H$_4$Cl |
| [V]-D-(24) | O (epoxide) | AsF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [V]-D-(25) | O (epoxide) | BF$_4$ | CH$_3$, CH$_3$ | CH$_3$, CH$_3$ | CH$_3$, CH$_3$ | CH$_3$, CH$_3$ |
| [V]-D-(26) | O (epoxide) | Br | C$_2$H$_4$Cl, C$_2$H$_4$Cl | C$_2$H$_4$Cl, C$_2$H$_4$Cl | C$_2$H$_4$Cl, C$_2$H$_4$Cl | C$_2$H$_4$Cl, C$_2$H$_4$Cl |
| [V]-D-(27) | O (epoxide) | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_5$, C$_2$H$_5$ | C$_2$H$_5$, C$_2$H$_5$ |

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-A-(1) | −C(=O)− | ClO$_4$ | CH$_2$OCH$_3$, CH$_2$OCH$_3$ | CH$_2$OCH$_3$, CH$_2$OCH$_3$ | CH$_2$OCH$_3$, CH$_2$OCH$_3$ | CH$_2$OCH$_3$, CH$_2$OCH$_3$ |
| [VI]-A-(2) | −C(=O)− | BF$_4$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [VI]-A-(3) | −C(=O)− | SbF$_6$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [VI]-A-(4) | −C(=O)− | Br | CH$_3$ \| CH$_2$CHC$_2$H$_5$, CH$_3$ \| CH$_2$CHC$_2$H$_5$ | CH$_3$ \| CH$_2$CHC$_2$H$_5$, CH$_3$ \| CH$_2$CHC$_2$H$_5$ | CH$_3$ \| CH$_2$CHC$_2$H$_5$, CH$_3$ \| CH$_2$CHC$_2$H$_5$ | CH$_3$ \| CH$_2$CHC$_2$H$_5$, CH$_3$ \| CH$_2$CHC$_2$H$_5$ |
| [VI]-A-(5) | −C(=O)− | ClO$_4$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [VI]-A-(6) | −C(=O)− | SbF$_6$ | iso-C$_3$H$_7$, iso-C$_3$H$_7$ | iso-C$_3$H$_7$, iso-C$_3$H$_7$ | iso-C$_3$H$_7$, iso-C$_3$H$_7$ | iso-C$_3$H$_7$, iso-C$_3$H$_7$ |
| [VI]-A-(7) | −C(=O)− | CH$_3$SO$_4$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ | C$_3$H$_6$OC$_3$H$_7$, C$_3$H$_6$OC$_3$H$_7$ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-A-(8) | $\overset{O}{\underset{/\;\backslash}{\overset{\|}{C}}}$ | $ClO_4$ | $CH_2CH=CH_2$, $CH_2CH=CH_2$ | $CH_2CH=CH_2$, $CH_2CH=CH_2$ | $CH_2CH=CH_2$, $CH_2CH=CH_2$ | $CH_2CH=CH_2$, $CH_2CH=CH_2$ |
| [VI]-A-(9) | $\overset{O}{\underset{/\;\backslash}{\overset{\|}{C}}}$ | $AsF_6$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-A-(10) | $\overset{O}{\underset{/\;\backslash}{\overset{\|}{C}}}$ | $ClO_4$ | $n\text{-}C_4H_9$, $n\text{-}C_4H_9$ | $n\text{-}C_4H_9$, $n\text{-}C_4H_9$ | $n\text{-}C_4H_9$, $n\text{-}C_4H_9$ | $n\text{-}C_4H_9$, $n\text{-}C_4H_9$ |
| [VI]-A-(11) | $\overset{O}{\underset{/\;\backslash}{\overset{\|}{C}}}$ | Cl | $n\text{-}C_{10}H_{21}$, $n\text{-}C_{10}H_{21}$ | $n\text{-}C_{10}H_{21}$, $n\text{-}C_{10}H_{21}$ | $n\text{-}C_{10}H_{21}$, $n\text{-}C_{10}H_{21}$ | $n\text{-}C_{10}H_{21}$, $n\text{-}C_{10}H_{21}$ |
| [VI]-A-(12) | $\overset{O}{\underset{/\;\backslash}{\overset{\|}{C}}}$ | $ClO_4$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-A-(13) | $\overset{O}{\underset{/\;\backslash}{\overset{\|}{C}}}$ | $ClO_4$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ |
| [VI]-A-(14) | $\overset{O}{\underset{/\;\backslash}{\overset{\|}{C}}}$ | $SbF_6$ | $C_2H_4OCH_3$, $C_2H_4OCH_3$ | $C_2H_4OCH_3$, $C_2H_4OCH_3$ | $C_2H_4OCH_3$, $C_2H_4OCH_3$ | $C_2H_4OCH_3$, $C_2H_4OCH_3$ |
| [VI]-A-(15) | $\overset{O}{\underset{/\;\backslash}{\overset{\|}{C}}}$ | $CH_3\text{-}C_6H_4\text{-}SO_3$ | $n\text{-}C_3H_7$, $n\text{-}C_3H_7$ | $n\text{-}C_4H_9$, $n\text{-}C_4H_9$ | $n\text{-}C_3H_7$, $n\text{-}C_3H_7$ | $n\text{-}C_4H_9$, $n\text{-}C_4H_9$ |
| [VI]-A-(16) | $\overset{O}{\underset{/\;\backslash}{\overset{\|}{C}}}$ | $ClO_4$ | $n\text{-}C_3H_7$, $n\text{-}C_3H_7$ | $n\text{-}C_3H_7$, $n\text{-}C_3H_7$ | $n\text{-}C_5H_{11}$, $n\text{-}C_5H_{11}$ | $n\text{-}C_5H_{11}$, $n\text{-}C_5H_{11}$ |
| [VI]-A-(17) | $\overset{O}{\underset{/\;\backslash}{\overset{\|}{C}}}$ | I | $C_3H_7OH$, $C_3H_7OH$ | $C_3H_7OH$, $C_3H_7OH$ | $C_3H_7OH$, $C_3H_7OH$ | $C_3H_7OH$, $C_3H_7OH$ |
| [VI]-A-(18) | $\overset{O}{\underset{/\;\backslash}{\overset{\|}{C}}}$ | $ClO_4$ | $C_2H_5$, $C_3H_7$ | $C_2H_5$, $C_3H_7$ | $C_2H_5$, $C_3H_7$ | $C_2H_5$, $C_3H_7$ |
| [VI]-A-(19) | $\overset{O}{\underset{/\;\backslash}{\overset{\|}{C}}}$ | Br | $\underset{CH_2CHC_3H_7}{\overset{C_2H_5}{\|}}$, $\underset{CH_2CHC_3H_7}{\overset{C_2H_5}{\|}}$ | $n\text{-}C_5H_{11}$, $n\text{-}C_5H_{11}$ | $n\text{-}C_5H_{11}$, $n\text{-}C_5H_{11}$ | $n\text{-}C_5H_{11}$, $n\text{-}C_5H_{11}$ |
| [V]-A-(20) | $\overset{O}{\underset{/\;\backslash}{\overset{\|}{C}}}$ | $ClO_4$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ |
| [VI]-A-(21) | $\overset{O}{\underset{/\;\backslash}{\overset{\|}{C}}}$ | I | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-A-(22) | $\overset{O}{\underset{/\ \backslash}{\overset{\|}{C}}}$ | SbF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [VI]-A-(23) | $\overset{O}{\underset{/\ \backslash}{\overset{\|}{C}}}$ | ClO$_4$ | C$_6$H$_4$Cl, C$_6$H$_4$Cl | C$_6$H$_4$Cl, C$_6$H$_4$Cl | C$_6$H$_4$Cl, C$_6$H$_4$Cl | C$_6$H$_4$Cl, C$_6$H$_4$Cl |
| [VI]-A-(24) | $\overset{O}{\underset{/\ \backslash}{\overset{\|}{C}}}$ | AsF$_6$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [VI]-A-(25) | $\overset{O}{\underset{/\ \backslash}{\overset{\|}{C}}}$ | BF$_4$ | CH$_3$, CH$_3$ | CH$_3$, CH$_3$ | CH$_3$, CH$_3$ | CH$_3$, CH$_3$ |
| [VI]-A-(26) | $\overset{O}{\underset{/\ \backslash}{\overset{\|}{C}}}$ | Br | C$_2$H$_4$Cl, C$_2$H$_4$Cl | C$_2$H$_4$Cl, C$_2$H$_4$Cl | C$_2$H$_4$Cl, C$_2$H$_4$Cl | C$_2$H$_4$Cl, C$_2$H$_4$Cl |
| [VI]-A-(27) | $\overset{O}{\underset{/\ \backslash}{\overset{\|}{C}}}$ | SbF$_6$ | C$_2$H$_4$OCH$_3$, C$_2$H$_4$OCH$_3$ | C$_2$H$_4$OCH$_3$, C$_2$H$_4$OCH$_3$ | C$_2$H$_5$, C$_2$H$_5$ | C$_2$H$_5$, C$_2$H$_5$ |

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-B-(1) | $\underset{/\ \backslash}{\overset{C_2H_5}{\underset{\|}{N}}}$ | ClO$_4$ | CH$_2$OCH$_3$, CH$_2$OCH$_3$ | CH$_2$OCH$_3$, CH$_2$OCH$_3$ | CH$_2$OCH$_3$, CH$_2$OCH$_3$ | CH$_2$OCH$_3$, CH$_2$OCH$_3$ |
| [VI]-B-(2) | $\underset{/\ \backslash}{\overset{CH_3}{\underset{\|}{N}}}$ | BF$_4$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [VI]-B-(3) | $\underset{/\ \backslash}{\overset{C_2H_5}{\underset{\|}{N}}}$ | SbF$_6$ | C$_2$H$_5$, C$_2$H$_5$ | C$_2$H$_5$, C$_2$H$_5$ | C$_2$H$_5$, C$_2$H$_5$ | C$_2$H$_5$, C$_2$H$_5$ |
| [VI]-B-(4) | $\underset{/\ \backslash}{\overset{t-C_4H_9}{\underset{\|}{N}}}$ | Br | CH$_3$ \| CH$_2$CHC$_2$H$_5$, CH$_3$ \| CH$_2$CHC$_2$H$_5$ | CH$_3$ \| CH$_2$CHC$_2$H$_5$, CH$_3$ \| CH$_2$CHC$_2$H$_5$ | CH$_3$ \| CH$_2$CHC$_2$H$_5$, CH$_3$ \| CH$_2$CHC$_2$H$_5$ | CH$_3$ \| CH$_2$CHC$_2$H$_5$, CH$_3$ \| CH$_2$CHC$_2$H$_5$ |
| [VI]-B-(5) | $\underset{/\ \backslash}{\overset{i-C_3H_7}{\underset{\|}{N}}}$ | ClO$_4$ | n-C$_3$H$_7$, n-C$_3$H$_7$ | n-C$_3$H$_7$, n-C$_3$H$_7$ | n-C$_3$H$_7$, n-C$_3$H$_7$ | n-C$_3$H$_7$, n-C$_3$H$_7$ |
| [VI]-B-(6) | $\underset{/\ \backslash}{\overset{C_2H_4OCH_3}{\underset{\|}{N}}}$ | SbF$_6$ | iso-C$_3$H$_7$, iso-C$_3$H$_7$ | iso-C$_3$H$_7$, iso-C$_3$H$_7$ | iso-C$_3$H$_7$, iso-C$_3$H$_7$ | iso-C$_3$H$_7$, iso-C$_3$H$_7$ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-B-(7) | CH₃–N< | $CH_3SO_4$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ |
| [VI]-B-(8) | $CH_2CH=CH_2$–N< | $ClO_4$ | $CH_2CH=CH_2$, $CH_2CH=CH_2$ | $CH_2CH=CH_2$, $CH_2CH=CH_2$ | $CH_2CH=CH_2$, $CH_2CH=CH_2$ | $CH_2CH=CH_2$, $CH_2CH=CH_2$ |
| [VI]-B-(9) | Ph–N< | $AsF_6$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-B-(10) | $C_2H_5$–N< | $ClO_4$ | n-$C_4H_9$, n-$C_4H_9$ | n-$C_4H_9$, n-$C_4H_9$ | n-$C_4H_9$, n-$C_4H_9$ | n-$C_4H_9$, n-$C_4H_9$ |
| [VI]-B-(11) | $CH_2$Ph–N< | Cl | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ |
| [VI]-B-(12) | $C_2H_5$–N< | $ClO_4$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-B-(13) | CH₃–N< | $ClO_4$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ |
| [VI]-B-(14) | $C_2H_4OCH_3$–N< | $SbF_6$ | $C_2H_4OCH_3$, $C_2H_4OCH_3$ | $C_2H_4OCH_3$, $C_2H_4OCH_3$ | $C_2H_4OCH_3$, $C_2H_4OCH_3$ | $C_2H_4OCH_3$, $C_2H_4OCH_3$ |
| [VI]-B-(15) | $C_2H_5$–N< | $CH_3$-C₆H₄-$SO_3$ | n-$C_3H_7$, n-$C_3H_7$ | n-$C_4H_9$, n-$C_4H_9$ | n-$C_3H_7$, n-$C_3H_7$ | n-$C_4H_9$, n-$C_4H_9$ |
| [VI]-B-(16) | $C_2H_5$–N< | $ClO_4$ | n-$C_3H_7$, n-$C_3H_7$ | n-$C_3H_7$, n-$C_3H_7$ | n-$C_5H_{11}$, n-$C_5H_{11}$ | n-$C_5H_{11}$, n-$C_5H_{11}$ |
| [VI]-B-(17) | n-$C_4H_9$–N< | I | $C_3H_7OH$, $C_3H_7OH$ | $C_3H_7OH$, $C_3H_7OH$ | $C_3H_7OH$, $C_3H_7OH$ | $C_3H_7OH$, $C_3H_7OH$ |
| [VI]-B-(18) | n-$C_3H_7$–N< | $ClO_4$ | $C_2H_5$, $C_3H_7$ | $C_2H_5$, $C_3H_7$ | $C_2H_5$, $C_3H_7$ | $C_2H_5$, $C_3H_7$ |
| [VI]-B-(19) | n-$C_6H_{13}$–N< | Br | $C_2H_5$, $CH_2CHC_3H_7$, $C_2H_5$, $CH_2CHC_3H_7$ | n-$C_5H_{11}$, n-$C_5H_{11}$ | n-$C_5H_{11}$, n-$C_5H_{11}$ | n-$C_5H_{11}$, n-$C_5H_{11}$ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [V]-B-(20) | $C_2H_5$–N< | $ClO_4$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ |
| [VI]-B-(21) | $CH_2CH=CH_2$–N< | I | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ |
| [VI]-B-(22) | $C_2H_5$–N< | $SbF_6$ | $n$-$C_3H_7$, $n$-$C_3H_7$ | $n$-$C_3H_7$, $n$-$C_3H_7$ | $n$-$C_3H_7$, $n$-$C_3H_7$ | $n$-$C_3H_7$, $n$-$C_3H_7$ |
| [VI]-B-(23) | $CH_3$–C$_6H_4$–N< | $ClO_4$ | $C_6H_4Cl$, $C_6H_4Cl$ | $C_6H_4Cl$, $C_6H_4Cl$ | $C_6H_4Cl$, $C_6H_4Cl$ | $C_6H_4Cl$, $C_6H_4Cl$ |
| [VI]-B-(24) | $CH_3$–N< | $AsF_6$ | $n$-$C_3H_7$, $n$-$C_3H_7$ | $n$-$C_3H_7$, $n$-$C_3H_7$ | $n$-$C_3H_7$, $n$-$C_3H_7$ | $n$-$C_3H_7$, $n$-$C_3H_7$ |
| [VI]-B-(25) | $CH_3$–N< | $BF_4$ | $CH_3$, $CH_3$ | $CH_3$, $CH_3$ | $CH_3$, $CH_3$ | $CH_3$, $CH_3$ |
| [VI]-B-(26) | $C_2H_5$–N< | Br | $C_2H_4Cl$, $C_2H_4Cl$ | $C_2H_4Cl$, $C_2H_4Cl$ | $C_2H_4Cl$, $C_2H_4Cl$ | $C_2H_4Cl$, $C_2H_4Cl$ |
| [VI]-B-(27) | $C_2H_5$–N< | $SbF_6$ | $C_2H_4OCH_3$, $C_2H_4OCH_3$ | $C_2H_4OCH_3$, $C_2H_4OCH_3$ | $C_2H_5$, $C_2H_5$ | $C_2H_5$, $C_2H_5$ |

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-C-(1) | S< | $ClO_4$ | $CH_2OCH_3$, $CH_2OCH_3$ | $CH_2OCH_3$, $CH_2OCH_3$ | $CH_2OCH_3$, $CH_2OCH_3$ | $CH_2OCH_3$, $CH_2OCH_3$ |
| [VI]-C-(2) | S< | $BF_4$ | $C_2H_5$, $C_2H_5$ | $C_2H_5$, $C_2H_5$ | $C_2H_5$, $C_2H_5$ | $C_2H_5$, $C_2H_5$ |
| [VI]-C-(3) | S< | $SbF_6$ | $C_2H_5$, $C_2H_5$ | $C_2H_5$, $C_2H_5$ | $C_2H_5$, $C_2H_5$ | $C_2H_5$, $C_2H_5$ |
| [VI]-C-(4) | S< | Br | $CH_2\overset{\overset{\displaystyle CH_3}{\mid}}{C}HC_2H_5$, $CH_2\overset{\overset{\displaystyle CH_3}{\mid}}{C}HC_2H_5$ | $CH_2\overset{\overset{\displaystyle CH_3}{\mid}}{C}HC_2H_5$, $CH_2\overset{\overset{\displaystyle CH_3}{\mid}}{C}HC_2H_5$ | $CH_2\overset{\overset{\displaystyle CH_3}{\mid}}{C}HC_2H_5$, $CH_2\overset{\overset{\displaystyle CH_3}{\mid}}{C}HC_2H_5$ | $CH_2\overset{\overset{\displaystyle CH_3}{\mid}}{C}HC_2H_5$, $CH_2\overset{\overset{\displaystyle CH_3}{\mid}}{C}HC_2H_5$ |
| [VI]-C-(5) | S< | $ClO_4$ | $n$-$C_3H_7$, $n$-$C_3H_7$ | $n$-$C_3H_7$, $n$-$C_3H_7$ | $n$-$C_3H_7$, $n$-$C_3H_7$ | $n$-$C_3H_7$, $n$-$C_3H_7$ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-C-(6) | S | $SbF_6$ | iso-$C_3H_7$, iso-$C_3H_7$ | iso-$C_3H_7$, iso-$C_3H_7$ | iso-$C_3H_7$, iso-$C_3H_7$ | iso-$C_3H_7$, iso-$C_3H_7$ |
| [VI]-C-(7) | S | $CH_3SO_4$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ |
| [VI]-C-(8) | S | $ClO_4$ | $CH_2CH=CH_2$, $CH_2CH=CH_2$ | $CH_2CH=CH_2$, $CH_2CH=CH_2$ | $CH_2CH=CH_2$, $CH_2CH=CH_2$ | $CH_2CH=CH_2$, $CH_2CH=CH_2$ |
| [VI]-C-(9) | S | $AsF_6$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-C-(10) | S | $ClO_4$ | n-$C_4H_9$, n-$C_4H_9$ | n-$C_4H_9$, n-$C_4H_9$ | n-$C_4H_9$, n-$C_4H_9$ | n-$C_4H_9$, n-$C_4H_9$ |
| [VI]-C-(11) | S | Cl | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ |
| [VI]-C-(12) | S | $ClO_4$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-C-(13) | S | $ClO_4$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ |
| [VI]-C-(14) | S | $SbF_6$ | $C_2H_4OCH_3$, $C_2H_4OCH_3$ | $C_2H_4OCH_3$, $C_2H_4OCH_3$ | $C_2H_4OCH_3$, $C_2H_4OCH_3$ | $C_2H_4OCH_3$, $C_2H_4OCH_3$ |
| [VI-C-(15) | S | $CH_3$-C$_6H_4$-$SO_3$ | n-$C_3H_7$, n-$C_3H_7$ | n-$C_4H_9$, n-$C_4H_9$ | n-$C_3H_7$, n-$C_3H_7$ | n-$C_4H_9$, n-$C_4H_9$ |
| [VI]-C-(16) | S | $ClO_4$ | n-$C_3H_7$, n-$C_3H_7$ | n-$C_3H_7$, n-$C_3H_7$ | n-$C_5H_{11}$, n-$C_5H_{11}$ | n-$C_5H_{11}$, n-$C_5H_{11}$ |
| [VI]-C-(17) | S | I | $C_3H_7OH$, $C_3H_7OH$ | $C_3H_7OH$, $C_3H_7OH$ | $C_3H_7OH$, $C_3H_7OH$ | $C_3H_7OH$, $C_3H_7OH$ |
| [VI]-C-(18) | S | $ClO_4$ | $C_2H_5$, $C_3H_7$ | $C_2H_5$, $C_3H_7$ | $C_2H_5$, $C_3H_7$ | $C_2H_5$, $C_3H_7$ |
| [VI]-C-(19) | S | Br | $CH_2CH(C_2H_5)C_3H_7$, $CH_2CH(C_2H_5)C_3H_7$ | n-$C_5H_{11}$, n-$C_5H_{11}$ | n-$C_5H_{11}$, n-$C_5H_{11}$ | n-$C_5H_{11}$, n-$C_5H_{11}$ |
| [VI]-C-(20) | S | $ClO_4$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ |
| [VI]-C-(21) | S | I | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ |
| [VI]-C-(22) | S | $SbF_6$ | n-$C_3H_7$, n-$C_3H_7$ | n-$C_3H_7$, n-$C_3H_7$ | n-$C_3H_7$, n-$C_3H_7$ | n-$C_3H_7$, n-$C_3H_7$ |
| [VI]-C-(23) | S | $ClO_4$ | $C_6H_4Cl$, $C_6H_4Cl$ | $C_6H_4Cl$, $C_6H_4Cl$ | $C_6H_4Cl$, $C_6H_4Cl$ | $C_6H_4Cl$, $C_6H_4Cl$ |
| [VI]-C-(24) | S | $AsF_6$ | n-$C_3H_7$, n-$C_3H_7$ | n-$C_3H_7$, n-$C_3H_7$ | n-$C_3H_7$, n-$C_3H_7$ | n-$C_3H_7$, n-$C_3H_7$ |

-continued

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-C-(25) | S△ | $BF_4$ | $CH_3$, $CH_3$ | $CH_3$, $CH_3$ | $CH_3$, $CH_3$ | $CH_3$, $CH_3$ |
| [VI]-C-(26) | S△ | Br | $C_2H_4Cl$, $C_2H_4Cl$ | $C_2H_4Cl$, $C_2H_4Cl$ | $C_2H_4Cl$, $C_2H_4Cl$ | $C_2H_4Cl$, $C_2H_4Cl$ |
| [VI]-C-(27) | S△ | $SbF_6$ | $C_2H_4OCH_3$, $C_2H_4OCH_3$ | $C_2H_4OCH_3$, $C_2H_4OCH_3$ | $C_2H_5$, $C_2H_5$ | $C_2H_5$, $C_2H_5$ |

| Compound No. | —Z— | X | $\begin{pmatrix} R''_1 \\ R''_2 \end{pmatrix}$ | $\begin{pmatrix} R''_3 \\ R''_4 \end{pmatrix}$ | $\begin{pmatrix} R''_5 \\ R''_6 \end{pmatrix}$ | $\begin{pmatrix} R''_7 \\ R''_8 \end{pmatrix}$ |
|---|---|---|---|---|---|---|
| [VI]-D-(1) | O△ | $ClO_4$ | $CH_2OCH_3$, $CH_2OCH_3$ | $CH_2OCH_3$, $CH_2OCH_3$ | $CH_2OCH_3$, $CH_2OCH_3$ | $CH_2OCH_3$, $CH_2OCH_3$ |
| [VI]-D-(2) | O△ | $BF_4$ | $C_2H_5$, $C_2H_5$ | $C_2H_5$, $C_2H_5$ | $C_2H_5$, $C_2H_5$ | $C_2H_5$, $C_2H_5$ |
| [VI]-D-(3) | O△ | $SbF_6$ | $C_2H_5$, $C_2H_5$ | $C_2H_5$, $C_2H_5$ | $C_2H_5$, $C_2H_5$ | $C_2H_5$, $C_2H_5$ |
| [VI]-D-(4) | O△ | Br | $CH_3$ \| $CH_2CHC_2H_5$, $CH_3$ \| $CH_2CHC_2H_5$ | $CH_3$ \| $CH_2CHC_2H_5$, $CH_3$ \| $CH_2CHC_2H_5$ | $CH_3$ \| $CH_2CHC_2H_5$, $CH_3$ \| $CH_2CHC_2H_5$ | $CH_3$ \| $CH_2CHC_2H_5$, $CH_3$ \| $CH_2CHC_2H_5$ |
| [VI]-D-(5) | O△ | $ClO_4$ | n-$C_3H_7$, n-$C_3H_7$ | n-$C_3H_7$, n-$C_3H_7$ | n-$C_3H_7$, n-$C_3H_7$ | n-$C_3H_7$, n-$C_3H_7$ |
| [VI]-D-(6) | O△ | $SbF_6$ | iso-$C_3H_7$, iso-$C_3H_7$ | iso-$C_3H_7$, iso-$C_3H_7$ | iso-$C_3H_7$, iso-$C_3H_7$ | iso-$C_3H_7$, iso-$C_3H_7$ |
| [VI]-D-(7) | O△ | $CH_3SO_4$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ | $C_3H_6OC_3H_7$, $C_3H_6OC_3H_7$ |
| [VI]-D-(8) | O△ | $ClO_4$ | $CH_2CH=CH_2$, $CH_2CH=CH_2$ | $CH_2CH=CH_2$, $CH_2CH=CH_2$ | $CH_2CH=CH_2$, $CH_2CH=CH_2$ | $CH_2CH=CH_2$, $CH_2CH=CH_2$ |
| [VI]-D-(9) | O△ | $AsF_6$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-D-(10) | O△ | $ClO_4$ | n-$C_4H_9$, n-$C_4H_9$ | n-$C_4H_9$, n-$C_4H_9$ | n-$C_4H_9$, n-$C_4H_9$ | n-$C_4H_9$, n-$C_4H_9$ |
| [VI]-D-(11) | O△ | Cl | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ | n-$C_{10}H_{21}$, n-$C_{10}H_{21}$ |
| [VI]-D-(12) | O△ | $ClO_4$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ | $C_2H_4CH=CH_2$, $C_2H_4CH=CH_2$ |
| [VI]-D-(13) | O△ | $ClO_4$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ | $C_2H_4OC_2H_5$, $C_2H_4OC_2H_5$ |
| [VI]-D-(14) | O△ | $SbF_6$ | $C_2H_4OCH_3$, $C_2H_4OCH_3$ | $C_2H_4OCH_3$, $C_2H_4OCH_3$ | $C_2H_4OCH_3$, $C_2H_4OCH_3$ | $C_2H_4OCH_3$, $C_2H_4OCH_3$ |

-continued

| Compound No. | —Z— | X | (R"₁, R"₂) | (R"₃, R"₄) | (R"₅, R"₆) | (R"₇, R"₈) |
|---|---|---|---|---|---|---|
| [VI]-D-(15) | O (epoxide) | CH₃-C₆H₄-SO₃ | n-$C_3H_7$, n-$C_3H_7$ | n-$C_4H_9$, n-$C_4H_9$ | n-$C_3H_7$, n-$C_3H_7$ | n-$C_4H_9$, n-$C_4H_9$ |
| [VI]-D-(16) | O (epoxide) | $ClO_4$ | n-$C_3H_7$, n-$C_3H_7$ | n-$C_3H_7$, n-$C_3H_7$ | n-$C_5H_{11}$, n-$C_5H_{11}$ | n-$C_5H_{11}$, n-$C_5H_{11}$ |
| [VI]-D-(17) | O (epoxide) | I | $C_3H_7OH$, $C_3H_7OH$ | $C_3H_7OH$, $C_3H_7OH$ | $C_3H_7OH$, $C_3H_7OH$ | $C_3H_7OH$, $C_3H_7OH$ |
| [VI]-D-(18) | O (epoxide) | $ClO_4$ | $C_2H_5$, $C_3H_7$ | $C_2H_5$, $C_3H_7$ | $C_2H_5$, $C_3H_7$ | $C_2H_5$, $C_3H_7$ |
| [VI]-D-(19) | O (epoxide) | Br | $CH_2CH(C_2H_5)C_3H_7$, $CH_2CH(C_2H_5)C_3H_7$ | n-$C_5H_{11}$, n-$C_5H_{11}$ | n-$C_5H_{11}$, n-$C_5H_{11}$ | n-$C_5H_{11}$, n-$C_5H_{11}$ |
| [VI]-D-(20) | O (epoxide) | $ClO_4$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ | $C_2H_4C\equiv CH$, $C_2H_4C\equiv CH$ |
| [VI]-D-(21) | O (epoxide) | I | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ | $C_3H_6C\equiv CH$, $C_3H_6C\equiv CH$ |
| [VI]-D-(22) | O (epoxide) | $SbF_6$ | n-$C_3H_7$, n-$C_3H_7$ | n-$C_3H_7$, n-$C_3H_7$ | n-$C_3H_7$, n-$C_3H_7$ | n-$C_3H_7$, n-$C_3H_7$ |
| [VI]-D-(23) | O (epoxide) | $ClO_4$ | $C_6H_4Cl$, $C_6H_4Cl$ | $C_6H_4Cl$, $C_6H_4Cl$ | $C_6H_4Cl$, $C_6H_4Cl$ | $C_6H_4Cl$, $C_6H_4Cl$ |
| [VI]-D-(24) | O (epoxide) | $AsF_6$ | n-$C_3H_7$, n-$C_3H_7$ | n-$C_3H_7$, n-$C_3H_7$ | n-$C_3H_7$, n-$C_3H_7$ | n-$C_3H_7$, n-$C_3H_7$ |
| [VI]-D-(25) | O (epoxide) | $BF_4$ | $CH_3$, $CH_3$ | $CH_3$, $CH_3$ | $CH_3$, $CH_3$ | $CH_3$, $CH_3$ |
| [VI]-D-(26) | O (epoxide) | Br | $C_2H_4Cl$, $C_2H_4Cl$ | $C_2H_4Cl$, $C_2H_4Cl$ | $C_2H_4Cl$, $C_2H_4Cl$ | $C_2H_4Cl$, $C_2H_4Cl$ |
| [VI]-D-(27) | O (epoxide) | $SbF_6$ | $C_2H_4OCH_3$, $C_2H_4OCH_3$ | $C_2H_4OCH_3$, $C_2H_4OCH_3$ | $C_2H_5$, $C_2H_5$ | $C_2H_5$, $C_2H_5$ |

The infrared-absorptive compounds of the present invention, represented by formulas (V) and (VI) can be synthesized, as previously described, by the methods disclosed in U.S. Pat. Nos. 3,251,881, 3,575,871 and 3,484,467 and Japanese Patent Application Laid-Open No. 61-69991. For example, they can be synthesized according to the following scheme.

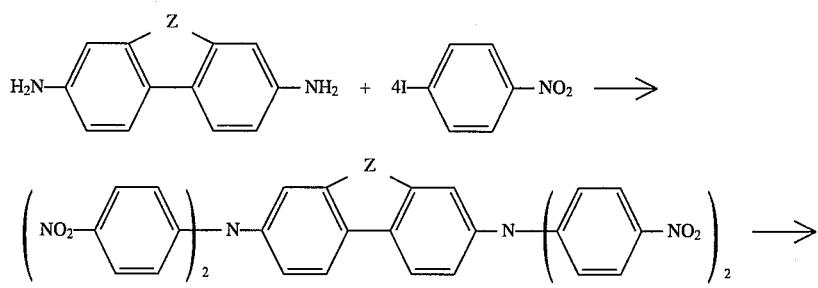

-continued

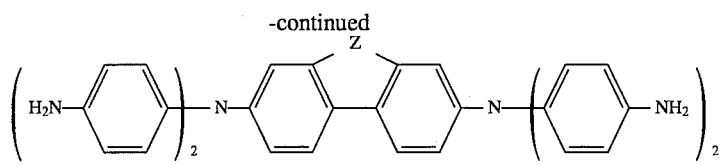

The amino compound obtained by the above Ullmann reaction and reduction reaction is subjected to selective substitution, i.e., for example, alkylation, alkoxyalkylation, alkenylation, aralkylation or alkynylation to substitute the hydrogen atom(s) of amino groups of the amino compound, followed by silver salt oxidation or electrolytic oxidation reaction to give the end product.

In an instance in which $R''_1$ to $R''_8$ are asymmetrically formed, the selective substitution must be multi-stepwise carried out. In view of cost $R''_1$ to $R''_8$ may preferably be the same.

The above infrared-absorptive compounds of the present invention have a maximum absorption wavelength of 900 nm or more and an absorptivity coefficient of from several tens of thousands to hundred and several tens of thousands, showing a great absorption peak.

Such compounds can be used, for example, in thermal insulating films, sunglasses, etc.

The infrared-absorptive compounds represented by formulas (I), (II), (III), (IV), (V) and (VI) described above are very effective for their incorporation into recording layers containing organic coloring matter of optical recording mediums. More specifically, incorporation of the infrared-absorptive compound of the present invention into an organic coloring matter recording layer of optical recording mediums makes it possible to prevent recording-reproducing performance (e.g., C/N ratio and contrast ratio) from being lowered because of irradiation of optical recording mediums with natural light or reproducing light, and also makes it possible to very greatly prevent recording-reproducing performance of optical recording mediums from being lowered in an environment of high temperature compared with optical recording mediums having organic coloring matter recording layers containing any conventional infrared-absorptive compounds.

The infrared-absorptive compounds represented by formulas (I) to (VI) of the present invention show a good solvent solubility, and it becomes possible to improve productivity of a high-quality optical recording medium without causing an increase in noise level of optical recording mediums, even when the organic coloring matter recording layers are formed by wet coating.

In the optical recording medium according to the present invention, the organic coloring matter incorporated into the recording layer together with the infrared-absorptive compound of the present invention may include commonly available organic coloring matters usable in optical recording mediums, as exemplified by cyanine dyes, merocyanine dyes, croconium dyes, squalium dyes, azlenium dyes, polymethine dyes, naphthoquinone dyes, pyrylium dyes and phthalocyanine dyes, specifically including, for example, polymethine dyes disclosed in U.S. Pat. No. 5,079,127, represented by the following formula (VIII), and cyanine dyes disclosed in Japanese Patent Application Laid-open No. 1-21798, represented by the following formula (IX).

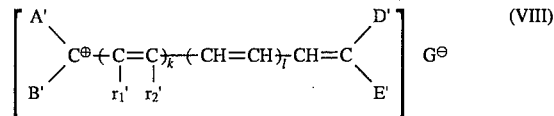

wherein, A', B', D' and E' each represent a hydrogen atom or a group selected from a substituted or unsubstituted alkyl group-, a substituted or unsubstituted alkenyl group, a substituted or unsubstituted aralkyl group, a substituted or unsubstituted aryl group, a substituted or unsubstituted styryl group and a substituted or unsubstituted heterocyclic group; $r_1'$ and $r_2'$ each represent a hydrogen atom or a group selected from a substituted or unsubstituted alkyl group, a substituted or unsubstituted cyclic alkyl group, a substituted or unsubstituted alkenyl group, a substituted or unsubstituted aralkyl group and a substituted or unsubstituted aryl group; k is 0 or 1 and l is 0, 1 or 2; and $G^\ominus$ represents an anionic residual group.

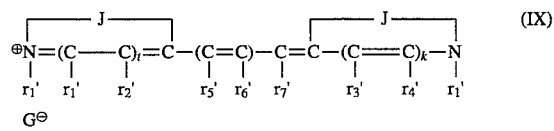

wherein "J" represents a group of non-metal atoms necessary to complete a nitrogen-containing heterocyclic ring; $r_1'$ to $r_7'$ are each as defined for $r_1'$ and $r_2'$ previously; t is 0 or 1, k is 0 or 1 and l is 0, 1 or 2; and $G^\ominus$ represents an anionic residual group.

In the optical recording medium according to the present invention, the infrared-absorptive compound of the present invention may suitably be added in the recording layer in an amount of from 1 to 60% by weight, preferably from 5 to 40% by weight, and more preferably from 10 to 30% by weight, based on the whole solid content of the recording layer.

The optical recording medium of the present invention can be formed by providing as shown in FIG. 1 a recording layer 2 on a substrate 1.

As materials for the substrate 1, it is possible to use plastics of polyesters, polycarbonates, acrylic resins, polyolefin resins, phenol resins, epoxy resins, polyamides, polyimides or the like, glasses, or metals.

Incidentally, the recording layer 2 can be formed on the substrate 1 by various methods including wet coating and gaseous phase deposition such as vacuum deposition. In particular, the wet coating is a preferable method in view of the reduction of production cost of the optical recording medium.

In the case when the wet coating is used, the recording layer can be formed by coating on the substrate 1 a solution prepared by dissolving or dispersing the polymethine compound (the infrared-absorptive compound) in an organic solvent. If necessary, the recording layer can also be formed by mixing a binder in it, taking account of film forming properties and coating film stability.

The organic solvent that can be used in the wet coating may vary depending on whether the polymethine compound is dispersed or dissolved. In usual instances, solvents of an alcohol type, a ketone type, an amide type, an ether type, an ester type, an aliphatic halogenated hydrocarbon type, an aromatic type, an aliphatic hydrocarbon type or a fluorine type can be used. In particular, solvents capable of well dissolving the polymethine compound of the present invention are preferred.

Meanwhile, in the case when the wet coating is directly carried out on a resin substrate, an organic solvent that does not dissolve the surface of the resin substrate or may cause no cracking on the surface of the resin substrate must be selected from among the organic solvents described above.

Since, however, the infrared-absorptive compound according to the present invention has a superior solvent solubility, the solvents for coating or materials for the substrate can be selected in a wider range than in conventional cases even when an organic coloring matter solution is coated by wet coating and also the conditions for producing excellent optical recording mediums with a low noise level can be moderated than in conventional cases.

The binder mentioned above may include, for example, nitrocellulose, ethyl cellulose, polystyrene, polyvinyl pyrrolidone, polymethyl methacrylate and polyamide. Waxes, higher fatty acids and amides as exemplified by oleylamide may also optionally be used as additives.

In the above binder, a plasticizer such as dioctyl phthalate, dibutyl phthalate or tricresyl phosphate, an oil such as mineral oil or vegetable oil and also a dispersing agent such as a sodium alkylbenzenesulfonate or a polyoxyethylene alkylphenyl ether, as well as other additives may be appropriately mixed so that the film forming properties and coating film stability of the recording layer can be improved.

The coating can be carried out using a coating process such as dip coating, spray coating, spin coating, bead coating, wire bar coating, blade coating, curtain coating, roller coating or gravure coating.

It is suitable for the recording layer to have a layer thickness of from 100 Å to 20 μm, and preferably from 200 Å to 1 μm. It is better for the layer to be as thin as possible so long as a thin film having a sufficient light-reflectance to recording laser light can be stably formed.

Figure 2:
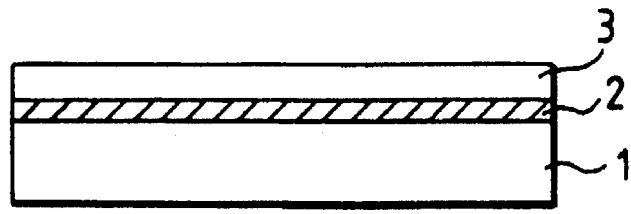
FIG. 2 is a cross-sectional illustration of another embodiment of the optical recording medium according to the present invention.

As shown in FIG. 2, the optical recording medium of the present invention may also be provided on the recording layer 2, with a protective layer 3 that is transparent to recording-reproducing laser light. The protective layer 3 may be opaque when irradiated with light from the substrate 1 side.

Figure 3:
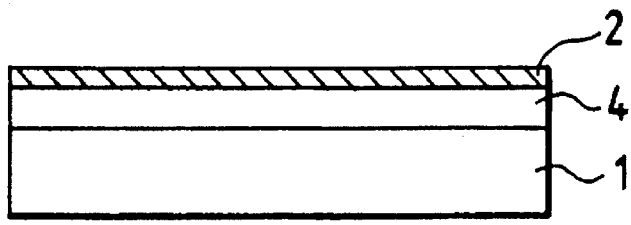
FIG. 3 is a cross-sectional illustration of still another embodiment of the optical recording medium according to the present invention.

As shown in FIG. 3, a subbing layer 4 may also be provided between the substrate 1 and the recording layer 2.

Figure 4:
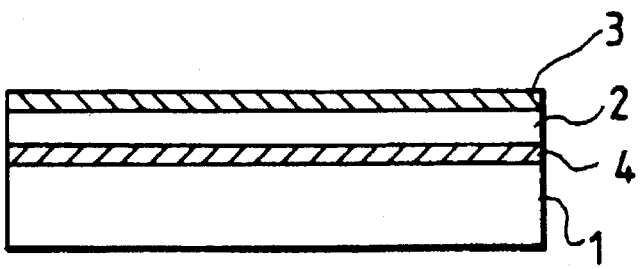
FIG. 4 is a cross-sectional illustration of still another embodiment of the optical recording medium according to the present invention.

As shown in FIG. 4, it is also possible to form the protective layer and the subbing layer 4 together.

The subbing layer 3 is provided for the purposes of (a) improving adhesion, (b) serving as a barrier to water or gas, (c) improving storage stability of the recording layer, (d) improving reflectance, (e) protecting the substrate from solvents and (f) forming pregrooves. For the purpose (a), polymeric materials can be used, as exemplified by various materials such as ionomer resins, polyamide resins, vinyl resins, natural polymers, silicone end liquid rubbers, or various substances such as silane coupling agents. For the purposes (b) end (c), besides the above polymeric materials, it is possible to use inorganic compounds as exemplified by $SiO_2$, $MgF_2$, SiO, $TiO_2$, ZnO, TiN and SiN, and metals or semimetals as exemplified by Zn, Cu, S, Ni, Cr, Ge, Se, Cd, Ag and Al. For the purpose (d), metals as exemplified by Al end Ag, or materials capable of forming organic thin films having a metallic gloss, as exemplified by eyenine dyes and methine dyes can be used. For the purposes (e) and (f), ultraviolet-curable resins, thermosetting resins and thermoplastic resins can be used. It is suitable for the subbing layer to have a layer thickness of from 50 Å to 100 μm and preferably from 200 Å to 30 μm.

The protective layer is provided for the purposes of protecting the recording layer from scratches, dust, soil, etc. and improving storage stability and reflectance of the recording layer. As materials therefor, the same materials as those for the subbing layer can be used. It is suitable for the protective layer to have a layer thickness of 100 Å or more, and preferably 1,000 Å or more.

Here, the subbing layer and/or the protective layer may contain(s) the polymethine compound of formula (I) of the present invention. The subbing layer or the protective layer may also contain a stabilizer, a dispersing agent, a flame retardant, a lubricant, an antistatic agent, a surface active agent, a plasticizer and so forth.

The optical recording medium of the present invention may also be differently constructed to have what is called the air-sandwich structure wherein two recording mediums having the same construction as shown in FIGS. 1 to 4 (one of them being comprised of only the substrate as occasion calls) are so sealed as for the recording layer(s) 2 is/are provided in the inside, or to have what is called the joined structure (laminated structure) wherein two recording mediums are bonded through the protective layer 3.

The optical recording medium of the present invention, produced in this way (a record blank in which no information has been recorded) is irradiated with modulated recording electromagnetic radiations to cause decoloration or color changes or produce depressions (or pits), thereby giving an information record in which information has been recorded.

In particular, in the optical recording medium of the present invention, the information can be recorded by irradiation with light of a gas laser such as a helium-neon laser (oscillation wavelength: 633 nm). What is suited therefor is a method in which a record is made by irradiation with beams of a laser having an oscillation wavelength in the near infrared or infrared region, e.g., preferably a laser having a wavelength of 750 nm or more, in particular, a gallium-aluminum-arsenic semiconductor laser (oscillation wavelength: 830 nm), to form depressions in the recording layer. In order to read out the information, the above laser beams, having been adjusted to an intensity that may cause no changes in the recording layer, may be used. Here, the writing and the read-out can be performed using a laser having the same wavelength, or may be performed using lasers having different wavelengths.

As described above, the present invention has the following advantages.

(1) An infrared-absorptive compound very stable even in an environment of high temperature can be obtained.
(2) An infrared-absorptive compound having a superior heat resistance and also exhibiting a good solvent solubility can be obtained.
(3) An optical recording medium more improved in storage stability in an environment of high temperature and also having a superior light-resistance stability can be obtained.
(4) A high-quality optical recording medium having superior storage stability and light-resistance stability in an environment of high temperature and also promising a low noise level during reproduction can be produced in a good productivity.

EXAMPLES

The present invention will be described below in greater detail by giving Examples. In the following, "part(s)" refers to "part(s) by weight".

Synthesis Example 1

In dimethylformamide, 0.05 mol of p-phenylenediamine, 0.3 mol of p-nitroiodobenzene, 0.12 mol of anhydrous potassium carbonate, and copper powder were added and refluxed with stirring for 4 days. After the reaction was completed, the reaction mixture was filtered, and the filtered product was thoroughly washed with dimethylformamide, water and acetone, followed by drying. Thus, 0.040 mol of reddish brown tetrakis(p-nitrophenyl)-p-phenylenediamine was obtained.

In an autoclave, 12 parts of the compound thus obtained was added together with 50 parts of dimethylformamide and 0.5 part of palladium-carbon hydrogenated catalyst, and hydrogen gas was applied thereto at 5.0 kg/cm$^2$, followed by stirring at 90° C. to 100° C. until the absorption of hydrogen ceased.

After the reaction was completed, the reaction fluid was filtered, and the filtered product was washed with dimethylformamide and then was poured into 200 parts of ice water. After stirring for a while, the precipitate was collected by filtration. This precipitate was recrystallized using an ethanol-dimethylformamide mixed solvent, to give 8 parts of tetrakis(p-aminophenyl)-p-phenylenediamine. Its purity was measured by high-speed liquid chromatography to reveal that it was 99.0%.

As a result of NMR (d$_6$-DMSO) analysis subsequently carried out, absorption of amino groups corresponding to 8 hydrogen atoms was observed at δ 3.36 ppm, and a broad doublet absorption of an aromatic ring corresponding to 20 hydrogen atoms, at δ 6.40 to 6.50 ppm.

Synthesis of Compound No.(I)-(A)-(1)

Together with 12 parts of dimethylformamide, 0.5 part of anhydrous sodium hydrogencarbonate and 4.0 parts of 2,2,2-trifluoroethyl iodide, 2 parts of the amino compound described above was heated and stirred at 100° C. to 130° C. After the reaction was carried out for 36 hours, the reaction fluid was poured into 80 parts of ice water, followed by extraction with ethyl acetate. The extract was dried and then purified using silica gel columns to give tetrakis[bis-(2-trifluoroethyl)aminophenyl] phenylenediamine, which was obtained in an amount of 1.6 parts. The compound thus obtained was subjected to infrared absorption analysis to confirm the extinction of absorption according to NH stretching vibration of amino groups.

In 18 parts of acetone, 1 part of this compound was dispersed, to which an equimolar amount of silver perchlorate was added with stirring. After the reaction was carried out at room temperature for 1 hour, the silver deposited was separated by filtration, and the filtrate was diluted with isopropyl ether. The dilute solution was left to stand, and green crystals deposited were collected by filtration to give the end compound, which was obtained in an amount of 0.6 part.

| $C_{46}H_{36}N_6F_{24}ClO_4$ (molecular weight: 1,228.28) | | | |
|---|---|---|---|
| | C | H | N |
| Calculated: | 44.98% | 2.95% | 6.84% |
| Found: | 44.96% | 2.94% | 6.83% |

The compound thus obtained was subjected to measurement of its absorption maximum wavelength, using a spectrophotometer (trade name: U-3410; manufactured by Hitachi Ltd.) to reveal that it was a compound with a region of large absorption in the infrared region at 1,260 nm and 960 nm each.

Synthesis of Compound No.(II)-(A)-(8)

In 25 parts of acetone, 1 part of the tetrakis[bis-(2-trifluoroethyl)aminophenyl]phenylenediamine as used in the synthesis of compound No.(I)-(A)-(1) was dispersed, and to the dispersion 2-fold mole of silver hexafluoroantimonate was added with stirring. After the reaction was carried out at room temperature for 1 hour, the silver deposited was separated by filtration, and the filtrate was diluted with isopropyl ether. Dark blue crystals deposited were collected by filtration to give 60 parts of the compound. This compound was an infrared-absorptive compound having a maximum absorption at 1,178 nm.

| $C_{46}H_{36}N_6F_{36}Sb_2$ (molecular weight: 1,600.35) | | | |
|---|---|---|---|
| | C | H | N |
| Calculated: | 34.52% | 2.27% | 5.25% |
| Found: | 34.50% | 2.25% | 5.23% |

Synthesis Example 2

While applying ammonia gas at 42.0 kg/cm$^2$ in an autoclave, 0.1 mol of 9,10-dibromoanthracene was stirred at 190° to 200° C. to give 0.08 mol of 9,10-diaminoanthracene.

In dimethylformamide, 0.05 mol of 9,10-diaminoanthracene, 0.35 mol of p-nitroiodobenzene, 0.14 mol of anhydrous potassium carbonate, and copper powder were added and refluxed with stirring for 4 days. After the reaction was completed, the reaction mixture was filtered, and the filtered product was thoroughly washed with dimethylformamide, water and acetone, followed by drying. Thus, 0.043 mol of brown tetrakis(p-nitrophenyl)-9,10-diaminoanthracene was obtained.

In an autoclave, 13 parts of the compound thus obtained was added together with 60 parts of dimethylformamide and 0.5 part of palladium-carbon hydrogenated catalyst, and hydrogen gas was applied thereto at 5.0 kg/cm$^2$, followed by stirring at 90° C. to 100° C. until the absorption of hydrogen ceased.

After the reaction was completed, the reaction fluid was filtered, and the filtered product was washed with dimethylformamide and then was poured into 250 parts of ice water. After stirring for a while, the precipitate was collected by filtration. This precipitate was recrystallized using an ethanol-dimethylformamide mixed solvent, to give 7 parts of tetrakis(p-aminophenyl)-9,10-diaminoanthracene. Its purity was measured by high-speed liquid chromatography to reveal that it was 98.8%.

As a result of NMR (d$_6$-DMSO) analysis of this compound, absorption of amino groups corresponding to 8 hydrogen atoms was observed at δ3.37 ppm, and a broad absorption of an aromatic ring corresponding to 24 hydrogen atoms, at δ6.38 to 6.51 ppm.

Synthesis of Compound No.(III)-(5)

Together with 13 parts of dimethylformamide, 6 part of anhydrous sodium hydrogencarbonate and 5.0 parts of propyl bromide, 2 parts of the amino compound described above was heated and stirred at 100° C. to 130° C. After the reaction was carried out for 36 hours, the reaction fluid was poured into 90 parts of ice water, followed by extraction with ethyl acetate. The extract was dried and then purified using silica gel columns to give tetrakis(p-propylaminophenyl)-9,10-diaminoanthracene, which was obtained in an amount of 1.6 parts. The compound thus obtained was subjected to infrared absorption analysis to confirm the extinction of absorption according to NH stretching vibration of amino groups.

In 19 parts of acetone, 1 part of this compound was dispersed, to which an equimolar amount of silver perchlorate was added with stirring. After the reaction was carried out at room temperature for 1 hour, the silver deposited was separated by filtration, and the filtrate was diluted with isopropyl ether. The dilute solution was left to stand, and crystals deposited were collected by filtration to give the end compound, which was obtained in an amount of 0.7 part.

The compound thus obtained was a compound with a region of large absorption in the infrared region at 1,250 nm and 956 nm each.

| $C_{62}H_{80}N_6ClO_4$ (molecular weight: 1,008.80) | | | |
|---|---|---|---|
| | C | H | N |
| Calculated: | 73.82% | 8.00% | 8.33% |
| Found: | 73.83% | 7.98% | 8.30% |

Synthesis of Compound No.(IV)-(28)

In 22 parts of acetone, 1 part of the tetrakis(p-propylaminophenyl)-9,10-diaminoanthracene as used in the synthesis of compound No.(III)-(5) was dispersed, and to the dispersion 2-fold mole of silver hexafluoroantimonate was added with stirring. After the reaction was carried out at room temperature for 1 hour, the silver deposited was separated by filtration, and the filtrate was diluted with isopropyl ether. Crystals deposited were collected by filtration to give 0.58 part of the compound. This compound Was an infrared-absorptive compound having a maximum absorption at 1,178 nm.

| $C_{62}H_{80}N_6Sb_2F_{12}$ (molecular weight: 1,380.87) | | | |
|---|---|---|---|
| | C | H | N |
| Calculated: | 53.93% | 5.84% | 6.09% |
| Found: | 53.90% | 5.82% | 6.07% |

Synthesis Example 3

In dimethylformamide, 0.05 mol of 2,7-diamino-9-fluorenone, 0.3 mol of p-nitroiodobenzene, 0.12 mol of anhydrous potassium carbonate, and copper powder were added and refluxed with stirring for 4 days. After the reaction was completed, the reaction mixture was filtered, and the filtered product was thoroughly washed with dimethylformamide, water and acetone, followed by drying. Thus, 0.038 mol of reddish brown tetrakis(p-nitrophenyl)-2,7-diamino-9-fluorenone was obtained.

In an autoclave, 12 parts of the compound thus obtained was added together with 50 parts of dimethylformamide and 0.5 part of palladium-carbon hydrogenated catalyst, and hydrogen gas was applied thereto at 5.0 kg/cm², followed by stirring at 90° C. to 100° C. until the absorption of hydrogen ceased.

After the reaction was completed, the reaction fluid was filtered, and the filtered product was washed with dimethylformamide and then was poured into 200 parts of ice water. After stirring for a while, the precipitate was collected by filtration. This precipitate was recrystallized using an ethanol-dimethylformamide mixed solvent, to give 7 parts of tetrakis(p-aminophenyl)-2,7-diamino-9-fluorenone. Its purity was measured by high-speed liquid chromatography to reveal that it was 98.9%.

As a result of NMR (d$_6$-DMSO) analysis subsequently carried out, absorption of amino groups corresponding to 8 hydrogen atoms was observed at δ 3.36 ppm, and a broad absorption of an aromatic ring corresponding to 22 hydrogen atoms, at δ6.38 to 6.51 ppm.

Synthesis of Compound No.(V)-A-(5)

Together with 12 parts of dimethylformamide, 0.5 part of anhydrous sodium hydrogencarbonate and 5.0 parts of n-propyl bromide, 2 parts of the amino compound described above was heated and stirred at 100° C. to 130° C. After the reaction was carried out for 36 hours, the reaction fluid was poured into 90 parts of ice water, followed by extraction with ethyl acetate. The extract was dried and then purified using silica gel columns to give tetrakis(p-propylaminophenyl)-2,7-diamino-9-fluorenone, which was obtained in an amount of 1.7 parts. The compound thus obtained was subjected to infrared absorption analysis to confirm the extinction of absorption according to NH stretching vibration of amino groups.

In 19 parts of acetone, 1 part of this compound was dispersed, to which an equimolar amount of silver perchlorate was added with stirring. After the reaction was carried out at room temperature for 1 hour, the silver deposited was separated by filtration, and the filtrate was diluted with isopropyl ether. The dilute solution was left to stand, and crystals deposited were collected by filtration to give the end compound, which was obtained in an amount of 0.7 part.

The compound thus obtained was a compound with a region of large absorption in the infrared region at 1,255 nm and 960 nm each.

| $C_{61}H_{78}N_6ClO_5$ (molecular weight: 1,010.78) | | | |
|---|---|---|---|
| | C | H | N |
| Calculated: | 72.49% | 7.78% | 8.31% |
| Found: | 72.47% | 7.76% | 8.28% |

Synthesis of Compound No.(VI)-A-(22)

In 22 parts of acetone, 1 part of the tetrakis(p-propylaminophenyl)-2,7-diamino-9-fluorenone as used in the synthesis of compound No.(V)-A-(5) was dispersed, end to the dispersion 2-fold mole of silver hexafluoroantimonate was added with stirring. After the reaction was carried out at room temperature for 1 hour, the silver deposited was separated by filtration, and the filtrate was diluted with isopropyl ether. Crystals deposited were collected by filtration to give 0.56 part of the compound. This compound was an infrared-absorptive compound having a maximum absorption at 1,185 nm.

| $C_{61}H_{78}N_6 Sb_2F_{12}$ (molecular weight: 1,382.83) | | | |
|---|---|---|---|
| | C | H | N |
| Calculated: | 52.98% | 5.69% | 6.08% |
| Found: | 52.97% | 5.67% | 6.06% |

Examples in which the infrared-absorptive compound of the present invention is applied in optical recording mediums will be described below.

Example 101

On a polycarbonate (hereinafter "PC") substrate of a wallet size (a rectangle of 54 mm long and 85 mm broad) and 0.4 mm thick, pregrooves of 3 μm in width and 3,000 Å in depth were provided in a pitch of 12 μm by hot pressing, in parallel to the longitudinal direction of the substrate, and a solution prepared by dissolving in 97 parts by weight of diacetone alcohol 3 parts by weight of a mixture (weight ratio: 75:25) comprised of a polymethine dye (trade name: IR-820; available from Nippon Kayaku Co., Ltd.) and the infrared-absorptive compound No. (I)-(A)(4) described above was coated thereon by bar coating, followed by drying to form a recording layer of 900 Å in thickness.

To this recording layer, a PC protective substrate of the same wallet size as the PC substrate and 0.3 mm thick was laminated, interposing an acrylate-ethylene copolymer dry film between them, and then contact-bonded by hot rolling. Thus, an optical card of bonded laminate structure was produced.

The optical card thus obtained was irradiated with a semiconductor laser beam of an oscillation wavelength of 830 nm using an optical card recording-reproducing apparatus (manufactured by Canon Inc.), through the 0.4 mm thick PC substrate, and the reflectance from the recording layer at that time was measured. Subsequently, through the 0.4 mm thick PC substrate, information was written in the recording tracks formed between pregrooves, at a recording power of 3.5 mW and a recording pulse of 80 μsec, and then reproduced at a reproducing power of 0.4 mW to measure its contrast ratio [(A-B)/A, wherein A represents a signal intensity at an unrecorded area and B represents a signal intensity at a recorded area].

The reflectance and contrast ratio at this time are regarded as initial values.

Next, this optical card was left to stand in an environment of 85° C. high temperature for 1,000 hours, and thereafter its reflectance and contrast ratio were measured (environmental storage stability).

The optical card of Example 101, anew produced and in which the information was recorded in entirely the same way, was also irradiated with 1 kW/m² xenon lamp light for 100 hours to measure its reflectance and contrast ratio (light-resistance stability). In order to also evaluate heat resistance of this optical card, the rate of change of the contrast ratio obtained in the environmental storage stability test with respect to the initial contrast ratio (ΔCont) was determined.

Results obtained are shown in Table 101.

Comparative Example 101

An optical card was produced in the same manner as in Example 101 except that the infrared-absorptive compound No. (I)-(A)-(4) used therein was replaced with an aminium salt compound represented by the following formula. Evaluation was also similarly made.

Results obtained are shown in Table 101.

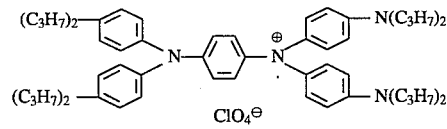

Comparative Example 102

An optical card was produced in the same manner as in Example 101 except that the infrared-absorptive compound No. (I)-(A)-(4) used therein was removed. Evaluation was also similarly made.

Results obtained are shown in Table 101.

TABLE 101

| | (1) | | (2) | | (3) | | |
|---|---|---|---|---|---|---|---|
| | Reflectance (%) | Contrast ratio | Reflectance (%) | Contrast ratio | Reflectance (%) | Contrast ratio | ΔCont (%) |
| Example: 101 | 14.7 | 0.64 | 13.2 | 0.57 | 12.9 | 0.56 | 10.9 |
| Comparative Example: | | | | | | | |
| 101 | 14.7 | 0.64 | 12.1 | 0.51 | 12.4 | 0.55 | 20.0 |
| 102 | 15.0 | 0.65 | 13.3 | 0.58 | 10.7 | 0.48 | 10.8 |

(1): Initial stage
(2): Environmental storage stability test (85° C., dry, after 1,000 hours)
(3): Light-resistance stability (xenon lamp, 1 kW/m², after 100 hours)

Examples 102 & 103

Optical cards were each produced in the same manner as in Example 101 except that the combination of the polymethine dye and the infrared-absorptive compound of the present invention as used therein was changed to the combination of an organic dye and an infrared-absorptive compound as shown in Table 102 below. Evaluation on the optical cards thus obtained was similarly made.

Results obtained are shown in Table 103.

TABLE 102

| Example | Organic dye | Infrared-absorptive comp. No. | Wt. ratio |
|---|---|---|---|
| 102 | (structure with two indolium groups linked via CH=CH-cyclohexenyl(Cl)-CH=CH, N-C₂H₄OCH₃ substituents, ClO₄⁻ counterion) | [II]-(C)-(1) | 60:40 |
| 103 | (structure with (C₂H₅)₂N-phenyl groups, C=CH-CH=CH-C linker to quinoid N(C₂H₅)₂, SbF₆⁻ counterion) | [I]-(A)-(35) | 85:15 |

Comparative Example 103

An optical card was produced in the same manner as in Example 102 except that the infrared-absorptive compound No. (II)-(C)-(1) used therein was replaced with a diimonium salt compound of the following structure. Evaluation was also similarly made.

Results obtained are shown in Table 103.

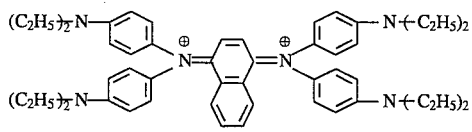

Comparative Example 104

An optical card was produced in the same manner as in Example 103 except that the infrared-absorptive compound No. (I)-(A)-(35) used therein was replaced with an aminium salt compound of the following structure. Evaluation was also similarly made.

Results obtained are shown in Table 103.

TABLE 103

| | (1) | | (2) | | (3) | | |
|---|---|---|---|---|---|---|---|
| | Reflectance (%) | Contrast ratio | Reflectance (%) | Contrast ratio | Reflectance (%) | Contrast ratio | ΔCont (%) |
| Example: | | | | | | | |
| 102 | 14.5 | 0.60 | 11.9 | 0.49 | 12.5 | 0.52 | 18.3 |
| 103 | 14.9 | 0.65 | 12.5 | 0.55 | 12.2 | 0.53 | 15.4 |
| Comparative Example: | | | | | | | |
| 103 | 14.5 | 0.60 | 10.2 | 0.41 | 12.6 | 0.52 | 31.7 |
| 104 | 14.9 | 0.65 | 10.5 | 0.45 | 12.3 | 0.53 | 30.8 |

TABLE 103-continued

|  | (1) | | (2) | | (3) | | |
|---|---|---|---|---|---|---|---|
|  | Reflectance (%) | Contrast ratio | Reflectance (%) | Contrast ratio | Reflectance (%) | Contrast ratio | ΔCont (%) |

(1): Initial stage
(2): Environmental storage stability test (85° C., dry, after 1,000 hours)
(3): Light-resistance stability (xenon lamp, 1 kW/m², after 100 hours)

Examples 104 to 108

Optical cards were each produced in the same manner as in Example 101 except that the combination of the polymethine dye and the infrared-absorptive compound of the present invention as used therein was changed to the combination of an organic dye and an infrared-absorptive compound as shown in Table 104 below. Evaluation on the optical cards thus obtained was similarly made.

Results obtained are shown in Table 105.

TABLE 104

| Example | Organic dye | Infrared-absorptive comp. No. | Wt. ratio |
|---|---|---|---|
| 104 | 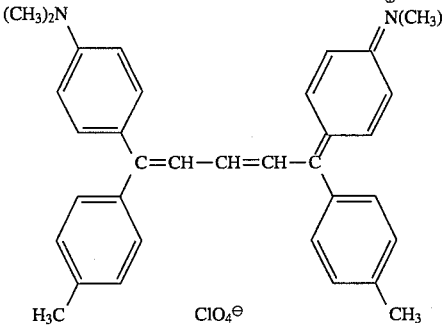 | [I]-(A)-(18) | 80:20 |
| 105 | 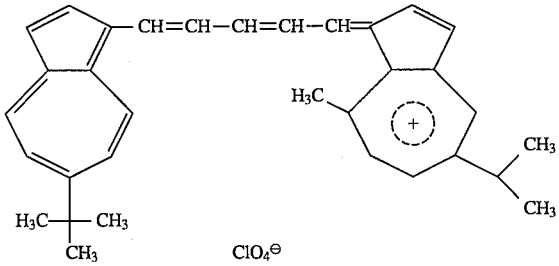 | [II]-(B)-(6) | 70:30 |
| 106 | 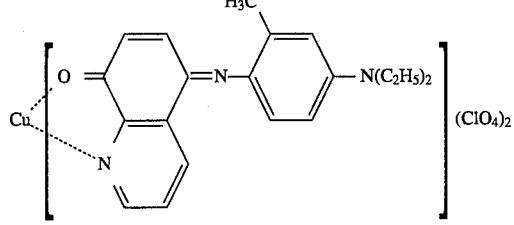 | [I]-(D)-(13) | 90:10 |
| 107 | 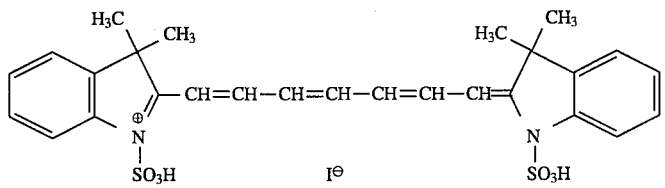 | [I]-(E)-(5) | 75:25 |

TABLE 104-continued

| Example | Organic dye | Infrared-absorptive comp. No. | Wt. ratio |
|---------|-------------|-------------------------------|-----------|
| 108 | (structure shown: triarylmethine cation with (C₃H₇)₂N–C₆H₄– and =N(C₃H₇)₂ on C₆H₄ groups, C=CH–C with two C₆H₄–OC₂H₅ groups, I⁻ counterion) | [I]-(D)-(3)<br>[II]-(D)-(10) | 75:15:10 |

Comparative Examples 106 & 107

Optical cards were produced in the same manner as in Example 101 except that the infrared-absorptive compounds used in Examples 102 and 108, i.e., No. (II)-(C)-(1) and Nos. (I)-(D)-(3) and (II)-(D)-(10), respectively, were removed. Evaluation was also similarly made.

Results obtained are shown in Table 105.

Reflectance to light with a wavelength of 830 nm, of the recording layer of the optical disk thus obtained was measured using a spectrophotometer (trade name: U-3400; manufactured by Hitachi Lid,.). The resulting value is regarded as an initial reflectance.

TABLE 105

| | (1) | | (2) | | (3) | |
|---|---|---|---|---|---|---|
| | Reflectance (%) | Contrast ratio | Reflectance (%) | Contrast ratio | Reflectance (%) | Contrast ratio |
| Example: | | | | | | |
| 104 | 15.3 | 0.66 | 13.2 | 0.55 | 12.7 | 0.54 |
| 105 | 14.9 | 0.62 | 12.7 | 0.53 | 12.5 | 0.53 |
| 106 | 15.4 | 0.65 | 12.9 | 0.55 | 12.5 | 0.53 |
| 107 | 15.5 | 0.67 | 12.7 | 0.54 | 13.0 | 0.56 |
| 108 | 15.5 | 0.66 | 12.87 | 0.54 | 13.0 | 0.55 |
| Comparative Example: | | | | | | |
| 106 | 16.3 | 0.69 | 9.8 | 0.41 | 6.8 | 0.19 |
| 107 | 16.0 | 0.68 | 9.3 | 0.38 | 9.6 | 0.37 |

(1): Initial stage
(2): Environmental storage stability test (85° C., dry, after 1,000 hours)
(3): Light-resistance stability (xenon lamp, 1 kW/m², after 100 hours)

Example 109

On a PC substrate of 130 mm diameter and 1.2 mm thick, having been provided with a 0.6 82 m wide and 1.6 µm pitch spiral pregroove by injection molding, a solution prepared by dissolving in 95 parts by weight of diacetone alcohol 5 parts by weight of a mixture comprised of a polymethine organic dye (trade name: IR-820; available from Nippon Kayaku Co., Ltd.) and the infrared-absorptive compound No. (I)-(A)-(9) was coated by spin coating to form a recording layer of 950 Å in thickness. Subsequently, this substrate with the recording layer was laminated to a PC protective substrate of 130 mm diameter and 1.2 mm thick using an ultraviolet-curable adhesive, interposing 0.3 mm spacers provided at the inner boundary edge and outer boundary edge of the former substrate. Thus an optical disk of air-sandwich structure was obtained.

Next, this optical disk was fitted to a turn table. While the turn table was driven by a motor and rotated at 1,800 rpm, information was written in the recording layer from the substrate side at a recording power of 8 mW and a recording frequency of 3 MHz using a semiconductor layer of an oscillation wavelength of 830 nm. The recorded information was reproduced at a read-out power of 0.8 mW, and its reproduction wave form was spectrally analyzed (a scanning filter; bandwidth: 30 KHz) to measure C/N ratio (carrier-noise ratio). The resulting value is regarded as an initial C/N ratio.

Next, on this optical disk, the portions recorded under the above conditions were repeatedly read out $10^5$ times to measure C/N ratio after that.

The optical disk of Example 109, anew produced in entirely the same way as described above, was made ready and information was recorded under the same conditions as the above recording conditions. Thereafter, this optical disk was left to stand in an environment of 85° C. for 1,000 hours, and thereafter the reflectance of its recording layer to light with a wavelength of 830 nm and the C/N ratio of recorded information were measured in the same manner as described above (environmental storage stability).

layer with a thickness of 850 Å. The subsequent procedure of Example 109 was repeated to produce an optical disk.

On the optical disk thus produced, measurement and evaluation were made in the same manner as in Example 109.

Results obtained are shown in Table 106.

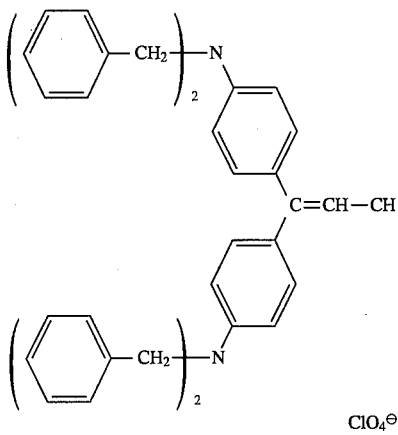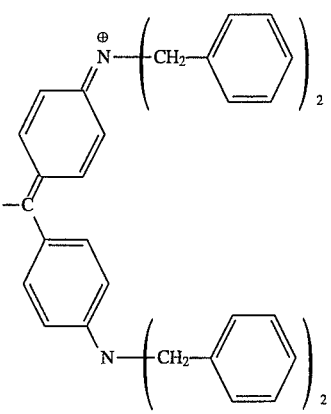

The optical disk of Example 109, further anew produced in entirely the same way as described above, was made ready and information was recorded under the same conditions as the above recording conditions. Thereafter, this optical disk was irradiated with 1 kW/m² xenon lamp light for 100 hours to measure its reflectance and C/N ratio. In order to also evaluate heat resistance of this optical disk, the rate of change of the C/N ratio obtained in the environmental storage stability test with respect to the initial contrast ratio (ΔC/N) was determined.

Results obtained are shown in Table 106.

Comparative Example 108

An optical disk was produced in the same manner as in Example 109 except that the infrared-absorptive compound used therein was replaced with an aminium salt compound represented by the following structural formula. Evaluation was also similarly made.

Results obtained are shown in Table 106.

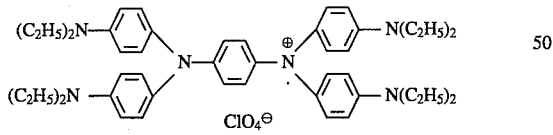

Example 110

On a polymethyl methacrylate (hereinafter "PMMA") substrate of 130 mm diameter and 1.2 mm thick, a pregroove layer of 30 μm thick was provided by the 2P process (photo-polymer process) using an epoxy-acrylate type ultraviolet-curable resin. On this substrate, a solution prepared by dissolving in 98 parts by weight of 1,2-dichloroethane 2 parts by weight of a mixture (weight ratio: 85:15) comprised of an organic dye having the following structure and the infrared-absorptive compound No. (II)-(A)-(27) was coated by spin coating, followed by drying to form a recording Comparative Example 109

An optical disk was produced in the same manner as in Example 110 except that the infrared-absorptive compound (II)-(A)-(27) used therein was replaced with a diimonium salt compound having the following structure. Evaluation was also similarly made.

Results obtained are shown in Table 106.

TABLE 106

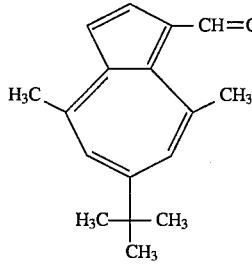

2SbF$_6^\ominus$

| | (1) | | (2) | (3) | | (4) | | |
|---|---|---|---|---|---|---|---|---|
| | Reflectance (%) | C/N (dB) | C/N (dB) | Reflectance (%) | C/N (dB) | Reflectance (%) | C/N (dB) | ΔC/N (%) |
| Example: 109 | 25.7 | 56 | 54 | 22.4 | 48 | 23.1 | 51 | 14.3 |
| Comparative Example: 108 | 25.6 | 56 | 54 | 19.2 | 42 | 23.0 | 51 | 25.0 |
| Example: 110 | 25.9 | 58 | 54 | 22.0 | 49 | 21.8 | 49 | 15.5 |
| Comparative Example: 109 | 25.8 | 58 | 54 | 18.5 | 42 | 21.9 | 50 | 27.5 |

(1): Initial stage
(2): Repeated reproduction (after 10$^5$ times)
(3): Environmental storage stability (85° C., dry, after 1,000 hours)
(4): Light-resistance stability (xenon lamp, 1 kW/m$^2$, after 100 hours)

Examples 111 to 114

Optical disks were each produced in the same manner as in Example 109 except that the combination of the organic dye and the infrared-absorptive compound as used therein was changed to the combination as shown in Table 107 below. Evaluation was similarly made.

Results obtained are shown in Table 108.

Comparative Examples 110 & 111

Optical disks were produced in the same manner as in Examples 111 and 114, respectively, except that the infrared-absorptive compounds No. (II)-(C)-(9) and No. (I)-(A)-(31) used therein were removed. Evaluation was similarly made.

Results obtained are shown in Table 108.

TABLE 107

| Example | Organic dye | Infrared-absorptive comp. No. | Wt. ratio |
|---|---|---|---|
| 111 | 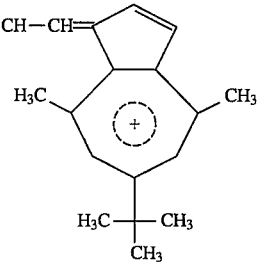 ClO$_4^\ominus$ | [II]-(C)-(9) | 70:30 |

TABLE 107-continued

| Example | Organic dye | Infrared-absorptive comp. No. | Wt. ratio |
|---|---|---|---|
| 112 | (structure with NC, N(C₂H₅)₂, NHCCH₃ groups) | [I]-(B)-(3) | 85:15 |
| 113 | (azulene-based structure with =N(CH₃)₂, Cl⁻) | [III]-(D)-(12) | 90:10 |
| 114 | (bis-naphthalene cyanine structure with ClO₄⁻) | [I]-(A)-(31) | 75:25 |

TABLE 108

|  | (1) | | (2) | (3) | | (4) | |
|---|---|---|---|---|---|---|---|
|  | Reflectance (%) | C/N (dB) | C/N (dB) | Reflectance (%) | C/N (dB) | Reflectance (%) | C/N (dB) |
| Example: | | | | | | | |
| 111 | 25.4 | 55 | 52 | 21.6 | 47 | 22.6 | 49 |
| 112 | 25.9 | 57 | 52 | 22.1 | 48 | 22.3 | 49 |
| 113 | 26.0 | 57 | 54 | 21.3 | 46 | 21.6 | 48 |
| 114 | 26.3 | 59 | 55 | 22.4 | 50 | 22.9 | 52 |
| Comparative Example: | | | | | | | |
| 110 | 27.2 | 61 | 46 | 16.3 | 36 | 16.9 | 37 |
| 111 | 30.1 | 60 | 38 | 15.4 | 29 | 15.1 | 30 |

(1): Initial stage
(2): Repeated reproduction (after $10^5$ times)
(3): Environmental storage stability (85° C., dry, after 1,000 hours)
(4): Light-resistance stability (xenon lamp, 1 kW/m², after 100 hours)

Example 115

An optical disk was produced in the same manner as in Example 110 except that the combination of the organic dye and the infrared-absorptive compound as used therein was changed to the combination as shown in Table 109 below. Evaluation was similarly made.

Results obtained are shown in Table 110.

Examples 116 & 117

A solution prepared by mixing in 95 parts by weight of diacetone alcohol 4 parts by weight of mixture comprised of the combination of an organic dye and an infrared-absorptive compound as shown in Table 109 below and 1 part by weight of nitrocellulose resin (O'hares Lacquer, available from Daicel Chemical Industries, Ltd.) was coated on a pregrooved polycarbonate substrate of 130 mm diameter and 1.2 mm thick, prepared in the same manner as in Example 109, followed by drying to form a recording layer with a thickness of 950 Å. The subsequent procedure of Example 109 was repeated to produce optical disks.

On the optical disks thus produced, measurement was made in the same manner as in Example 109.

Results obtained are shown in Table 110.

Example 201

On a PC substrate prepared in the same manner as in Example 101, a solution prepared by dissolving in 97 parts by weight of diacetone alcohol 3 parts by weight of a mixture (weight ratio: 75:25) comprised of a polymethine dye (trade name: IR-820; available from Nippon Kayaku Co., Ltd.) and the infrared-absorptive compound No. (III)-(14) previously set out was coated by bar coating, followed

TABLE 109

| Example | Organic dye | Infrared-absorptive comp. No. | Wt. ratio |
|---|---|---|---|
| 115 | 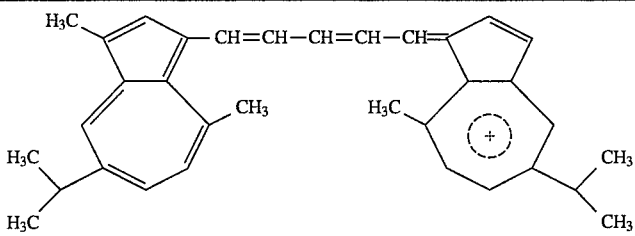 | [I]-(A)-(37) | 80:20 |
| 116 | 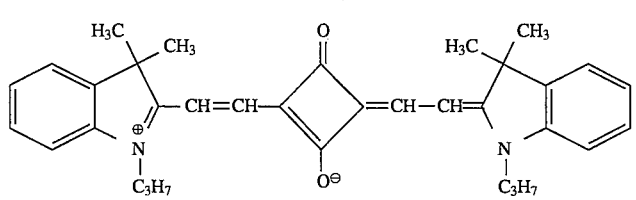 | [I]-(E)-(13) | 65:35 |
| 117 | 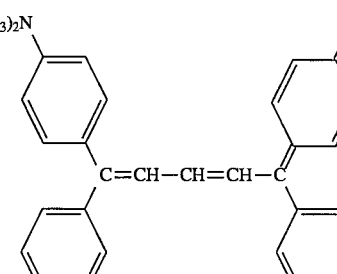 | [II]-(A)-(16) | 70:30 |

TABLE 110

| | (1) | | (2) | (3) | | (4) | |
|---|---|---|---|---|---|---|---|
| Example | Reflectance (%) | C/N (dB) | C/N (dB) | Reflectance (%) | C/N (dB) | Reflectance (%) | C/N (dB) |
| 115 | 26.0 | 59 | 55 | 22.6 | 51 | 22.1 | 51 |
| 116 | 24.7 | 53 | 51 | 21.5 | 46 | 21.7 | 47 |
| 117 | 24.8 | 52 | 49 | 21.3 | 45 | 21.6 | 46 |

(1): Initial stage
(2): Repeated reproduction (after $10^5$ times)
(3): Environmental storage stability (85° C., dry, after 1,000 hours)
(4): Light-resistance stability (xenon lamp, 1 kW/m$^2$, after 100 hours)

by drying to form a recording layer of 850 Å in thickness.

To this recording layer, a PC protective substrate of the same wallet size as the PC substrate and 0.3 mm thick was laminated, interposing an acrylate-ethylene copolymer dry film between them, and then contact-bonded by hot rolling. Thus, an optical card of bonded laminate structure was produced.

On the optical card thus obtained, the initial reflectance and contrast ratio were measured in the same manner as in Example 101. The environmental storage stability and the light-resistance stability were also similarly evaluated.

Results Obtained are shown in Table 201.

Comparative Example 201

An optical card was produced in the same manner as in Example 201 except that the infrared-absorptive compound No. (III)-(14) used therein was replaced with an aminium salt compound represented by the following formula. Evaluation was also similarly made.

Results obtained are shown in Table 201.

TABLE 201

$(CH_3OC_2H_4)_2N$—[structure with aminium salt containing triphenylamine groups, central quinoid ring with $N^+$, substituents $-N(C_2H_4OCH_3)_2$, counterion $SbF_6^\ominus$]

|  | (1) | | (2) | | (3) | | |
|---|---|---|---|---|---|---|---|
|  | Reflectance (%) | Contrast ratio | Reflectance (%) | Contrast ratio | Reflectance (%) | Contrast ratio | ΔCont (%) |
| Example: 201 | 14.6 | 0.63 | 13.1 | 0.56 | 12.8 | 0.55 | 11.1 |
| Comparative Example: 201 | 14.7 | 0.64 | 11.7 | 0.50 | 13.0 | 0.56 | 21.9 |

(1): Initial stage
(2): Environmental storage stability test (85° C., dry, after 1,000 hours)
(3): Light-resistance stability (xenon lamp, 1 kW/m$^2$, after 100 hours)

Examples 202 & 203

Optical cards were each produced in the same manner as in Example 201 except that the combination of the organic dye and the infrared-absorptive compound as used therein was changed to the combination as shown in Table 202 below. Evaluation was similarly made.

Results obtained are shown in Table 203.

TABLE 202

| Example | Organic dye | Infrared-absorptive comp. No. | Wt. ratio |
|---|---|---|---|
| 202 | 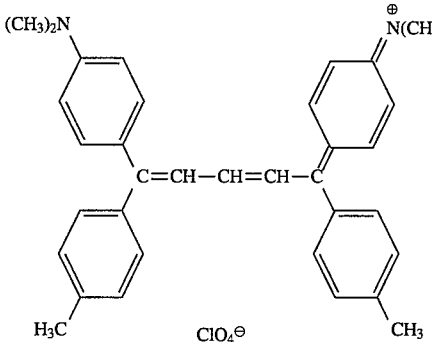 | [III]-(18) | 80:20 |
| 203 | 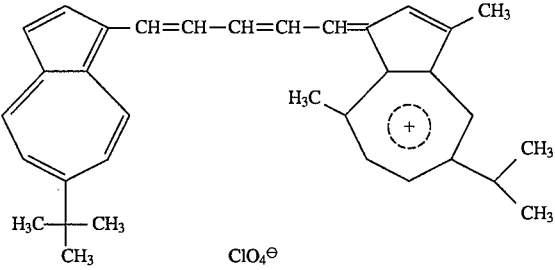 | [IV]-(14) | 70:30 |

Comparative Examples 202 & 203

Optical cards were produced in the same manner as in Examples 202 and 203, respectively, except that the infrared-absorptive compounds used therein were respectively replaced with an aminium salt compound and a diimonium compound represented by the following formulas. Evaluation was also similarly made.

Results obtained are shown in Table 203.

Comparative Example 202:

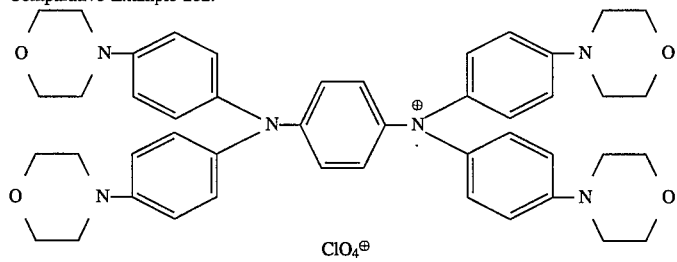

Comparative Example 203:

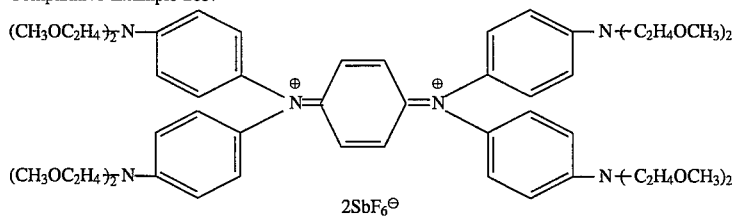

TABLE 203

| | (1) | | (2) | | (3) | | |
|---|---|---|---|---|---|---|---|
| | Reflectance (%) | Contrast ratio | Reflectance (%) | Contrast ratio | Reflectance (%) | Contrast ratio | ΔCont (%) |
| Example: 202 | 15.1 | 0.65 | 13.1 | 0.54 | 12.8 | 0.53 | 16.9 |
| Comparative Example: 202 | 15.2 | 0.65 | 11.2 | 0.46 | 12.9 | 0.54 | 29.2 |
| Example: 203 | 14.8 | 0.61 | 12.5 | 0.52 | 12.5 | 0.51 | 14.8 |
| Comparative Example: 203 | 14.8 | 0.61 | 10.3 | 0.42 | 12.7 | 0.52 | 31.1 |

(1): Initial stage
(2): Environmental storage stability test (85° C., dry, after 1,000 hours)
(3): Light-resistance stability (xenon lamp, 1 kW/m², after 100 hours)

Examples 204 to 208

Optical cards were each produced in the same manner as in Example 201 except that the combination of the organic dye and the infrared-absorptive compound as used therein was changed to the combination as shown in Table 204 below. Evaluation was similarly made.

Results obtained are shown in Table 205.

Comparative Examples 204 & 205

Optical cards were produced in the same manner as in Examples 203 and 206, respectively, except that the infrared-absorptive compounds used therein were removed. Evaluation was also similarly made.

Results obtained are shown in Table 205.

TABLE 204

| Example | Organic dye | Infrared-absorptive comp. No. | Wt. ratio |
|---|---|---|---|
| 204 | (indolenine cyanine dye with C₂H₄OCH₃ N-substituents, chlorocyclohexenyl bridge, ClO₄⁻ counterion) | [III]-(10) | 60:40 |
| 205 | (Cu complex with quinoline-azo-N,N-diethylaniline ligand, (ClO₄)₂) | [IV]-(25) | 90:10 |
| 206 | (indolenine heptamethine cyanine dye with SO₃H N-substituents, I⁻ counterion) | [III]-(20) | 75:25 |

TABLE 204-continued

| Example | Organic dye | Infrared-absorptive comp. No. | Wt. ratio |
|---|---|---|---|
| 207 | (structure with (C$_2$H$_5$)$_2$N, N(C$_3$H$_7$)$_2$, C=CH—CH=CH—C, (C$_2$H$_5$)$_2$N, SbF$_6^\ominus$, N(C$_2$H$_5$)$_2$) | [III]-(14) | 85:15 |
| 208 | (structure with (C$_3$H$_7$)$_2$N, N(C$_3$H$_7$)$_2$, C=CH—C, C$_2$H$_5$O, I$^\ominus$, OC$_2$H$_5$) | [III]-(27)/ [IV]-(27) | 75:15:10 |

TABLE 205

| | (1) | | (2) | | (3) | |
|---|---|---|---|---|---|---|
| | Reflectance (%) | Contrast ratio | Reflectance (%) | Contrast ratio | Reflectance (%) | Contrast ratio |
| Example: | | | | | | |
| 204 | 14.6 | 0.59 | 11.9 | 0.48 | 12.6 | 0.53 |
| 205 | 15.4 | 0.66 | 12.7 | 0.55 | 12.4 | 0.52 |
| 206 | 5.6 | 0.68 | 12.6 | 0.53 | 13.1 | 0.56 |
| 207 | 4.8 | 0.65 | 12.5 | 0.56 | 12.3 | 0.54 |
| 208 | 5.6 | 0.66 | 12.8 | 0.55 | 13.1 | 0.55 |
| Comparative Example: | | | | | | |
| 204 | 17.9 | 0.70 | 9.5 | 0.39 | 6.7 | 0.20 |
| 205 | 20.5 | 0.69 | 9.3 | 0.37 | * | * |

(1): Initial stage
(2): Environmental storage stability test (85° C., dry, after 1,000 hours)
(3): Light-resistance stability (xenon lamp, 1 kW/m$^2$, after 100 hours)
*Unmeasurable

Example 209

On the optical disk substrate as prepared in Example 109, a solution prepared by dissolving in 95 parts by weight of diacetone alcohol 5 parts by weight of a mixture (weight ratio: 80:20) comprised of a polymethine organic dye (trade name: IR-820; available from. Nippon Kayaku Co., Ltd.) and the infrared-absorptive compound No. (III)-(35) was coated by spin coating to form a recording layer of 900 Å in thickness. Subsequently, this substrate with the recording layer was laminated to a PC protective substrate using an ultraviolet-curable adhesive, interposing 0.3 mm spacers provided at the inner boundary edge and outer boundary edge of the former substrate. Thus an optical disk of air-sandwich structure was obtained.

On the optical disk thus obtained, evaluation was made in the same manner as in Example 109.

Results obtained are shown in Table 206.

Comparative Example 206

An optical disk was produced in the same manner as in Example 209 except that the infrared-absorptive compound used therein was replaced with an aminium salt compound having the following structure. Evaluation was also similarly made.

Results obtained are shown in Table 206.

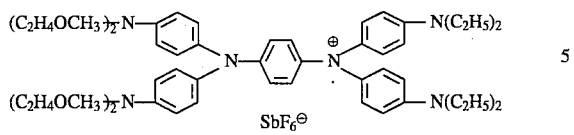

Example 210

On the optical disk substrate as prepared in Example 110, a solution prepared by dissolving in 98 parts by weight of 1,2-dichloroethane 2 parts by weight of a mixture (weight Patio: 63:35) comprised of an organic dye having the following structure and the infrared-absorptive compound No. (III)-(25) was coated by spin coating, followed by drying to form a recording layer with a thickness of 850 Å. The subsequent procedure of Example 209 was repeated to produce an optical disk.

On the optical disk thus produced, measurement and evaluation were made in the same manner as in Example 110.

Results obtained are shown in Table 206.

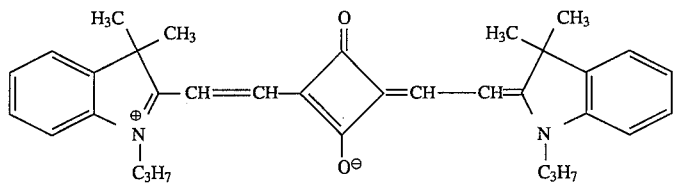

Comparative Example 207

An optical disk was produced in the same manner as in Example 210 except that the infrared-absorptive compound used therein was replaced with an aminium salt compound having the following structure. Evaluation was also similarly made.

Results obtained are shown in Table 206.

TABLE 206

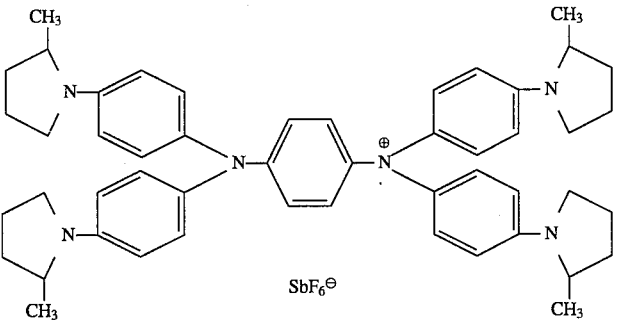

|  | (1) | | (2) | (3) | | (4) | | |
| --- | --- | --- | --- | --- | --- | --- | --- | --- |
|  | Reflectance (%) | C/N (dB) | C/N (dB) | Reflectance (%) | C/N (dB) | Reflectance (%) | C/N (dB) | ΔC/N (%) |
| Example: 209 | 25.6 | 56 | 53 | 22.3 | 49 | 23.2 | 50 | 12.5 |
| Comparative Example: | 25.7 | 56 | 53 | 19.5 | 43 | 23.3 | 51 | 23.2 |

TABLE 206-continued

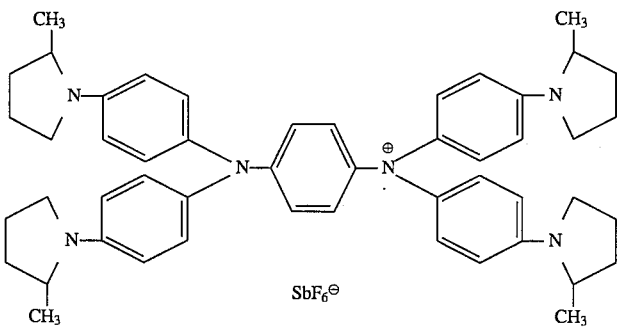

| | (1) | | (2) | (3) | | (4) | | |
|---|---|---|---|---|---|---|---|---|
| | Reflectance (%) | C/N (dB) | C/N (dB) | Reflectance (%) | C/N (dB) | Reflectance (%) | C/N (dB) | ΔC/N (%) |
| 206 Example: 210 | 24.5 | 53 | 50 | 21.3 | 45 | 21.6 | 45 | 15.1 |
| Comparative Example: 207 | 24.6 | 53 | 51 | 17.8 | 38 | 21.6 | 45 | 28.3 |

(1): Initial stage
(2): Repeated reproduction (after $10^5$ times)
(3): Environmental storage stability (85° C., dry, after 1,000 hours)
(4): Light-resistance stability (xenon lamp, 1 kW/m$^2$, after 100 hours)

Examples 211 to 214

Optical disks were each produced in the same manner as in Example 209 except that the combination of the organic dye and the infrared-absorptive compound as used therein was changed to the combination as shown in Table 207 below. Evaluation was similarly made.

Results obtained are shown in Table 208.

Comparative Examples 208 to 210

Optical disks were produced in the same manner as in Example 209 except that the infrared-absorptive compounds used in Examples 209, 213 and 214, respectively, were removed. Evaluation was similarly made.

Results obtained are shown in Table 208.

TABLE 207

| Example | Organic dye | Infrared-absorptive comp. No. | Wt. ratio |
|---|---|---|---|
| 211 | 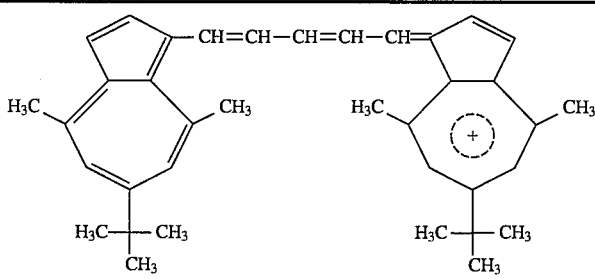 | [IV]-(3) | 70:30 |

TABLE 207-continued

| Example | Organic dye | Infrared-absorptive comp. No. | Wt. ratio |
|---|---|---|---|
| 212 | (structure with NC, N(C₂H₅)₂, NHCCH₃, naphthalene) | [III]-(32) | 85:15 |
| 213 | (azulene structure with CH=CH—CH=, N(CH₃)₂, Cl⁻) | [IV]-(4) | 90:10 |
| 214 | (cyanine-type dye with C₂H₄OC₂H₅ groups, ClO₄⁻) | [III]-(28) | 75:25 |

TABLE 208

| | (1) | | (2) | (3) | | (4) | |
|---|---|---|---|---|---|---|---|
| | Reflectance (%) | C/N (dB) | C/N (dB) | Reflectance (%) | C/N (dB) | Reflectance (%) | C/N (dB) |
| Example: | | | | | | | |
| 211 | 25.3 | 54 | 51 | 21.5 | 47 | 22.4 | 48 |
| 212 | 25.8 | 56 | 51 | 22.0 | 47 | 22.2 | 48 |
| 213 | 25.7 | 55 | 53 | 21.1 | 45 | 21.0 | 44 |
| 214 | 26.2 | 58 | 54 | 22.3 | 49 | 22.7 | 51 |
| Comparative Example: | | | | | | | |
| 208 | 27.0 | 57 | 51 | 22.4 | 50 | 19.5 | 40 |
| 209 | 26.5 | 58 | 50 | 15.8 | 37 | 16.0 | 32 |
| 210 | 30.2 | 59 | 39 | 14.8 | 28 | 14.7 | 28 |

(1): Initial stage
(2): Repeated reproduction (after $10^5$ times)
(3): Environmental storage stability (85° C., dry, after 1,000 hours)
(4): Light-resistance stability (xenon lamp, 1 kW/m², after 100 hours)

Example 215

An optical disk was produced in the same manner as in Example 210 except that the combination of the organic dye and the infrared-absorptive compound as used therein was changed to the combination as shown in Table 209 below. Evaluation was similarly made.

Results obtained are shown in Table 210.

Examples 216 & 217

A solution prepared by mixing in 95 parts by weight of diacetone alcohol 4 parts by weight of a mixture comprised of the combination of an organic dye and an infrared-absorptive compound as shown in Table 209 below and 1 part by weight of nitrocellulose resin (O'hares Lacquer, available from Daicel Chemical Industries, Ltd.) was coated on a pregrooved polycarbonate substrate of 130 mm diameter and 1.2 mm thick, prepared in the same manner as in Example 109, followed by drying to form a recording layer with a thickness of 1,000 Å. The subsequent procedure of Example 109 was repeated to produce optical disks.

On the optical disks thus produced, measurement was made in the same manner as in Example 209.

Results obtained are shown in Table 210.

TABLE 209

| Example | Organic dye | Infrared-absorptive comp. No. | Wt. ratio |
|---------|-------------|-------------------------------|-----------|
| 215 | 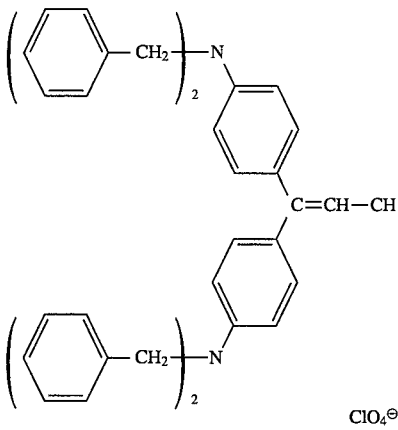 | [IV]-(10) | 85:15 |
| 216 | 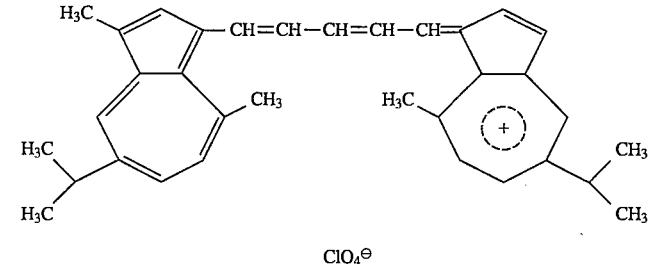 | [III]-(31) | 80:20 |
| 217 | 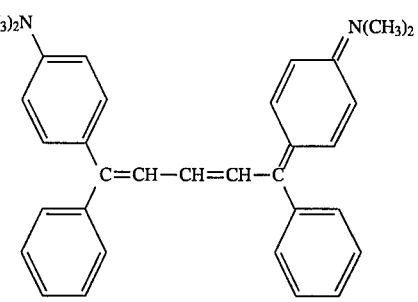 | [IV]-(5) | 70:30 |

TABLE 210

| Example | (1) Reflectance (%) | C/N (dB) | (2) C/N (dB) | (3) Reflectance (%) | C/N (dB) | (4) Reflectance (%) | C/N (dB) |
|---|---|---|---|---|---|---|---|
| 215 | 25.8 | 57 | 53 | 21.8 | 48 | 21.7 | 48 |
| 216 | 25.8 | 58 | 53 | 22.5 | 50 | 22.0 | 51 |
| 217 | 24.7 | 51 | 49 | 21.3 | 44 | 21.4 | 45 |

(1): Initial stage
(2): Repeated reproduction (after $10^5$ times)
(3): Environmental storage stability (85° C., dry, after 1,000 hours)
(4): Light-resistance stability (xenon lamp, 1 kW/m², after 100 hours)

Example 301

On a pregrooved wallet-size PC substrate prepared in the same manner as in Example 101, a solution prepared by dissolving in 97 parts by weight of diacetone alcohol 3 parts by weight of a mixture (weight ratio: 75:25) comprised of a polymethye dye (trade name: IR-820; available from Nippon Kayaku Co., Ltd.) and the infrared-absorptive compound No. (V)-(D)-(16) was coated by bar coating, followed by drying to form a recording layer of 900 Å in thickness.

To this recording layer, a PC protective substrate of the same wallet size as the PC substrate and 0.3 mm thick was laminated, interposing an acrylate-ethylene copolymer dry film between them, and then contact-bonded by hot rolling. Thus, an optical card of bonded laminate structure was produced.

On the optical card thus obtained, the initial reflectance and contrast ratio were measured in the same manner as in Example 101. The environmental storage stability and the light-resistance stability were also similarly evaluated.

Results obtained are shown in Table 301.

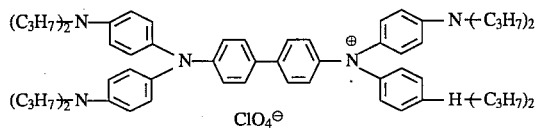

Example 302

An optical card was produced in the same manner as in Example 301 except that the combination of the organic dye and the infrared-absorptive compound as used therein was changed to the combination as shown below. Evaluation was similarly made.

Results obtained are shown in Table 301.

| Example | Organic dye | Infrared-absorptive comp. No. | Wt. ratio |
|---|---|---|---|
| 302 |  | [VI]-(B)-(12) | 80:20 |

Comparative Example 301

An optical card was produced in the same manner as in Example 301 except that the infrared-absorptive compound No. (V)-(D)-(16) used therein was replaced with an aminium salt compound represented by the following formula. Evaluation was similarly made.

Results obtained are shown in Table 301.

Comparative Example 302

An optical card was produced in the same manner as in Example 302 except that the infrared-absorptive compound No. (VI)-(B)-(12) used therein was replaced with a diimonium salt compound represented by the following formula. Evaluation was similarly made.

Results obtained are shown in Table 301.

TABLE 301

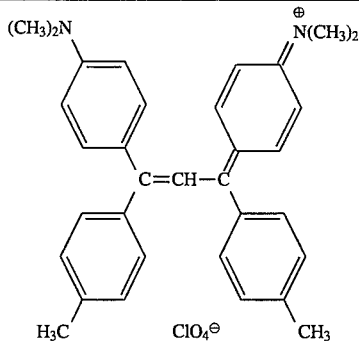

$2ClO_4^{\ominus}$

|  | (1) | | (2) | | (3) | | |
| --- | --- | --- | --- | --- | --- | --- | --- |
|  | Reflectance (%) | Contrast ratio | Reflectance (%) | Contrast ratio | Reflectance (%) | Contrast ratio | ΔCont (%) |
| Example: 301 | 14.9 | 0.64 | 13.2 | 0.57 | 12.4 | 0.59 | 11.0 |
| Comparative Example: 301 | 14.9 | 0.64 | 11.5 | 0.49 | 12.3 | 0.58 | 23.4 |
| Example: 302 | 16.1 | 0.65 | 13.6 | 0.55 | 12.0 | 0.53 | 15.4 |
| Comparative Example: 302 | 16.0 | 0.64 | 11.2 | 0.45 | 12.0 | 0.52 | 29.7 |

(1): Initial stage
(2): Environmental storage stability test (85° C., dry, after 1,000 hours)
(3): Light-resistance stability (xenon lamp, 1 kW/m², after 100 hours)

Examples 303 to 305

Optical cards were each produced in the same manner as in Example 301 except that the combination of the organic dye and the infrared-absorptive compound as used therein was changed to the combination as shown in Table 302 below. Evaluation was similarly made.

Results obtained are shown in Table 303.

TABLE 302

| Example | Organic dye | Infrared-absorptive comp. No. | Wt. ratio |
| --- | --- | --- | --- |
| 303 | 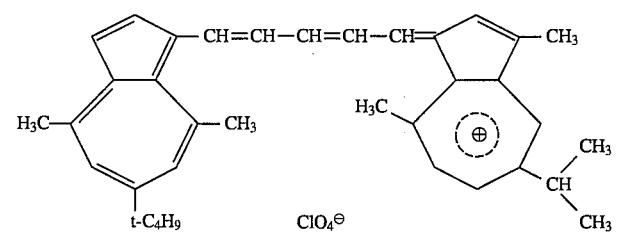 | [VI]-(A)-10 | 85:15 |
| 304 |  | [V]-(C)-(8) | 80:20 |

TABLE 302-continued

| Example | Organic dye | Infrared-absorptive comp. No. | Wt. ratio |
|---|---|---|---|
| 305 |  | [V]-(B)-(7)/[V]-(A)-(22) | 85:10:5 |

Comparative Example 303

An optical card was produced in the same manner as in Example 302 except that the infrared-absorptive compounds used therein was removed. Evaluation was also similarly made.

Results obtained are shown in Table 303.

TABLE 303

| | (1) | | (2) | | (3) | |
|---|---|---|---|---|---|---|
| | Reflectance (%) | Contrast ratio | Reflectance (%) | Contrast ratio | Reflectance (%) | Contrast ratio |
| Example: | | | | | | |
| 303 | 15.3 | 0.61 | 13.4 | 0.54 | 12.3 | 0.55 |
| 304 | 15.2 | 0.63 | 13.2 | 0.56 | 12.7 | 0.56 |
| 305 | 15.8 | 0.61 | 13.3 | 0.53 | 12.3 | 0.54 |
| Comparative Example: 303 | 16.2 | 0.66 | 13.5 | 0.54 | 9.3 | 0.43 |

(1): Initial stage
(2): Environmental storage stability test (85° C., dry, after 1,000 hours)
(3): Light-resistance stability (xenon lamp, 1 kW/m², after 100 hours)

Example 306

On the optical disk substrate prepared in the same manner as in Example 110, a solution prepared by dissolving in 1,2-dichloroethane a mixture (weight ratio: 80:20) comprised of a polymethine organic dye (trade name: IR-820; available from Nippon Kayaku Co., Ltd.) and the infrared-absorptive compound No. (V)-(A)-(5) previously described was coated by spin coating, followed by drying to form a recording layer with a thickness of 900 Å. The subsequent procedure of Example 109 was repeated to produce an optical disk.

On the optical disk thus obtained, evaluation was made in the same manner as in Example 110.

Results obtained are shown in Table 304.

Comparative Example 304

An optical disk was produced in the same manner as in Example 306 except that the infrared-absorptive compound No. (V)-(A)-(5) used therein was replaced with an aminium salt compound having the following structure. Evaluation was similarly made.

Results obtained are shown in Table 304.

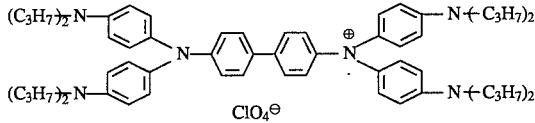

Example 307

An optical disk was produced in the same manner as in Example 306 except that the combination of the organic dye and the infrared-absorptive compound as used therein was changed to the combination as shown below. Evaluation was similarly made. Results obtained are shown in Table 304.

| Example | Organic dye | Infrared-absorptive comp. No. | Wt. ratio |
|---|---|---|---|
| 307 | 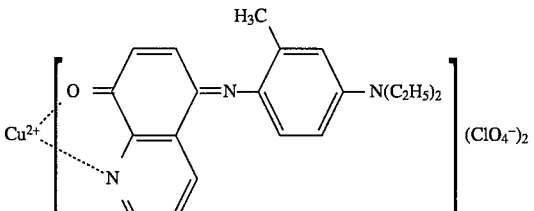 | [VI]-(C)-(2) | 80:20 |

Comparative Example 305

An optical disk was produced in the same manner as in Example 307 except that the infrared-absorptive compound No. (VI)-(C)-(2) used therein was replaced with a diimonium salt compound having the following structure. Evaluation was similarly made.

Results obtained are shown in Table 304.

TABLE 304

|  | (1) | (2) | | (3) | | (4) | | |
|---|---|---|---|---|---|---|---|---|
|  | Reflectance (%) | C/N (dB) | C/N (dB) | Reflectance (%) | C/N (dB) | Reflectance (%) | C/N (dB) | ΔC/N (%) |
| Example: 306 | 24.8 | 57 | 55 | 21.6 | 50 | 22.7 | 54 | 12.3 |
| Comparative Example: 304 | 24.8 | 57 | 55 | 18.7 | 43 | 22.6 | 53 | 24.6 |
| Example: 307 | 25.3 | 53 | 50 | 21.5 | 45 | 20.5 | 49 | 15.1 |
| Comparative Example: 305 | 25.4 | 53 | 50 | 17.9 | 39 | 20.6 | 49 | -26.4 |

(1): Initial stage
(2): Repeated reproduction (after $10^5$ times)
(3): Environmental storage stability (85°C., dry, after 1,000 hours)
(4): Light-resistance stability (xenon lamp, 1 kW/m$^2$, after 100 hours)

Examples 308 to 313

Optical disks were each produced in the same manner as in Example 306 except that the combination of the organic dye and the infrared-absorptive compound as used therein was changed to the combination as shown in Tables 305 and 305 below, Evaluation was similarly made.

Results obtained are shown in Table 307.

TABLE 305
| Example | Organic dye | Infrared-absorptive comp. No. | Wt. ratio |
|---------|-------------|-------------------------------|-----------|
| 308 | 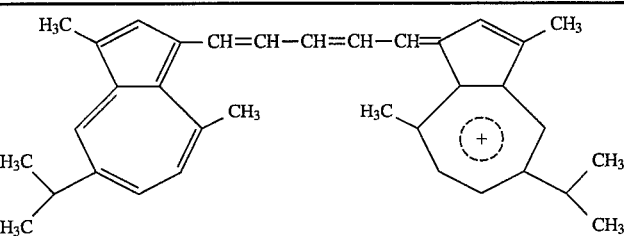 | [V]-(B)-(8) | 85:15 |
| 309 | 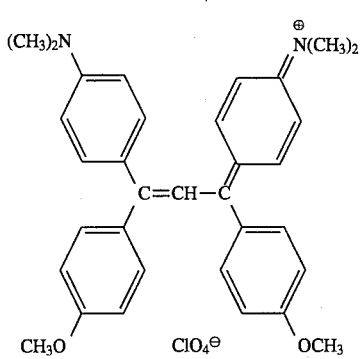 | [V]-(A)-(22) | 90:10 |
| 310 | 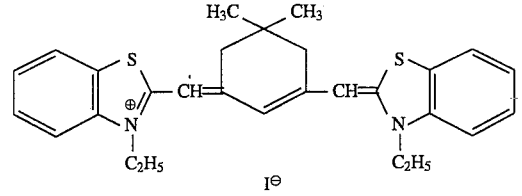 | [V]-(D)-(10) | 70:30 |
TABLE 306
| Example | Organic dye | Infrared-absorption comp. No. | Wt. ratio |
|---------|-------------|-------------------------------|-----------|
| 311 | 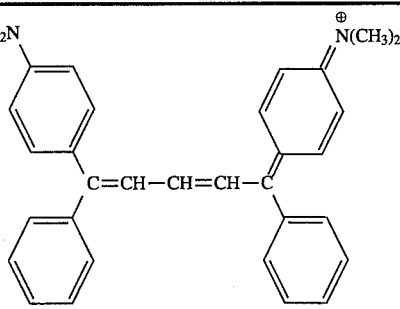 | [V]-(C)-(14) | 75:25 |

TABLE 306-continued

| Example | Organic dye | Infrared-absorption comp. No. | Wt. ratio |
|---|---|---|---|
| 312 | 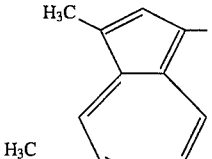 | [VI]-(D)-(13) | 85:15 |
| 313 | 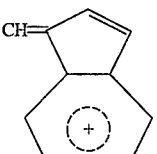 | [V]-(B)-(10)/[VI]-(B)-(10) | 80:10/10 |

Comparative Examples 306 & 307

Optical disks were produced in the same manner as in Examples 308 and 311, respectively, except that the infrared-absorptive compounds used therein were removed. Evaluation was also similarly made.

Results obtained are shown in Table 307.

by weight of nitrocellulose resin (O'hares Lacquer, available from Daicel Chemical Industries, Ltd.) was coated on a pregrooved polycarbonate substrate of 130 mm diameter and 1.2 mm thick, prepared in the same manner as in Example 109, followed by drying to form a recording layer with a thickness of 950 Å. The subsequent procedure of Example 109 was repeated to produce optical disks.

TABLE 307

|  | (1) |  | (2) | (3) |  | (4) |  |
|---|---|---|---|---|---|---|---|
|  | Reflectance (%) | C/N (dB) | C/N (dB) | Reflectance (%) | C/N (dB) | Reflectance (%) | C/N (dB) |
| Example: |  |  |  |  |  |  |  |
| 308 | 27.2 | 56 | 54 | 23.1 | 48 | 23.6 | 52 |
| 309 | 27.4 | 55 | 52 | 23.8 | 48 | 24.2 | 51 |
| 310 | 22.5 | 51 | 50 | 26.7 | 42 | 22.4 | 48 |
| 311 | 26.3 | 55 | 54 | 22.2 | 46 | 22.3 | 51 |
| 312 | 25.7 | 53 | 52 | 21.7 | 46 | 21.6 | 50 |
| 313 | 24.9 | 54 | 50 | 21.8 | 46 | 21.5 | 50 |
| Comparative Example: |  |  |  |  |  |  |  |
| 306 | 27.8 | 57 | 39 | 23.3 | 48 | 14.2 | 36 |
| 307 | 26.5 | 56 | 38 | 22.4 | 47 | 13.8 | 33 |

(1): Initial stage
(2): Repeated reproduction (after $10^5$ times)
(3): Environmental storage stability (85° C., dry, after 1,000 hours)
(4): Light-resistance stability (xenon lamp, 1 kW/m$^2$, after 100 hours)

Examples 314 & 317

A solution prepared by mixing in 95 parts by weight of diacetone alcohol 4 parts by weight of a mixture comprised of the combination of an organic dye and an infrared-absorptive compound as shown in Table 3.8 below and 1 part On the optical disks thus produced, measurement was made in the same manner as in Example 306.

Results obtained are shown in Table 309.

TABLE 308

| Example | Organic dye | Infrared-absorption comp. No. | Wt. ratio |
|---|---|---|---|
| 314 | (squaraine dye with two 3,3-dimethyl-1-ethylindolinylidene groups) | [VI]-(A)-(16) | 70:30 |
| 315 | (bis-triarylmethane-type dye with four 2-methylpyrrolidinyl groups on aniline rings, ClO$_4^\ominus$) | [V]-(D)-(7) | 85:15 |
| 316 | (guaiazulene-based dye with =CH—CH=CH— linked to cyclohexadienylidene-N(C$_2$H$_5$)$_2$, BF$_4^\ominus$) | [VI]-(C)-(9) | 75:25 |
| 317 | (bis-triarylmethane-type dye with four N(CH$_3$)$_2$ groups, ClO$_4^\ominus$) | [V]-(B)-(12) | 80:20 |

TABLE 309

| | (1) | | (2) | (3) | | (4) | |
|---|---|---|---|---|---|---|---|
| Example | Reflectance (%) | C/N (dB) | C/N (dB) | Reflectance (%) | C/N (dB) | Reflectance (%) | C/N (dB) |
| 314 | 26.4 | 53 | 51 | 22.0 | 44 | 22.6 | 48 |

TABLE 309-continued

| | (1) | | (2) | (3) | | (4) | |
|---|---|---|---|---|---|---|---|
| Example | Reflectance (%) | C/N (dB) | C/N (dB) | Reflectance (%) | C/N (dB) | Reflectance (%) | C/N (dB) |
| 315 | 25.9 | 54 | 52 | 22.5 | 47 | 22.3 | 49 |
| 316 | 26.0 | 51 | 48 | 22.1 | 44 | 23.1 | 49 |
| 317 | 25.5 | 53 | 51 | 21.7 | 45 | 22.6 | 49 |

(1): Initial stage
(2): Repeated reproduction (after $10^5$ times)
(3): Environmental storage stability (85° C., dry, after 1,000 hours)
(4): Light-resistance stability (xenon lamp, 1 kW/m², after 100 hours)

Example 401

A solution was prepared by dissolving in 97 parts by weight of diacetone alcohol 3 parts by weight of a mixture (weight ratio: 75:25) comprised of the organic dye of Example 104 and the infrared-absorptive compound No. (I)-(A)-(18).

Meanwhile, 200 sheets of pregrooved wallet-size PC substrates as used in Example 104 were prepared. On the substrates, the above solution was continuously coated by roll coating, followed by drying to form a recording layer with a thickness of 1,000 Å on each substrate. Thereafter, using each substrate with the recording layer formed thereon, 200 cards were produced in the same manner as in Example 101.

Then, optical cards produced using substrates on which the recording layers were formed on the 1st coating, 10th coating, 50th coating, 100th coating and 200th coating (hereinafter called optical cards No. 1, No. 10, No. 50, No. 100 and No. 200, respectively) were picked up, and each was set on an optical card recording-reproducing apparatus. While the optical card was driven in the direction following the pregrooves, light was made incident from the PC substrate side on the recording layer formed on recording tracks between the grooves, using a semiconductor laser of an oscillation wavelength of 830 nm, to record information under the following recording conditions.

Recording conditions:

Spot size: 3 μm in diameter

Recording power: 10 mW

Recording frequency: 150 kHz

Transport speed: 480 mm/sec.

Subsequently, beams of the semiconductor laser, whose power was reduced to 0.3 mW, were made to scan the recording tracks along which information had been recorded, to reproduce the information. The resulting reproducing wave form was spectrally analyzed to measure noise level and C/N ratio of each optical card.

Results obtained are shown in Table 401.

Examples 402 to 405

Two hundred (200) optical cards were produced in the same manner as in Example 401 except that the infrared-absorptive compound No. (I)-(A)-(18) used therein was replaced with No. (I)-(A)-(35), No. (I)-(A)-(37), No. (III)-(14) or No.. (V)-(D)-(7). Evaluation was also similarly made.

Results obtained are shown in Table 401.

Comparative Example 401

An optical card was produced in the same manner as in Example 401 except that the infrared-absorptive compound No. (I)-(A)-(18) used therein was replaced with the infrared-absorptive compound used in Comparative Example 101. Its noise level and C/N ratio were measured in the same manner as in Example 401.

Results obtained ape shown in Table 401.

Reference Example 401

Two hundred (200) optical cards were produced in the same manner as in Example 401 except that the infrared-absorptive compound No. (I)-(A)-(18) used therein was replaced with No. (I)-(A)-(15). Evaluation was also similarly made.

Results obtained are shown in Table 401.

TABLE 401

| | C/N ratio (dB); In ( ): noise level | | | | |
|---|---|---|---|---|---|
| | No.1 card | No.10 card | No.50 card | No.100 card | No.200 card |
| Example: | | | | | |
| 401 | 49 (−68) | 49 (−68) | 49 (−68) | 49 (−68) | 49 (−68) |
| 402 | 49 (−68) | 49 (−68) | 49 (−68) | 49 (−68) | 49 (−68) |
| 403 | 50 (−68) | 50 (−68) | 50 (−68) | 50 (−68) | 50 (−68) |
| 404 | 49 (−68) | 49 (−68) | 49 (−68) | 49 (−68) | 49 (−68) |
| 405 | 48 (−67) | 48 (−67) | 48 (−67) | 48 (−67) | 48 (−67) |
| Comparative Example: 401 | 48 (−67) | 48 (−67) | 47 (−66) | 45 (−64) | 44 (−62) |
| Synthesis Example: 401 | 49 (−68) | 49 (−68) | 48 (−67) | 47 (−66) | 46 (−65) |

In Comparative Example 401, the nose level increased and the C/N ratio decreased with an increase in the coating number. This is presumed to be due to an insufficient solvent solubility of the infrared-absorptive compound used in Comparative Example 401, which has easily caused deposition of solid matter, e.g., fine crystals, because of a slight change in concentration of the coating solution, caused when coated on a number of substrates, and this had caused the noise. On the other hand, it can be considered that the infrared-absorptive compound of the present invention has so high a solvent solubility and so hardly cause the deposition of crystals even because of some change in concentration in the coating step that no crystals can be included in the recording layer and optical recording mediums with a low noise level can be obtained.

What is claimed is:

1. An optical recording medium comprising a recording layer formed on a substrate containing an infrared-absorptive compound represented by the following formula (I) or (II)

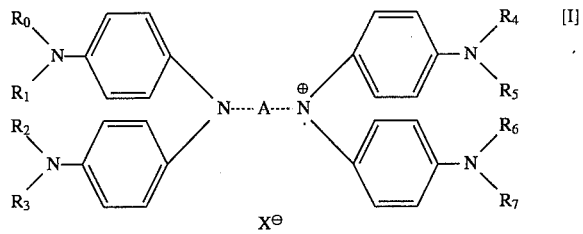

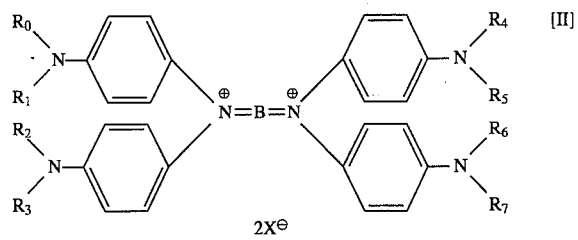

wherein $R_0$ to $R_7$ each represent (a) a hydrogen atom or a monovalent organic residual group, at least one of $R_0$ to $R_7$ being a monovalent organic residual group having a fluorine atom, or (b) a group of atoms necessary for at least one of combinations $R_0$ and $R_1$, $R_2$ and $R_3$, $R_4$ and $R_5$ and $R_6$ and $R_7$ to form together with a nitrogen atom a substituted 5-membered ring having a fluorine atom, a substituted 6-membered ring having a fluorine atom or a substituted 7-membered ring having a fluorine atom, other combinations each being a hydrogen atom or a monovalent organic residual group; $X^\ominus$ represents an anionic residual group; in formula (I), "A" represents

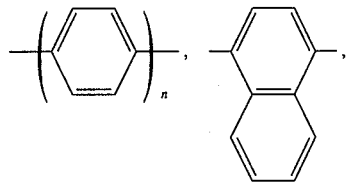

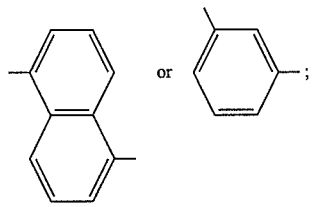

and in formula (II), "B" represents

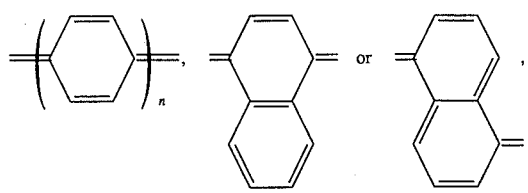

wherein n represents an integer of 1 or 2.

2. The optical recording medium according to claim 1, wherein said monovalent organic residual group is a substituted alkyl group having a fluorine atom, a substituted alkenyl group having a fluorine atom, a substituted aralkyl group having a fluorine atom, or a substituted aryl group having a fluorine atom.

3. The optical recording medium according to claim 1, wherein said 5-membered ring is a pyrrolidine ring.

4. The optical recording medium according to claim 1, wherein said 6-membered ring is a piperidine ring or a tetrahydropyridine ring.

5. The optical recording medium according to claim 1, wherein said 7-membered ring is a cyclohexylamine ring represented by the following formula VII.

6. An optical recording medium comprising a recording layer containing an infrared-absorptive compound represented by the formula (III) or (IV)

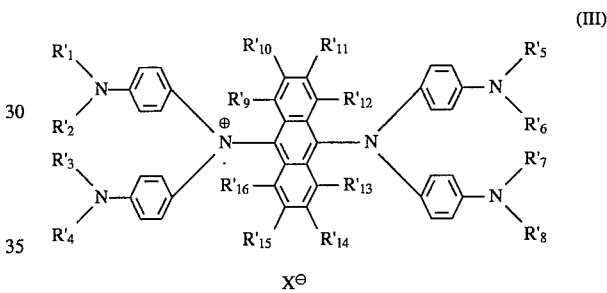

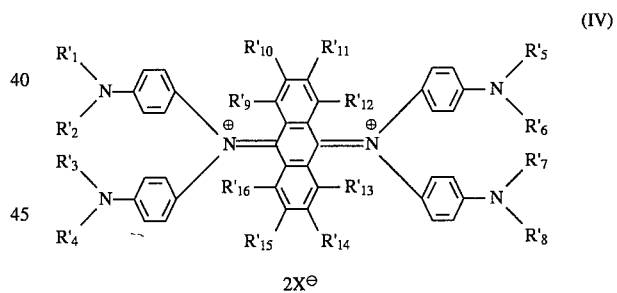

wherein $R'_1$ to $R'_{16}$ each represent a hydrogen atom or a monovalent organic residual group, or a group of atoms necessary for any combination of $R'_q$ and $R'_{q+1}$ to form a substituted or unsubstituted 5-membered ring, a substituted or unsubstituted 6-membered ring or a substituted or unsubstituted 7-membered ring, wherein q is 1, 3, 5, 7, 9, 11 or 13; and $X^\ominus$ represents an anionic residual group.

7. An optical recording medium comprising a recording layer containing an infrared-absorptive compound represented by the following formula (V) or (VI)

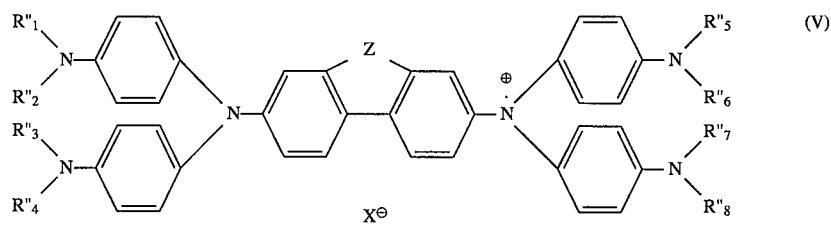

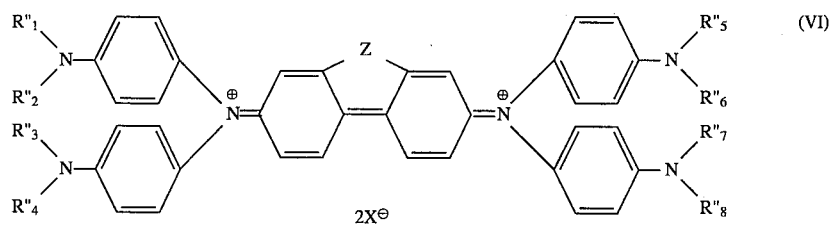

wherein Z represents

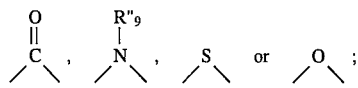

$R''_1$ to $R''_9$ each represent a hydrogen atom or a monovalent organic residual group, or a group of atoms necessary for any combination of $R''_r$ and $R''_{r+1}$ to form a substituted or unsubstituted 5-membered ring, a substituted or unsubstituted 6-membered ring or a substituted or unsubstituted 7-membered ring, wherein r is 1, 3, 5 or 7; and $X^{\ominus}$ represents an anionic residual group.

* * * * *

UNITED STATES PATENT AND TRADEMARK OFFICE
CERTIFICATE OF CORRECTION

PATENT NO. : 5,482,822

DATED : January 9, 1996

INVENTOR(S) : MIHARA, ET AL.

It is certified that error appears in the above-indentified patent and that said Letters Patent is hereby corrected as shown below:

On the title page
[56] FOREIGN PATENT DOCUMENTS

"0475676 3/1982 European Pat. Off." should read
--0475676 3/1992 European Pat. Off.--.

Column 1

Line 19, "describe," should read --described,--; and
Line 49, "formation-of" should read --formation of--.

Column 2

Line 55, "(IT)." should read --(II).--.

Column 8

Line 67, "trifluoromethoxymethyl" should read
--trifluoromethoxymethyl--.

Column 9

Line 2, "difluoromethoxyethyl" should read
--difluoromethoxyethyl--;
Line 13, "p-fluorobenzyl" should read
--p-fluorobenzyl--; and
Line 14, "m-fluorobenzyl" should read --m-fluorobenzyl--.

Column 12

Line 8, "ape" should read --are--.

UNITED STATES PATENT AND TRADEMARK OFFICE
CERTIFICATE OF CORRECTION

PATENT NO. : 5,482,822  Page 2 of 7
DATED : January 9, 1996
INVENTOR(S) : MIHARA, ET AL.

It is certified that error appears in the above-indentified patent and that said Letters Patent is hereby corrected as shown below:

Column 19

Compound No. (8)
"

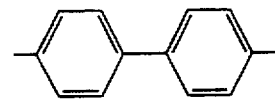

should read
--

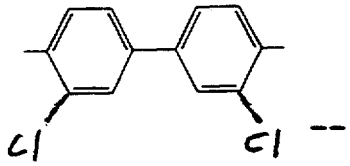  --

Column 19

Compound No. (9)
"

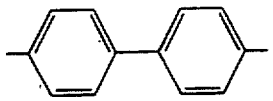

"

should read
--

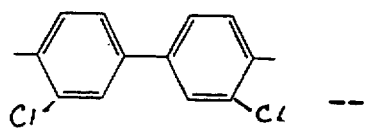  --

UNITED STATES PATENT AND TRADEMARK OFFICE
CERTIFICATE OF CORRECTION

PATENT NO. : 5,482,822
DATED : January 9, 1996
INVENTOR(S) : MIHARA, ET AL.

It is certified that error appears in the above-indentified patent and that said Letters Patent is hereby corrected as shown below:

Column 45

Line 46, "Group(s)" should read --group(s)--; and
Line 61, "an." should read --an--.

Column 47

Line 14, "ethoxypropy1" should read --ethoxypropyl--; and
Line 41, "different" should read --different from--.

Column 97

Line 17, "t-buryl" should read --t-butyl--;
Line 33, "end" (both occurrences) should read --and--;
Line 40, "end" (both occurrences) should read --and--; and
Line 56, "different" should read --different from--.

Column 98

Line 9, "8" should read --a--; and
Line 11, "R"$_8$" should read --R"$_8$,--.

Column 129

Line 19, "cost" should read --cost,--.

UNITED STATES PATENT AND TRADEMARK OFFICE
CERTIFICATE OF CORRECTION

PATENT NO. : 5,482,822          Page 4 of 7
DATED      : January 9, 1996
INVENTOR(S): MIHARA, ET AL.

It is certified that error appears in the above-indentified patent and that said Letters Patent is hereby corrected as shown below:

Column 131

Line 58, "end" should read --and--;
    Line 60, "end" should read --and--;
    Line 65, "end" should read --and--; and
    Line 66, "eyenine" should read --cyanine--.

Column 132

Line 12, "contain(s)" should read --contain--.

Column 133

Line 56, "part." should read
            --part.
              Elementary analysis:--.

Column 134

Line 17, "1,178 nm." should read
            --1,178 nm.
              Elementary analysis:--; and
    Line 65, "6" should read --0.6--.

Column 135

Line 22, "each." should read
            --each.
              Elementary analysis:--;
    Line 41, "Was" should read --was--; and
    Line 43, "1,178 nm." should read
            --1,178 nm.
              Elementary analysis:--.

UNITED STATES PATENT AND TRADEMARK OFFICE
CERTIFICATE OF CORRECTION

PATENT NO. : 5,482,822
DATED : January 6, 1996
INVENTOR(S) : MIHARA, ET AL.

It is certified that error appears in the above-indentified patent and that said Letters Patent is hereby corrected as shown below:

Column 136

Line 44, "each." should read
--each.
   Elementary analysis:--;
Line 59, "end" should read --and--; and
Line 67, "1,185 nm." should read
--1,185 nm.
   Elementary analysis:--.

Column 143

Line 53, "0.6 82 m" should read --0.6 μm--.

Column 159

Table 204,
"

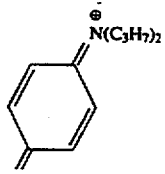

"

should read
--

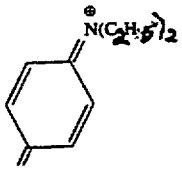

--

UNITED STATES PATENT AND TRADEMARK OFFICE
CERTIFICATE OF CORRECTION

PATENT NO. : 5,482,822      Page 6 of 7
DATED      : January 6, 1996
INVENTOR(S) : MIHARA, ET AL.

It is certified that error appears in the above-indentified patent and that said Letters Patent is hereby corrected as shown below:

Column 161

Table 206, "Example:" (second occurrence) should read --Example: 206--.

Column 163

Table 206, "206" should be deleted.

Column 173

Line 23, "compounds" should read --compound--.

Column 175

Line 59, "below," should read --below.--

Column 179

Line 64, "Table 3.8" should read --Table 308--;
Table 307, "310    22.5" should read
         --310    32.5--.

Column 184

Line 19, "ape" should read --are--;
Line 53, "nose" should read --noise--; and
Line 63, "cause" should read --causes--.

UNITED STATES PATENT AND TRADEMARK OFFICE
CERTIFICATE OF CORRECTION

PATENT NO. : 5,482,822 Page 1 of 1
DATED : January 6, 1996
INVENTOR(S) : MIHARA, ET AL.

It is certified that error appears in the above-indentified patent and that said Letters Patent is hereby corrected as shown below:

Column 185

Line 26, "represent" should read --represents--.

Column 186

Line 50, "represent" should read --represents--.

Column 188

Line 21, "represent" should read --represents--.

Signed and Sealed this

Thirtieth Day of July, 1996

Attest:

BRUCE LEHMAN

*Attesting Officer*     *Commissioner of Patents and Trademarks*